(12) United States Patent
Li et al.

(10) Patent No.: US 11,038,670 B2
(45) Date of Patent: Jun. 15, 2021

(54) SYSTEM AND METHOD FOR BLOCKCHAIN-BASED CROSS-ENTITY AUTHENTICATION

(71) Applicant: ADVANCED NEW TECHNOLOGIES CO., LTD., Grand Cayman (KY)

(72) Inventors: Shubo Li, Hangzhou (CN); Jiawei Liu, Hangzhou (CN); Renhui Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 26 days.

(21) Appl. No.: 16/912,325

(22) Filed: Jun. 25, 2020

(65) Prior Publication Data

US 2020/0328878 A1 Oct. 15, 2020

Related U.S. Application Data

(63) Continuation of application No. 16/737,806, filed on Jan. 8, 2020, which is a continuation of application No. PCT/CN2019/103798, filed on Aug. 30, 2019.

(30) Foreign Application Priority Data

| Jul. 2, 2019 | (WO) | PCT/CN2019/094396 |
| Jul. 9, 2019 | (WO) | PCT/CN2019/095299 |
| Jul. 9, 2019 | (WO) | PCT/CN2019/095303 |

(51) Int. Cl.
*H04L 9/06* (2006.01)
*H04L 9/32* (2006.01)
*H04L 9/30* (2006.01)

(52) U.S. Cl.
CPC .......... *H04L 9/0637* (2013.01); *H04L 9/0643* (2013.01); *H04L 9/30* (2013.01); *H04L 9/3247* (2013.01); *H04L 2209/38* (2013.01)

(58) Field of Classification Search
CPC ... H04L 9/0637; H04L 9/0643; H04L 9/3247; H04L 9/30; H04L 2209/38
See application file for complete search history.

(56) References Cited

U.S. PATENT DOCUMENTS

| 9,992,022 B1 | 6/2018 | Chapman et al. |
| 10,127,378 B2 | 11/2018 | Toth |

(Continued)

FOREIGN PATENT DOCUMENTS

| WO | 2018047085 A1 | 3/2018 |
| WO | 2019014592 A1 | 1/2019 |

OTHER PUBLICATIONS

Notice of Allowance for U.S. Appl. No. 16/718,937 dated Jul. 20, 2020.

(Continued)

*Primary Examiner* — Darren B Schwartz

(57) ABSTRACT

Methods, systems, and apparatus, including computer programs encoded on computer storage media, for blockchain-based cross-entity authentication are provided. One of the methods includes: obtaining an authentication request by a first entity for authenticating a user, wherein the authentication request comprises a decentralized identifier (DID) of the user; in response to determining that the first entity is permitted to access authentication information of the user endorsed by a second entity, generating a blockchain transaction for obtaining an authentication result of the user by the second entity, wherein the authentication result is associated with the DID; and transmitting the blockchain transaction to a blockchain node for adding to a blockchain.

19 Claims, 21 Drawing Sheets

(56) References Cited

U.S. PATENT DOCUMENTS

| | | | |
|---|---|---|---|
| 10,425,230 B1* | 9/2019 | Tang | H04L 9/3247 |
| 10,452,828 B1 | 10/2019 | Larimer et al. | |
| 10,454,906 B1 | 10/2019 | Sharfman et al. | |
| 10,454,927 B2* | 10/2019 | Oberhauser | H04L 9/3239 |
| 10,506,104 B1* | 12/2019 | Shakeri | H04M 3/42042 |
| 10,587,413 B1* | 3/2020 | Todd | H04L 9/3239 |
| 10,685,099 B2 | 6/2020 | Chen et al. | |
| 10,700,851 B2 | 6/2020 | Lin et al. | |
| 10,728,042 B2 | 7/2020 | Li et al. | |
| 10,824,701 B2 | 11/2020 | Chen et al. | |
| 10,880,089 B2 | 12/2020 | Brown et al. | |
| 10,917,246 B2 | 2/2021 | Li et al. | |
| 10,924,284 B2 | 2/2021 | Yang et al. | |
| 2007/0143860 A1* | 6/2007 | Hardt | H04L 63/0823 726/28 |
| 2012/0008786 A1 | 1/2012 | Cronk et al. | |
| 2012/0284505 A1 | 11/2012 | Smith et al. | |
| 2013/0326596 A1 | 12/2013 | Hohlfeld et al. | |
| 2014/0208119 A1* | 7/2014 | Chang | H04L 67/42 713/176 |
| 2015/0288694 A1 | 10/2015 | Liebl, III et al. | |
| 2017/0140145 A1 | 5/2017 | Shah | |
| 2017/0180128 A1 | 6/2017 | Lu | |
| 2017/0250972 A1* | 8/2017 | Ronda | H04L 9/3236 |
| 2018/0019879 A1* | 1/2018 | Kravitz | H04L 9/3236 |
| 2018/0176228 A1 | 6/2018 | He et al. | |
| 2018/0191501 A1 | 7/2018 | Lindemann | |
| 2018/0191695 A1 | 7/2018 | Lindemann | |
| 2019/0035018 A1* | 1/2019 | Nolan | G06Q 20/36 |
| 2019/0044940 A1* | 2/2019 | Khalil | H04W 12/00506 |
| 2019/0050855 A1 | 2/2019 | Martino et al. | |
| 2019/0141026 A1* | 5/2019 | Kshirsagar | H04L 63/126 |
| 2019/0163896 A1 | 5/2019 | Balaraman et al. | |
| 2019/0164156 A1* | 5/2019 | Lindemann | H04L 9/0825 |
| 2019/0179672 A1* | 6/2019 | Christidis | G06F 9/5038 |
| 2019/0230092 A1* | 7/2019 | Patel | H04L 9/0637 |
| 2019/0266576 A1* | 8/2019 | McCauley | G06F 21/32 |
| 2019/0268140 A1* | 8/2019 | Kandiraju | H04L 9/3268 |
| 2019/0281028 A1* | 9/2019 | Gillan | H04L 63/0861 |
| 2019/0305949 A1* | 10/2019 | Hamel | H04L 9/3226 |
| 2019/0305954 A1* | 10/2019 | Hamel | H04L 9/0897 |
| 2019/0318338 A1* | 10/2019 | Verma | H04L 9/0637 |
| 2019/0342303 A1 | 11/2019 | Sun et al. | |
| 2019/0349371 A1* | 11/2019 | Smith | G06F 21/31 |
| 2020/0007312 A1 | 1/2020 | Vouk et al. | |
| 2020/0028688 A1* | 1/2020 | Takada | H04L 63/00 |
| 2020/0044831 A1* | 2/2020 | Soundararajan | H04L 9/3297 |
| 2020/0092292 A1* | 3/2020 | Patel | H04W 12/08 |
| 2020/0104296 A1 | 4/2020 | Hunn et al. | |
| 2020/0111118 A1 | 4/2020 | Patel et al. | |
| 2020/0127828 A1 | 4/2020 | Liu et al. | |
| 2020/0127845 A1 | 4/2020 | Yang et al. | |
| 2020/0127847 A1 | 4/2020 | Yang et al. | |
| 2020/0143019 A1 | 5/2020 | Chen et al. | |
| 2020/0145209 A1 | 5/2020 | Yang et al. | |
| 2020/0153639 A1 | 5/2020 | Yang et al. | |
| 2020/0177373 A1 | 6/2020 | Komandur et al. | |
| 2020/0184085 A1 | 6/2020 | Korten et al. | |
| 2020/0211409 A1 | 7/2020 | Latorre et al. | |
| 2020/0220728 A1 | 7/2020 | Ardashev et al. | |
| 2020/0242221 A1 | 7/2020 | Chen et al. | |
| 2020/0244439 A1 | 7/2020 | Lin et al. | |
| 2020/0252210 A1 | 8/2020 | Sharfman et al. | |
| 2020/0304315 A1 | 9/2020 | Li et al. | |
| 2020/0311094 A1 | 10/2020 | Opferman et al. | |
| 2020/0374132 A1 | 11/2020 | Lobban et al. | |
| 2020/0394654 A1 | 12/2020 | Concannon et al. | |
| 2020/0403795 A1 | 12/2020 | Murdoch et al. | |
| 2020/0403805 A1 | 12/2020 | Steele et al. | |
| 2021/0006410 A1 | 1/2021 | Uhr et al. | |
| 2021/0012013 A1 | 1/2021 | Gourisetti et al. | |
| 2021/0051025 A1 | 2/2021 | Li et al. | |

OTHER PUBLICATIONS

Non-Final Office Action for U.S. Appl. No. 16/718,984 dated Aug. 21, 2020.

Allen et al., "Decentralized Identifiers (DIDs) v0.9", W3C, Jan. 2018, p. 1-39. (Year: 2018).

Sporny et al., "Verifiable Claims Use Cases", W3C Working Group Note, Jul. 2017, W3C, p. 1-17. (Year: 2017).

Sporny et al., "A Decentralized Hashtable for the Web", W3C Draft Community Group Report, Mar. 2018, W3C, p. 1-13. (Year: 2018).

Sporny et al., "A Primer for Decentralized Identifiers", W3C Draft Community Group Report, Jan. 2019, W3C, p. 1-8. (Year: 2019).

De Rooij, "Verfiable Claims for Digital Identity", VX Company, Aug. 10, 2018, p. 1-17. (Year: 2018).

Duffy et al., "Use Cases for Decentralized Identifiers", W3C Draft Community Group Report, Feb. 2019, W3C, p. 1-12. (Year: 2019).

Notice of Allowance for U.S. Appl. No. 16/719,026 dated Sep. 17, 2020.

Search Report for European Application No. 19771295.3 dated Aug. 24, 2020.

Sunny Lee et al., "Verifiable Claims Task Force Use Cases," Apr. 3, 2018.

Manu Sporny et al., "Verifiable Claims Data Model and Representations 1.0", May 1, 2017.

Anonymous, "education/introduction-to-hyperledger-indy.md", https://github.com/hyperledger/education/blob/master/LFS171x/docs/introduction-to-hyperledger-indy.md, retrieved on May 25, 2020.

Search Report for European Application No. 19 772 514.6 dated Sep. 7, 2020.

Takemiya Makoto et al., "Sora Identity: Secure, Digital Identity on the Blockchain," IEEE, Jul. 23, 2018.

Search Report for European Application No. 19 772 156.6 dated Sep. 7, 2020.

Abbie Barbir, Updated text for X.dlt-sec, "Security considerations for using DLT data in Identity Management; C-0471", ITU-T Draft, International Telecommunication Union, Jan. 3, 2019.

Search Report for European Application No. 19771466.0 dated Nov. 6, 2020.

Soltani Reza et al., "A New Approach to Client Onboarding Using Self-Sovereign Identity and Distributed Ledger," 2018 IEE, Jul. 30, 2018.

Final Office Action for U.S. Appl. No. 16/718,984 dated Dec. 24, 2020.

Piper, et al., "Cryptography, A Very Short Introduction", Oxford University Press, 2002, p. 96-99. (Year: 2002).

Reed et al., "DKMS (Decentralized Key Management System) Design and Architecture V4", Mar. 29, 2019, https://github.com/hyperledger/indy-hipe/blob/master/design/dkms/dkms-v4.md, accessed Dec. 16, 2020, p. 1-69. (Year: 2019).

Barker et al., "A Framework for Designing Cryptographic Key Management Systems", N 1st Special Publication 800-130, N 1st, Aug. 2003, p. 1-120. (Year: 2003).

Hardman, Daniel, "How DIDs, Keys, Credentials, and Agents Work in Sovrin", sovrin.org, Apr. 2018, p. 1-7. (Year: 2018).

Tobin, Andrew, "Sovrin: What Goes on the Ledger?", Evernym/Sovrin Foundation, Sep. 2018, p. 1-11. (Year: 2018).

Windley, Phillip, "How Sovrin Works", Sovrin Foundation, Oct. 3, 2016, p. 1-10. (Year: 2016).

Sovrin Foundation, "Sovrin: A Protocol and Token for Self-Sovereign Identity and Decentralized Trust", White Paper, Jan. 2018, p. 1-42. (Year: 2018).

Notice of Allowance for U.S. Appl. No. 17/086,832 dated Jan. 25, 2021.

Written Opinion and International Search Report for PCT Application No. PCT/CN2019/103758 made available to public dated Jan. 7, 2021.

Written Opinion and International Search Report for PCT Application No. PCT/CN2019/103798 made avilable to public dated Jan. 7, 2021.

Non-Final Office Action for U.S. Appl. No. 17/129,372 dated Mar. 2, 2021.

Mayrhofer et al., "The Decentralized Identifier (DID) in the DNS draft-mayrhofer-did-dns-01" Feb. 8, 2019 (Year: 2019).

(56) References Cited

OTHER PUBLICATIONS

Non-Final Office Action for U.S. Appl. No. 17/105,734 dated Mar. 12, 2021.
Non-Final Office Action for U.S. Appl. No. 17/156,412 dated Apr. 16, 2021.
Nate Otto and Kim Hamilton Duffy, "Open Badges are Verifiable Credentials", Jul. 9, 2018, obtained online from <http://github.com/WebOfT rusll nfo/rwot6-santabarbara/blob/master/final-documents/open-badges-are-verifiable-credentials.md>, retreived on Apr. 10, 2021.

* cited by examiner

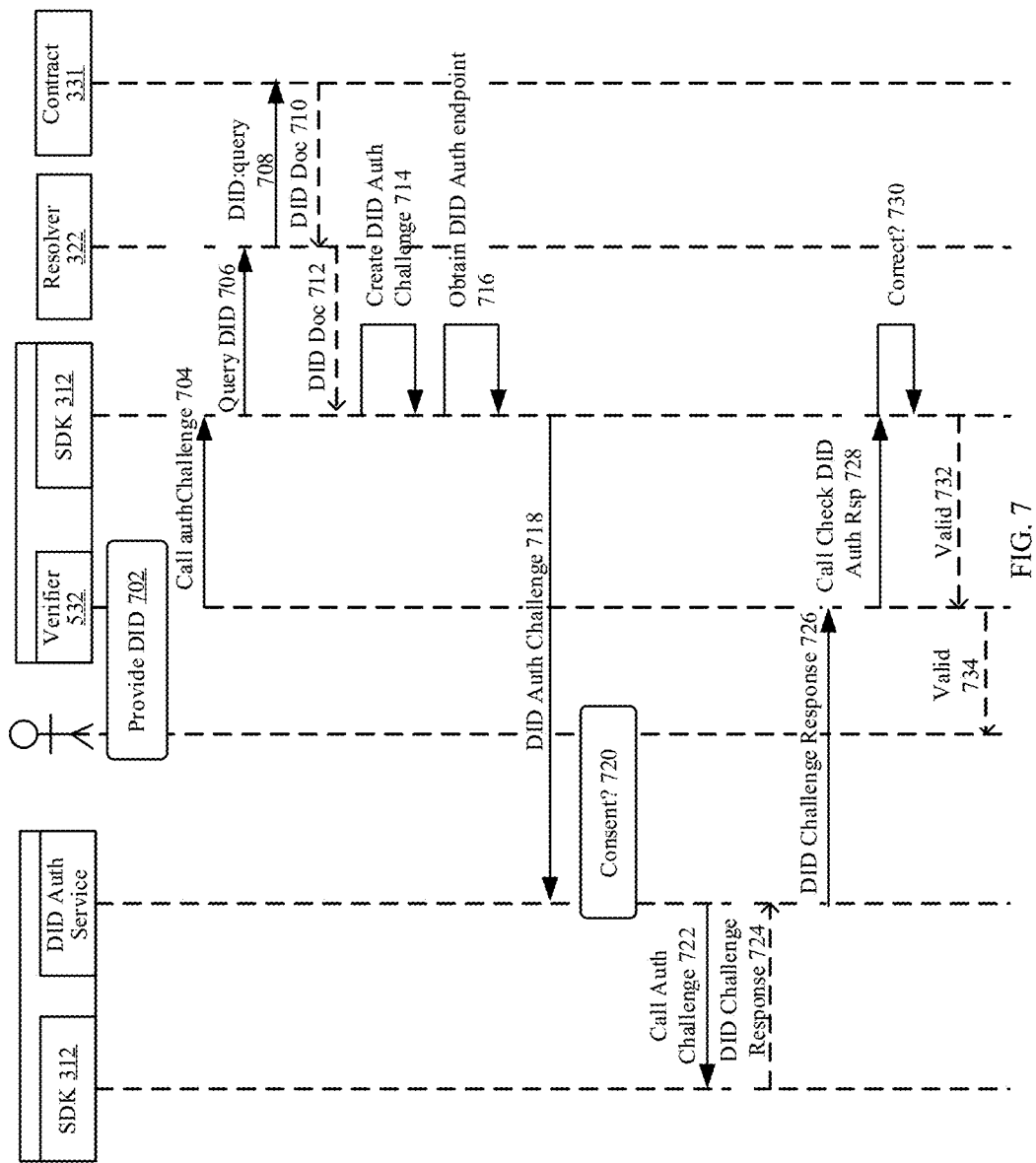

1700

1710: obtaining an authentication request by a first entity for authenticating a user, wherein the authentication request comprises a decentralized identifier (DID) of the user

1720: in response to determining that the first entity is permitted to access authentication information of the user endorsed by a second entity, generating a blockchain transaction for obtaining an authentication result of the user by the second entity, wherein the authentication result is associated with the DID

1730: transmitting the blockchain transaction to a blockchain node for adding to a blockchain

1711: obtaining, from a blockchain, a blockchain transaction comprising an authentication request by a first entity for authenticating a user, wherein the authentication request comprises a decentralized identifier (DID) of the user

1721: in response to determining that the first entity is permitted to access authentication information of the user endorsed by a second entity, obtaining an authentication result of the user by the second entity in response to the obtained blockchain transaction, wherein the authentication result is associated with the DID

1731: generating a different blockchain transaction comprising the authentication result

1741: transmitting the different blockchain transaction to a blockchain node for adding to the blockchain

FIG. 17B

SYSTEM AND METHOD FOR BLOCKCHAIN-BASED CROSS-ENTITY AUTHENTICATION

CROSS REFERENCE TO RELATED APPLICATIONS

The present application is a continuation application of U.S. patent application Ser. No. 16/737,806, filed on Jan. 8, 2020, and entitled "SYSTEM AND METHOD FOR BLOCKCHAIN-BASED CROSS-ENTITY AUTHENTICATION," which is a continuation application of International Patent Application No. PCT/CN2019/103798, filed on Aug. 30, 2019, and entitled "SYSTEM AND METHOD FOR BLOCKCHAIN-BASED CROSS-ENTITY AUTHENTICATION." International Patent Application No. PCT/CN2019/103798 claims priority to and benefits of International Application No. PCT/CN2019/095299 filed with the China National Intellectual Property Administration (CNIPA) on Jul. 9, 2019, International Application No. PCT/CN2019/095303 filed with the CNIPA on Jul. 9, 2019, and International Application No. PCT/CN2019/094396, filed with the CNIPA on Jul. 2, 2019. International Application No. PCT/CN2019/095299 and International Application No. PCT/CN2019/095303 also claim priority to and benefits of International Application No. PCT/CN2019/094396. The entire contents of all of the above-identified applications are incorporated herein by reference.

TECHNICAL FIELD

This application generally relates to methods and devices for blockchain-based cross-entity authentication.

BACKGROUND

Traditional identity management systems are based on centralized authorities such as corporate directory services, certificate authorities, or domain name registries. Each of the centralized authorities may serve as a root of trust that provides credibility to the identity it endorses. For such systems, data associated with the identities is often stored in centralized databases, if not traditional information storage media. The maintenance of identity of each person or entity is under the control of the centralized authorities. Given its nature, traditional identity management systems are subject to security risks suffered by each of the centralized authorities and provide inefficient mechanisms for the aggregation of identities or credentials provided by different centralized authorities. In such systems, individual entities or identity owners are often neither free to choose the root of trust nor in control over their own identities or credentials. Authentication and verification of their identities often prove to be inefficient.

Cross-entity authentication presents additional challenges. Cross-entity authentication requires different authorities to share user identity information. For example, to allow a first authority to authenticate a user based on the user's registration with a second authority, the second authority may need to share the user's identity and authentication information to the first authority. Traditional cross-authentication systems are often exposed to issues such as security vulnerabilities, privacy leakage, user-unfriendliness, complicated notification and authorization, workflow inefficiency, etc. In most cases, different authorities often find the lack of a common protocol to interface with each other for cross-authenticating users. For example, user authentication information may be spread outside a secure environment risking the user for identity theft. For another example, non-essential user information may be provided with essential information to other authorities for cross-entity authentication giving away user privacy. For yet another example, authorities and users have to undergo numerous layers of authorizations and security checks which makes the system inconvenient and unscalable.

Blockchain technology provides an opportunity to establish a trustworthy decentralized system that does not require trust in each member of the system. Blockchain provides data storage in a decentralized fashion by keeping the data in a series of data blocks having precedence relationship between each other. The chain of blocks is maintained and updated by a network of blockchain nodes, which are also responsible for validating data under a consensus scheme. The stored data may include many data types, such as financial transactions among parties, historical access information, etc.

Many blockchains (e.g., the Ethereum blockchain) have enabled blockchain contracts (also referred to as smart contracts) that are executed through blockchain transactions. Blockchain transactions are signed messages originated by externally owned accounts (e.g., blockchain accounts), transmitted by the blockchain network, and recorded in the blockchain. The blockchain contracts may be written to achieve various functions, such as adding data to blockchain accounts, changing data in the blockchain, etc. Thus, the blockchain can be maintained and updated by executing various blockchain transactions.

Blockchain technology provides the means for managing a root of trust without centralized authority. However, identity management systems built based on blockchain often present substantive technical barriers for average users by requiring storage of a blockchain ledger, capabilities to create and execute blockchain transactions and contracts, or participation in the consensus scheme of the blockchain. Such identity management systems also likely require frequent access to and interaction with the blockchain network, which may be costly and resource consuming. For business entities with the needs to manage identities for a large number of users, such identity management systems often prove to be inefficient and user-unfriendly. Mapping between identities managed by such an identity management system and accounts or service IDs kept by business entities are often difficult to maintain. Finally, the identity management systems may often allow anonymous and arbitrary creation of decentralized identities and provide little means to authenticate the real-world identities of the individuals behind the decentralized identities.

SUMMARY

Various embodiments of the specification include, but are not limited to, systems, methods, and non-transitory computer readable media for blockchain-based cross-entity authentication.

According to some embodiments, a computer-implemented method for blockchain-based cross-entity authentication comprises: obtaining an authentication request by a first entity for authenticating a user, wherein the authentication request comprises a decentralized identifier (DID) of the user; in response to determining that the first entity is permitted to access authentication information of the user endorsed by a second entity, generating a blockchain transaction for obtaining an authentication result of the user by the second entity, wherein the authentication result is associated with the DID; and transmitting the blockchain transaction to a blockchain node for adding to a blockchain.

In some embodiments, the method further comprises: obtaining, from the blockchain, the blockchain transaction for obtaining the authentication result of the user; obtaining an authentication result associated with the DID in response to the obtained blockchain transaction; generating a different blockchain transaction comprising the authentication result; and transmitting the different blockchain transaction to a blockchain node for adding to the blockchain.

In some embodiments, the method further comprises: obtaining a different blockchain transaction from the blockchain, the different blockchain transaction comprising the authentication result of the user by the second entity, wherein the authentication result indicates that the authentication succeeded; and transmitting the authentication result to the first entity for granting the user access to the first entity.

In some embodiments, the method further comprises: obtaining a different blockchain transaction from the blockchain, the different blockchain transaction comprising the authentication result of the user by the second entity, wherein the authentication result indicates that the authentication failed; and transmitting the authentication result to the first entity for denying the user access to the first entity.

In some embodiments, the user is registered with the second entity; and the user is not registered with the first entity.

In some embodiments, before generating the blockchain transaction for obtaining the authentication result of the user by the second entity, the method further comprises: obtaining a public key of the user from the blockchain based on the DID; and verifying that the user owns the DID based at least on the obtained public key of the user.

In some embodiments, before generating the blockchain transaction for obtaining the authentication result of the user by the second entity, the method further comprises: generating a digital signature on the obtained authentication request with a private key of the first entity, and obtaining an authorization encrypted with a private key of the user for permitting the first entity to access the authentication information of the user endorsed by the second entity. The encrypted authorization comprises the digital signature; the encrypted authorization comprises the DID of the user; and the generated blockchain transaction comprises the encrypted authorization.

In some embodiments, the authentication information of the user endorsed by the second entity comprises information associated with a verifiable claim (VC) indicating that the user is a registered user of the second entity; and the VC is associated with the DID.

In some embodiments, a hash value of the VC is stored in the blockchain; the VC is stored in a data store; and the data store comprises one or more of the following: a local data store maintained by the second entity, a public data store accessible to the second entity, and a data store maintained by a platform for the second entity.

In some embodiments, the VC comprises a permission configured by the second entity or the user for permitting the first entity to access the VC.

In some embodiments, the DID is a secondary DID associated with a primary DID of the user; the primary DID is associated with privacy information of the user; and the privacy information is untraceable based on the secondary DID.

In some embodiments, the secondary DID is a temporary DID for the user to access the first entity.

According to other embodiments, a system for blockchain-based cross-entity authentication comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for blockchain-based cross-entity authentication comprises a plurality of modules for performing the method of any of the preceding embodiments.

According to some embodiments, a system for blockchain-based cross-entity authentication comprises one or more processors and one or more computer-readable memories coupled to the one or more processors and having instructions stored thereon that are executable by the one or more processors to perform operations comprising: obtaining an authentication request by a first entity for authenticating a user, wherein the authentication request comprises a decentralized identifier (DID) of the user; in response to determining that the first entity is permitted to access authentication information of the user endorsed by a second entity, generating a blockchain transaction for obtaining an authentication result of the user by the second entity, wherein the authentication result is associated with the DID; and transmitting the blockchain transaction to a blockchain node for adding to a blockchain.

According to other embodiments, a non-transitory computer-readable storage medium is configured with instructions executable by one or more processors to cause the one or more processors to perform operations comprising: obtaining an authentication request by a first entity for authenticating a user, wherein the authentication request comprises a decentralized identifier (DID) of the user; in response to determining that the first entity is permitted to access authentication information of the user endorsed by a second entity, generating a blockchain transaction for obtaining an authentication result of the user by the second entity, wherein the authentication result is associated with the DID; and transmitting the blockchain transaction to a blockchain node for adding to a blockchain.

According to yet other embodiments, an apparatus for blockchain-based cross-entity authentication comprises an obtaining module for obtaining an authentication request by a first entity for authenticating a user, wherein the authentication request comprises a decentralized identifier (DID) of the user; a generating module for, in response to determining that the first entity is permitted to access authentication information of the user endorsed by a second entity, generating a blockchain transaction for obtaining an authentication result of the user by the second entity, wherein the authentication result is associated with the DID; and a transmitting module for transmitting the blockchain transaction to a blockchain node for adding to a blockchain.

Embodiments disclosed herein have one or more technical effects. In some embodiments, an online platform provides online services for blockchain-based cross-entity authentication. The complexity for cross-entity communication, authorization, and notification is significantly reduced. In one embodiment, this allows control of operations related to decentralized identity (DID) management using programming languages or protocols other than those required by the blockchain. In one embodiment, this reduces security risks around users' independent creation and storage of important identity credentials. In one embodiment, this facilitates creation of a large number of decentralized identifiers or verifiable claims using simplified control actions as well as effective cross-reference of different identities for a single person or entity. In some embodiments, the online platform may be manifested as an integrated service and makes such online service accessible to users via API interfaces. This allows the users to conveniently access the online service and request access to one entity based on their authentication information previously registered with another entity. In some embodiments, the online platform may be manifested as a distributed and decentralized service. This allows large entities to conveniently join the service, for example, by becoming a blockchain node of the blockchain. With user authorizations, the large entities can correspondingly authenticate registered users for their requested access to other entities. In some embodiments, the cross-entity authentication is initiated based on a user's request to access an entity based on the user's DID and the user's authorization for the entity to access the user's authentication information registered with a different entity for authenticating the user. This allows swift, targeted, and secure query through the blockchain to obtain authentication of the user from the different entity, minimizing security risks to the authentication information of the user. In some embodiments, the user may use a temporary DID just for the purpose of accessing the entity based on the user's authentication information registered with the different entity. This protect privacy and enhances security, because the temporary DID can be stripped off non-essential user information and/or be limited in its validity. In some embodiments, the entities can conveniently manage their users and DIDs, through interactions with the blockchain. In some embodiments, the duplicated authentication information is reduced across the entities, as user registration at one entity can be cross-used at other entities. Thus, power and storage consumption is reduced.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 7 illustrates a method for authenticating a decentralized identifier using DID authentication services in accordance with some embodiments.

FIG. 17A illustrates a flowchart of a method for blockchain-based cross-entity authentication in accordance with some embodiments.

FIG. 17B illustrates a flowchart of a method for blockchain-based cross-entity authentication in accordance with some embodiments.

DETAILED DESCRIPTION

Figure 1:
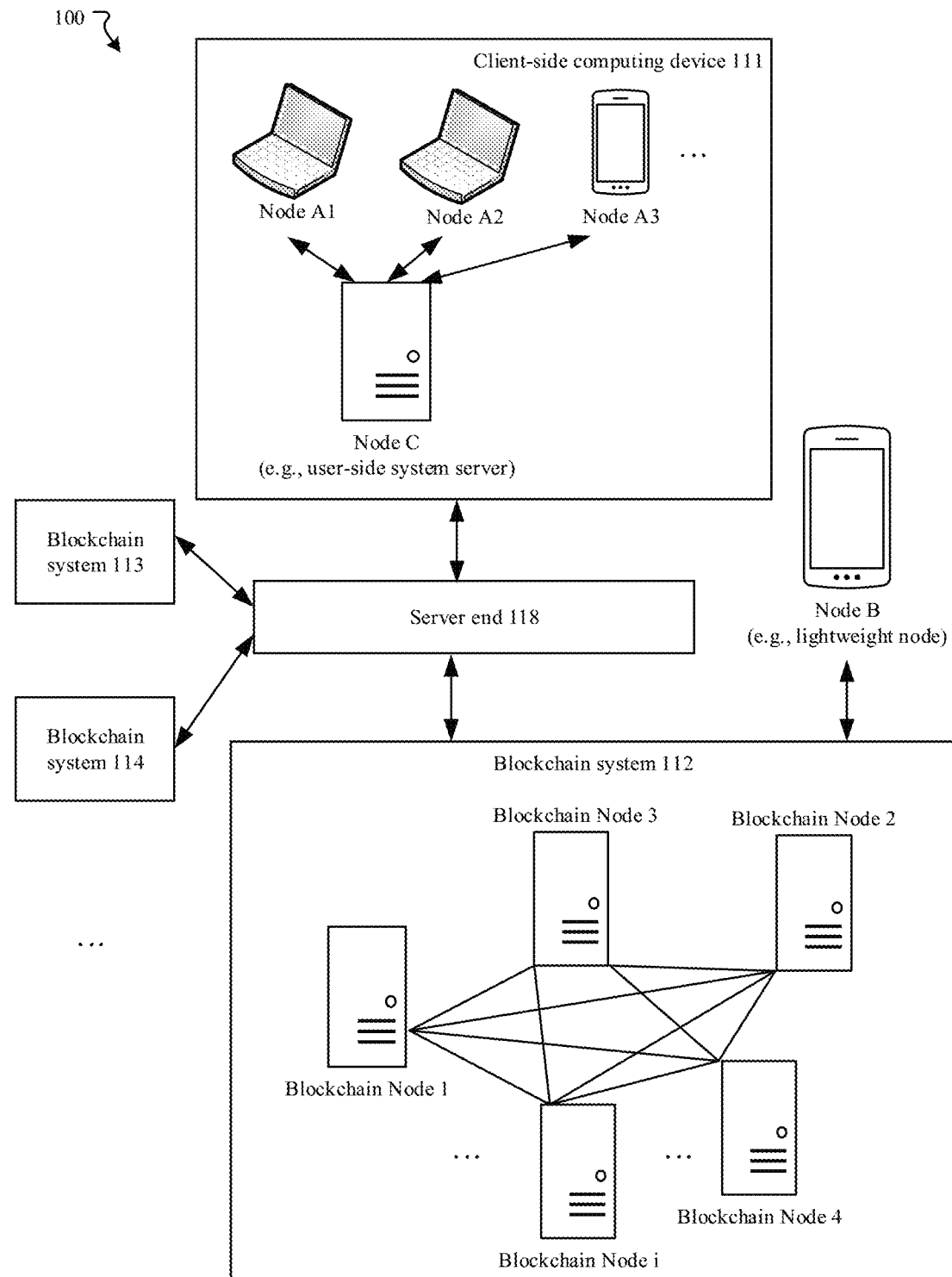
FIG. 1 illustrates a network environment associated with a blockchain in accordance with some embodiments.

Embodiments described herein provide methods, systems, and apparatus associated with an ecosystem for decentralized identity management that may provide unique and verifiable identities to entities. A decentralized identifier (DID) for an entity may allow the entity to obtain full control over its identity as well as information associated with the identity. For example, the entity may be a business entity having many users or be one of the users. Verifiable claims (VCs) may allow for authorizations, endorsements, and acknowledgements among different entities. In a business setting, a service or product provider may use its customers' DIDs and VCs to identify and authenticate the customers and to provide services or products accordingly.

In some embodiments, a DID may be a unique identifier indicating a mapping relationship between a real-world entity and an online identity. The DID may comprise a URL scheme identifier, an identifier for a DID method, and a DID method-specific identifier. Each DID may point to a corresponding DID document. The DID document may comprise descriptive text in a preset format (e.g., JSON-LD) about the DID and the owner of the DID. The DID may serve as a uniform resource identifier (URI) for locating the DID document. The DID document may comprise various properties such as contexts, DID subject, public keys, authentication, authorization and delegation, service endpoints, creation, control, updates, proof, extensibility, other suitable properties, or any combination thereof. These properties may be manifested as parameters of the DID document associated with a DID of an owner. For example, for the controller parameter, a DID document of a first DID may log a second DID for controlling the first DID (e.g., an owner of the second DID being an entity entrusted to manage the first DID as a controller). For another example, for the creator parameter, a DID document of a first DID may log a second DID that created the first DID (e.g., an owner of the second DID being an entity that created the first DID on behalf of the owner of the first DID). The DID document may define or point to resources defining a plurality of operations that can be performed with respect to the DID.

In some embodiments, a VC may provide verifiable online information about an entity's qualities, characteristics, relationships, and other relevant information. A VC may comprise descriptive text in a preset format (e.g., JSON-LD) that describes one or more declarations regarding a DID (e.g., age of the owner of the DID, educational background of the owner of the DID) and an endorsement of an entity for the declaration. A VC may comprise various properties such as contexts, identifiers, types, credential subject, issuer, issuance date, proofs, expiration, status, presentations, other suitable properties, or any combination thereof. The VC may specify a type of its claim, which may indicate a structure of the claim. This may facilitate automatic processing by the VC issuer and VC verifiers.

Owners of DIDs may participate in the identity management system in different roles. For example, an individual may desire to use the services provided by a business entity, which requires proof that the individual is over 18 years of age. The individual may be an owner of a DID and may request a VC issued by a government agency that provides verification of citizens' ages. The business entity may verify the VC to ascertain that the individual meets the age requirement. In this scenario, the individual may be a DID owner and a VC holder; the government agency may be a VC issuer, and the business entity may be a VC verifier. As another example, a user may issue a VC to a first business allowing the first business to use the user's data stored by a second business. In this case, the user may act as a VC issuer; the first business may act as a DID owner and VC holder; the second business may act as a VC verifier.

Some embodiments integrate various components, such as blockchain networks, cloud applications, agent services, resolver services, user applications, application programing interface (API) services, key management systems (KMS), identity authentication systems and other suitable components, to enable functionalities such as creation and authentication of DIDs and issuance and verification of VCs. In some embodiments, an online platform integrating one or more of these components may facilitate a business entity in smoothly creating DIDs and issuing VCs for its users. The business entity may interact with the online platform via one or more API interfaces and trust a plurality of cryptographic keys to the online platform. The online platform may offer agent services that perform various operations related to DIDs and VCs on behalf of the business entity and/or its users. Alternatively, the online platform may provide software development kits (SDKs) that can be integrated into applications of the business entity for directly performing operations related to DIDs and VCs. The online platform may also facilitate the business entity's management of relationships between DIDs, accounts maintained by the business entity, and identities of real-world individuals corresponding to the DIDs and accounts.

FIG. 1 illustrates a network environment associated with a blockchain in accordance with some embodiments. As shown, in the environment 100, a client-side computing device 111 may couple to a server end 118, and the server end 118 and a Node B may couple to a blockchain system 112 through various communication networks. Similarly, the server end 118 may optionally couple to more blockchain systems similar to the blockchain system 112 such as blockchain system 113, blockchain system 114, etc. Each blockchain system may maintain one or more blockchains.

In some embodiments, the client-side computing device 111 may comprise one or more servers (e.g., Node C) and one or more other computing devices (e.g., Node A1, Node A2, Node A3). Node A1, Node A2, and Node A3 may couple to Node C. In some embodiments, Node C may be implemented by an entity (e.g., website, mobile phone Application, organization, company, enterprise), which has various local accounts (e.g., local accounts assessed from Node A1, Node A2, Node A3). For example, a mobile phone Application may have millions of end-users accessing the Application's server from respective user accounts. The Application's server may correspondingly store millions of user accounts. The components of the client-side computing device 111 and their arrangement may have many other configurations.

In some embodiments, the blockchain system 112 may comprise a plurality of blockchain nodes (e.g., Blockchain Node 1, Blockchain Node 2, Blockchain Node 3, Blockchain Node 4, Blockchain Node i, etc.) that maintain one or more blockchains (e.g., public blockchain, private blockchain, consortium blockchain, etc.). Other blockchain systems (e.g., blockchain system 113, etc.) may comprise a similar arrangement of blockchain nodes maintaining another blockchain. Each blockchain node may be found in one or more blockchain systems. The blockchain nodes may include full nodes. Full nodes may download every block and blockchain transaction and check them against the blockchain's consensus rules. The blockchain nodes may form a network with one blockchain node communicating with another. The order and the number of the blockchain nodes as shown are merely examples for illustration. The blockchain nodes may be implemented in servers, computers, etc. For example, each blockchain node may be implemented in a server or a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

In some embodiments, Node B may include a lightweight node. A lightweight node may not download the complete blockchain, but may instead just download the block headers to validate the authenticity of the blockchain transactions. Lightweight nodes may be served by and effectively dependent on full nodes (e.g., blockchain nodes in the blockchain system 112) to access more functions of the blockchain. The lightweight nodes may be implemented in electronic devices such as laptops, mobile phones, and the like by installing an appropriate software. In one embodiment, Node B may send a blockchain transaction to the blockchain system 112 for adding to the blockchain.

In some embodiments, there may be many more client-side computing devices coupled to the server end 118 similar to client-side computing device 111. The server end 118 may provide Blockchain-as-a-Service (BaaS) and be referred to as a BaaS cloud. In one embodiment, BaaS is a cloud service model in which clients or developers outsource behind-the-scenes aspects of a web or mobile application. BaaS may provide pre-written software for activities that take place on blockchains, such as user authentication, database management, and remote updating. The BaaS cloud may be implemented in a server, server cluster, or other devices. In one embodiment, the BaaS cloud provides an enterprise-level platform service based on blockchain technologies. This service may help clients to build a secure and stable blockchain environment as well as manage the deployment, operation, maintenance, and development of blockchain easily. The service features high security, high stability, ease-of-use, and openness and sharing. Based on the abundant security strategies and multi-tenant isolation of cloud, the BaaS cloud can provide advanced security protection using chip encryption technologies. Based on highly reliable data storage, this service provides end-to-end and highly available services that can scale up quickly without interruption. The BaaS cloud can provide enhanced administrative functions to help clients to build an enterprise-level blockchain network environment. The BaaS cloud can provide native support for standard blockchain applications and data, support mainstream open-source blockchain technologies like Hyperledger Fabric and Enterprise Ethereum-Quorum, to build an open and inclusive technology ecosystem.

In the environment 100, each of the systems, nodes, and devices may be installed with appropriate software (e.g., application program interface) and/or hardware (e.g., wires, wireless connections) to access other devices of the environment 100. In general, the systems, nodes, and devices may be able to communicate with one another through one or more wired or wireless networks (e.g., the Internet) through which data can be communicated. Each of the systems, nodes, and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the systems, nodes, and devices are shown as separate components in this figure, it will be appreciated that these nodes and devices can be implemented as single devices or multiple devices coupled together. For example, Node B may be alternatively integrated into Blockchain Node 2.

The devices such as Node A1, Node A2, Node A3, Node B, and Node C may be installed with an appropriate blockchain software for initiating, forwarding, or accessing blockchain transactions. The term "blockchain transaction" may refer to a unit of task executed in a blockchain system and recorded in the blockchain upon verification. In some embodiments, the server end 118 may construct a blockchain contract based on information obtained from Node A1, A2, or A3. The server end 118 may add the blockchain contract in a blockchain transaction. After the server end 118 submits the blockchain transaction to the blockchain system, the blockchain nodes may verify the blockchain transaction for adding to the blockchain. If the blockchain transaction is added to the blockchain, the blockchain contract is deployed on the blockchain and initiated at a certain state. Through one or more additional blockchain transactions, the deployed blockchain contract may be invoked to update the certain state.

Blockchain transactions may be verified according to a consensus rule. For example, a POW (proof-of-work) consensus process is provided below. Notwithstanding, other types of consensus processes such as POS (proof-of-stake), DPOS (delegate-proof-of-stake), and PBFT (practical Byzantine Fault Tolerance) may be similarly applied to the disclosed systems and methods.

In some embodiments with respect to blockchain transaction verification, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from Node C. Once verified, the blockchain transaction may be stored in a database of the recipient blockchain node (e.g., Blockchain Node 1), which may also forward the blockchain transaction to one or more other blockchain nodes (e.g., Blockchain Node 3, Blockchain Node 4). Similarly, the each blockchain node may comprise or couple to a memory storing a database. The database may store a plurality of unconfirmed blockchain transactions. After receiving the blockchain transaction, the one or more other blockchain nodes may repeat the preliminary verification and broadcasting process done by the recipient blockchain node.

For verification, each blockchain node may select some of the blockchain transactions from the database according to its preference and form them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). To handle the blockchain contracts, each blockchain node of the blockchain network runs a corresponding VM and executes the same instructions in the blockchain contract. A VM is a software emulation of a computer system based on computer architectures and provides functionality of a physical computer. VM in the blockchain context can be understood as a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, that has been chosen based on another consensus rule, etc. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories.

As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, a deployed blockchain contract may be invoked to add or update certain information in the blockchain contract, thereby updating one or more states in the blockchain contract. In one embodiment, the one or more states of the blockchain contract may be retrieved from the blockchain by inquiring a corresponding blockchain transaction added to the blockchain. The most updated state may be reflected in the most recent relevant blockchain transaction. Notwithstanding the above, other types of blockchain systems and associated consensus rules may be applied to the disclosed devices and methods.

Figure 2:
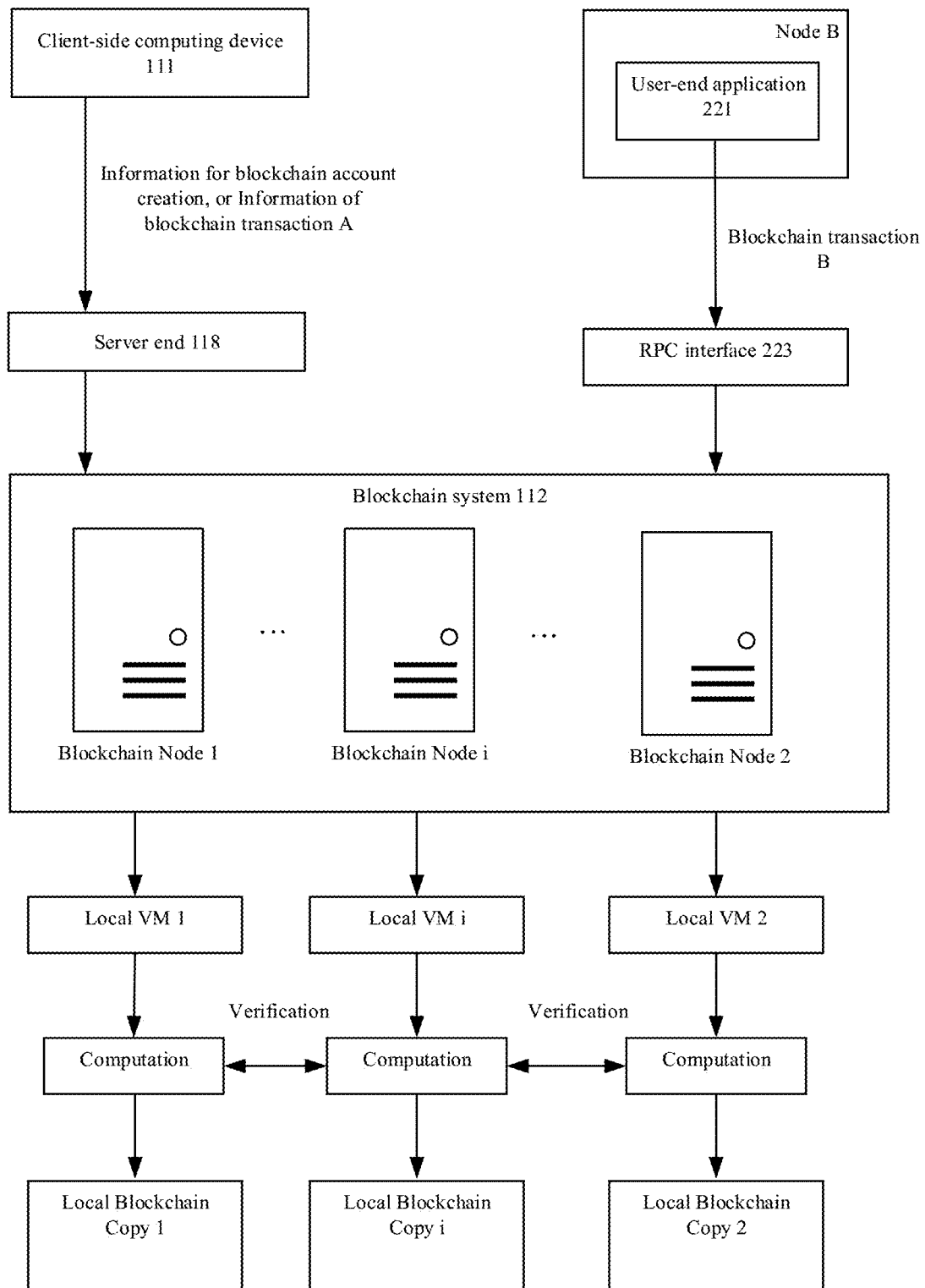
FIG. 2 illustrates a framework for implementing blockchain transactions in accordance with some embodiments.

FIG. 2 illustrates a framework for implementing blockchain transactions in accordance with some embodiments. In some embodiments, the client-side computing device 111 may transmit information to the server end 118. The information may be for creating a blockchain account, performing an action based on blockchain contract, etc. The blockchain may be maintained by the blockchain system 112. The server end 118 may construct a blockchain contract based on the information obtained from the client-side computing device 111. The server end 118 may add the blockchain contract in a blockchain transaction A. The server end 118 may sign the blockchain transaction on behalf of a user associated with the client-side computing device 111. For example, the blockchain transaction A may comprise information such as nonce (e.g., transaction serial number), from (e.g., a blockchain address of the user), to (e.g., empty if deploying a blockchain contract), transaction fee, signature (e.g., signature of the server end 118, signature of the user managed by the server end 118), value (e.g., transaction amount), data (e.g., the blockchain contract), etc. Then, the server end 118 may submit the blockchain transaction A to one or more blockchain nodes of the blockchain system 112 for adding to the blockchain.

After the blockchain transaction is added to the blockchain, the blockchain contract is deployed on the blockchain and initiated at a certain state. Through one or more additional blockchain transactions, the deployed blockchain contract may be invoked to update the certain state. In some embodiments, Node B may construct a signed blockchain transaction B and transmit it to the blockchain system 112 for execution. In one embodiment, the blockchain transaction B may be executed to invoke the deployed blockchain contract to update a state. In some embodiments, the blockchain transaction B may be programmed in source code at a user-end application 221. For example, a user or machine may program the blockchain transaction B. Node B may compile the source code using a corresponding compiler, which converts the source code into bytecode. The blockchain transaction B may comprise information such as nonce, from, to, transaction fee, value, signature, data, etc. Node B may send the blockchain transaction B to one or more blockchain nodes of the blockchain system 112 through a remote procedure call (RPC) interface 223 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, on receiving the blockchain transaction (e.g., blockchain transaction A or B), the recipient blockchain node may verify if the blockchain transaction is valid. For example, the signature and other formats may be verified. If the verification succeeds, the recipient blockchain node may broadcast the received blockchain transaction to the blockchain network including various other blockchain nodes. Some blockchain nodes may participate in the mining process of the blockchain transaction. The blockchain transaction may be chosen by a certain node for consensus verification to pack into a new block. If the blockchain transaction involves deploying a blockchain contract, the certain node may create a contract account for the blockchain contract in association with a contract account address. If the blockchain transaction involves invoking a deployed blockchain contract, the certain node may trigger its local VM to execute the received blockchain transaction, thereby invoking the deployed blockchain contract from its local copy of the blockchain and updating the states in the deployed blockchain contract. If the certain node succeeds in mining a new block, the certain node may broadcast the new block to other blockchain nodes.

Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM i, local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain transaction. Likewise, all other blockchain transactions in the new block will be executed. Lightweight nodes may also synchronize to the updated blockchain.

Figure 3:
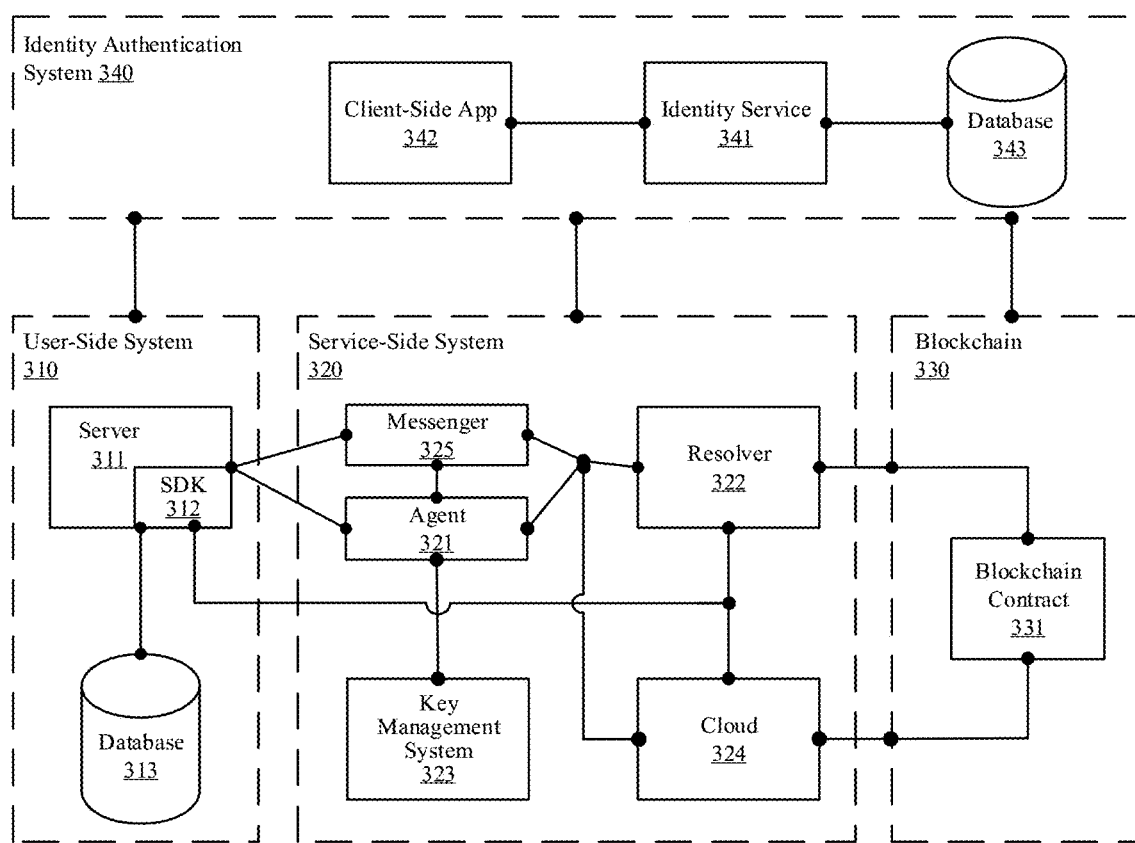
FIG. 3 illustrates a network environment associated with a system for blockchain-based cross-entity authentication in accordance with some embodiments.

FIG. 3 illustrates a network environment associated with a system for blockchain-based cross-entity authentication in accordance with some embodiments. In some embodiments, a user-side system 310 may correspond to an entity. The entity may be a business entity that provides one or more products or services to a plurality of users. The entity may also be an individual user, a group of users, an organization, other suitable entities, or any combination thereof. The use-side system 310 may comprise a plurality of computer systems, data stores, cloud services, mobile applications, other suitable components, or any combination thereof. The user-side system 310 may comprise a server 311 and a database 313. The database 313 may store data associated with a plurality of user accounts of the users of the entity. The entity corresponding to the user-side system 310 may desire to create and manage DIDs and VCs for itself as well as its users. It may comprise one or more software development kits (SDKs) 312 for managing creation and authentication of DIDs or issuance and verification of VCs.

In some embodiments, to implement functionalities associated with DIDs and VCs, the user-side system 310 may interface with a service-side system 320. In some embodiments, the service-side system 320 as illustrated in FIG. 3 may be equivalent to, be part of, or comprise one or more components of the server end 118 as illustrated in FIGS. 1 and 2. The service-side system 320 may comprise one or more messengers 325, one or more agents 321, one or more resolvers 322, one or more key management systems 323, one or more clouds 324, other suitable components or any combination thereof. The agent 321 may provide various services or applications related to DIDs or VCs and maintain databases mapping account information or other business data from the user-side system 310 to DIDs, VCs, or other information or data stored on one or more blockchains. The agent 321 may provide one or more application programming interfaces (APIs), which may be used by the user-side system 310 to directly submit requests related to DIDs or VCs. The agent 321 may manage communications between the user-side system 310 and the resolver 322 and the cloud 324. The messenger 325 may provide notifications related to DIDs, VCs, or other information or data stored on one or more blockchains for the user-side system 310.

In some embodiments, the agent 321 may be coupled to a key management system (KMS) 323. The KMS 323 may generate, distribute, and manage cryptographic keys for devices and applications. It may cover security aspects from secure generation of keys over the secure exchange of keys to secure key handling and storage. The functionalities of the KMS 323 may include key generation, distribution, and replacement as well as key injection, storing, and management. The KMS 323 may comprise or be coupled to a trusted execution environment (TEE). The TEE may be an isolated area on the main processor of a device that is separate from the main operating system. The TEE may provide an isolated execution environment offering security features such as isolated execution, integrity of applications executing with the TEE, along with confidentiality of their assets. It may guarantee code and data loaded inside to be protected with respect to confidentiality and integrity. In some embodiments, the KMS 323 may generate one or more cryptographic key pairs in the TEE. Before outputting the cryptographic key pair, the TEE may encrypt the private key. The encryption of the private key can be based on various methods or standards, such as Data Encryption Standard (DES), TripleDES, RSA, Advanced Encryption Standard (AES), Twofish, etc. The KMS 323 may store the encrypted private key in association with the public key. To use the private key, the KMS 323 may feed the encrypted private key to the TEE for decryption and processing.

In some embodiments, the agent 321 may be coupled to a resolver 322, which may comprise software applications for managing interactions between the agent and a blockchain 330 in transactions related to DIDs or VCs (e.g., correspondence between a DID and a DID document). Herein, depending on the context, the blockchain 330 may refer to a blockchain system that comprises a decentralized network of nodes that store a ledger of records and participate in a consensus process for adding data to the ledger of records or the ledger of records stored, maintained, or updated by the decentralized network of nodes. When referring to a blockchain system, the blockchain 330 may comprise, be part of, or be embodied in one or more of the blockchain systems 112, 113, and 114 illustrated in FIGS. 1 and 2. The resolver 322 may be part of or coupled to the one or more cloud-based services. The one or more cloud-based services may be associated with a blockchain-as-a-service (BaaS) cloud 324 or other suitable cloud services. The BaaS cloud 324 may constitute a platform that offers various interfaces to one or more blockchains 330. It may receive inputs from an external application and facilitate the creation and execution of operations such as blockchain transaction deployment, blockchain contract creation and execution, blockchain account creation based on the inputs. The BaaS cloud 324 may also obtain information and data from one or more blockchains 330 and feed the information and data to one or more other systems using the BaaS cloud 324. In some embodiments, the agent 321 may be directly coupled to the cloud 324 to use its services. In some embodiments, one or more of the agent 321, the resolver 322, and the KMS 323 may be integrated as part of the BaaS cloud 324 or another suitable online platform.

In some embodiments, the resolver 322 and cloud 324 may be coupled to a blockchain 330. The blockchain 330 may comprise one or more blockchain contracts 331. One or more of the blockchain contracts 331 may be configured to be executed by a virtual machine associated with the blockchain 300 to perform one or more operations associated with DIDs and VCs. The operations may comprise creating a new DID, storing a DID document, updating a DID document, identifying a DID document based on a DID, storing information associated with a VC, retrieving information associated with a VC, other suitable operations, or any combination thereof. The resolver 322 and cloud 324 may be configured to deploy one or more transactions on the blockchain 330 that invoke one or more of the blockchain contracts 331. The transactions may trigger one or more operations related to DIDs and VCs.

In some embodiments, the messenger 325 may be coupled to the agent 321, the resolver 322, and the user-side system 310. The messenger 325 may obtain notifications from the resolver 322, and provide the notifications to the user-side system 310.

In some embodiments, the network environment may comprise an identity authentication system 340. The identity authentication system 340 may be used to establish mapping relationships between DIDs and real-world identities. The identity authentication system 340 may be associated with an entity performing identity authentication for individuals or entities. The identity authentication may be performed based on documents, photos, or other suitable materials provided by an individual or entity. The identity authentication may also be performed based on data that is collected directly, such as photos, fingerprints, password inputs, other suitable data, or any combination thereof. The identity authentication system 340 may be coupled to the user-side system 310 and/or the service-side system 320. The identity authentication system 340 may receive one or more requests from the user-side system 310 or the service-side system 320 for proofs of identity authentication. In response, the identity authentication system 340 may perform any necessary identity authentication and send the proofs of identity authentication back to the requester. The proofs of identity authentication may comprise, for example, a confirmation message, a security key, a unique identification code, other suitable proofs, or any combination thereof. In some embodiments, the identity authentication system 340 may be coupled to a blockchain system. The blockchain system connected to by the identity authentication system 340 may be the blockchain system 330 that is coupled to the service-side system 320. Alternatively, although FIG. 3 illustrates the identity authentication system 340 to be coupled to the blockchain system 330, this disclosure contemplates the scenario in which the identity authentication system 340 is coupled to a different blockchain system. The identity authentication system 340 may have access to the blockchain 330 or another suitable blockchain directly or via an intermediate system (e.g., the BaaS cloud 324).

The identity authentication system 340 may comprise an identity service 341, which may be implemented on one or more servers or cloud platforms. In some embodiments, the identity service 341 may be implemented as part of the service-side system 320 (e.g., the cloud 324). In other embodiments, the identity service 341 may be implemented on a system separate from the service-side system 320. The identity service 341 may be configured to process requests for identity authentication, to control a client-side application 342 to collect identity data, to generate proofs of identity authentication, to store or access identity information in a database 343, to perform one or more operations on the blockchain 330 (e.g., obtain identity information, store proof of identity authentication). In some embodiments, the identity authentication system 340 may comprise a client-side application 342 that is connected to the identity service 341 via a network. The client-side application 342 may be dedicated to identity authentication or may incorporate identity authentication as one of its functions along with one or more other functions. The client-side application 342 may be configured to collect data associated with a user. The client-side application 342 may further be configured to compare collected data with pre-stored data corresponding to a purported identity of a user to authenticate the identity of the user. In some embodiments, the identity authentication system 340 may comprise a database 343 connected to the identity service 341. The database 343 may store identity information associated with a plurality of individuals or entities. The identity information may comprise, for example, a proof of identity authentication, visual features of a person, voice features of a person, a fingerprint of a person, a signature of a person, a password associated with an identity, other suitable identity information, or any combination thereof.

Figure 4:
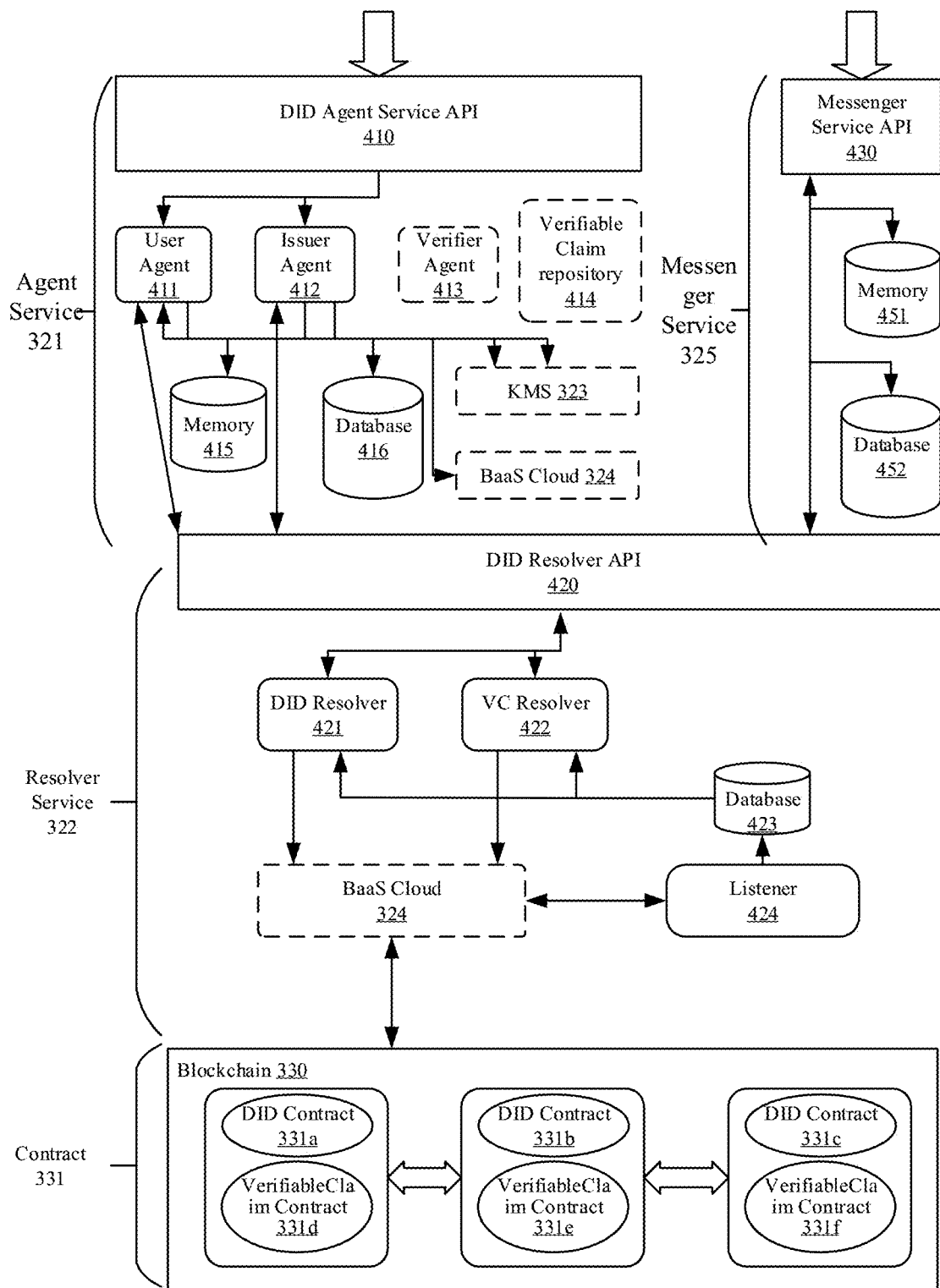
FIG. 4 illustrates an architecture associated with a system for blockchain-based cross-entity authentication in accordance with some embodiments.

FIG. 4 illustrates an architecture associated with a system for blockchain-based cross-entity authentication in accordance with some embodiments. In some embodiments, the system may comprise three main components, one or more agent services 321, one or more resolver services 322, one or more messenger services 325, and one or more blockchain contracts 331. The one or more agent services 321 may be configured to process requests related to DIDs and VCs that are received from users. The one or more agent services 321 may manage mapping relationships between account information on user-side systems 310 and DIDs of the owners of the accounts. The agent services 321 may comprise a DID agent service API 410 for receiving DID-related requests from user-side systems 310. Depending on the nature of a request, it may be fed to a user agent 411 for performing operations such as creation and authentication of DIDs or an issue agent 412 for performing operations such as issuance of VCs. The requests from a party desiring to verify a VC may be fed to the verifier agent 413. The one or more agent services 321 may also provide a verifiable claim repository 414 for storing one or more VCs. The agent services 321 may also use one or more memories 415 and one or more databases 416. The agent services 321 may be coupled to a KMS 323 and a BaaS Cloud 324. The agent services 321 may be coupled to the resolver services 322.

In some embodiments, one or more agents of the agent services 321 may send one or more requests to a DID resolver API 420 associated with the resolver services 322. The resolver services 322 may be configured to process interactions between the agent services 321 and the blockchain 330. The resolver services 322 may perform operations such as obtaining data from the blockchain 300, adding data to the blockchain 330, creating blockchain contracts 331, deploying transaction to the blockchain 330 to invoke blockchain contracts 331, other suitable operations, or any combination thereof. The resolver services 322 may comprise a DID resolver 421 configured to manage DIDs and DID documents stored on the blockchain 330 and a VC resolver 422 configured to manage VCs for DIDs created based on the blockchain 330. The resolver services 322 may also comprise a listener 424 for obtaining data from the blockchain 331. The listener 424 may store obtained data to a database 423. The data may be used by the DID resolver 421 and the VC resolver 422. The DID resolver 421, VC resolver 422, and listener 424 may be coupled to a BaaS cloud 324 for interactions with the blockchain 330.

In some embodiments, the messenger services 325 may comprise a messenger service API 430 for receiving queries from the user-side system 310 and for providing notifications to the user-side system 310. The messenger service API 430 may obtain notifications placed in a message queue by the DID resolver API 420. The message queue may be stored in a database 452. The messenger service API 430 may filter and categorize the obtained notifications and store in a memory 451.

In some embodiments, the blockchain 330 may comprise one or more blockchain contracts (331a, 331b, 331c) for managing DIDs and DID documents and comprise one or more contracts (331d, 331e, 331f) for managing VCs. The contracts may be executed by one or more virtual machines associated with the blockchain 330 to perform operations such as creating DIDs, storing DID documents, updating DID documents, storing information associated with VCs, other suitable operations, or any combination thereof.

Figure 5:
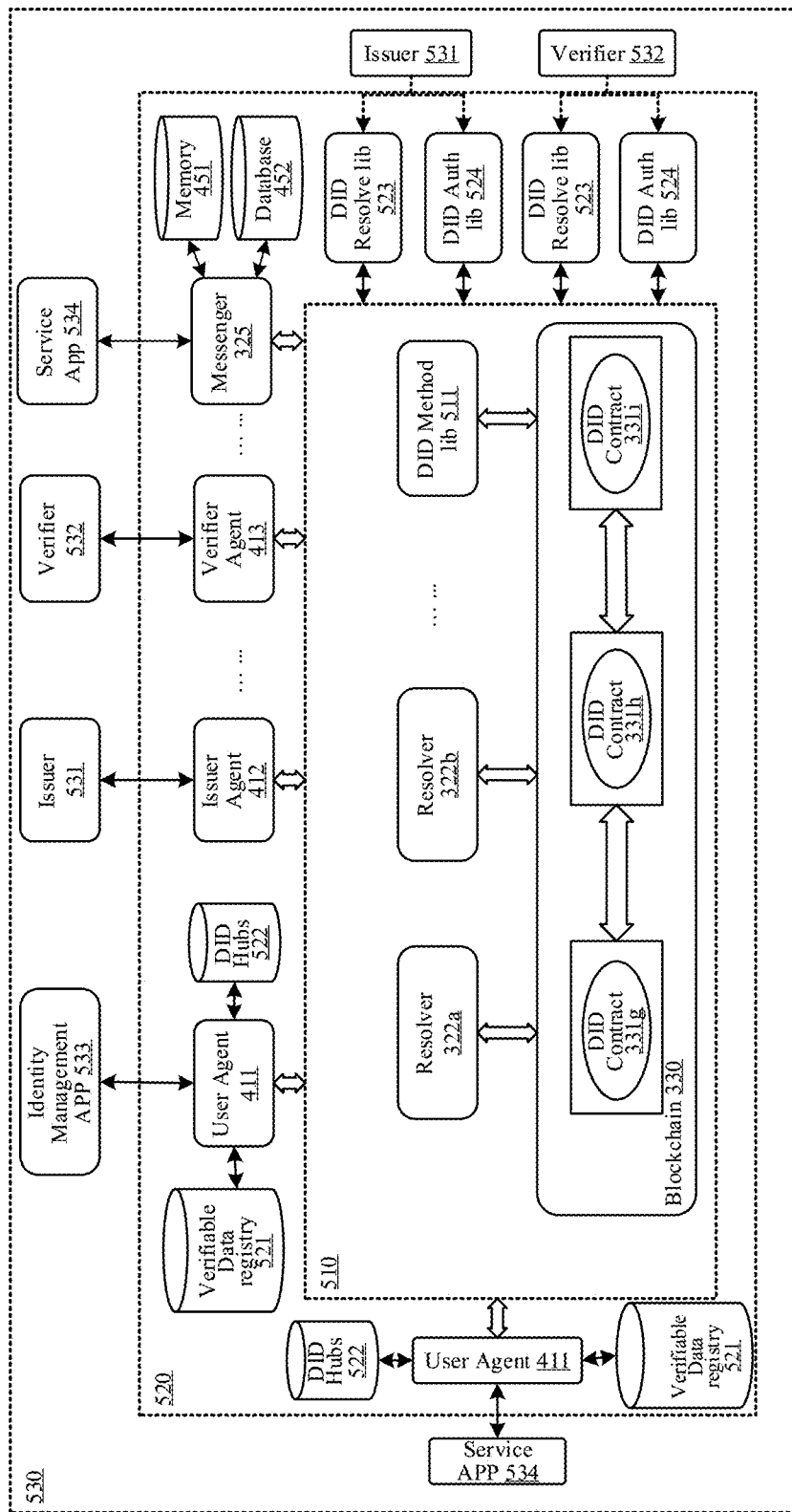
FIG. 5 illustrates a network environment associated with a system for implementing various examples of functionalities associated with decentralized identifiers and verifiable claims in accordance with some embodiments.

FIG. 5 illustrates a network environment associated with a system for implementing various examples of functionalities associated with decentralized identifiers and verifiable claims in accordance with some embodiments. Components of the network environment may be categorized into three layers 510, 520, and 530. In some embodiments, the bottom or core layer 510 may comprise one or more blockchains 330, which may comprise one or more blockchain contracts (331g, 331h, 331i) that can be executed to perform operations related to DIDs and VCs. The blockchain 330 may store a plurality of DIDs and a plurality of DID documents corresponding to the DIDs. The blockchain contracts (331g, 331h, 331i) may be configured to manage mapping relationships between DIDs and DID documents, as well as creation and changes to DID documents. The blockchains 330 may be accessible to one or more resolvers (322a, 322b) for operations related to DIDs and VCs. The resolvers (322a, 322b) may be configured to provide to an external system services such as searching for DID documents or data contained in DID documents based on inputted DIDs. One or more method libraries 511 may also be available for external systems to adopt to interact with the blockchain 330.

In some embodiments, the middle or enhancement layer 520 may comprise one or more user agents 411, one or more issuer agents 412, or one or more verifier agents 413. The middle or enhancement layer 520 may further comprise a messenger 325 coupled to a memory 451 and a database 452. In some embodiments, the blockchain 330 may comprise a consortium blockchain, which may or may not be directly accessible to users that are not consensus nodes of the consortium blockchain. A user agent 411 may provide an interface for an ordinary user to interact with the blockchain. In some embodiments, the user agent 411 may be configured to create one or more DIDs, authenticate one or more DIDs, interact with one or more verifiable data registry 521 or one or more DID hubs 522, send notifications to an owner of a DID, perform other suitable functionalities, or any combination thereof. Here, a DID hub 522 may comprise a system in which an owner of a DID stores its sensitive data. The owner may grant certain other entities (e.g., institutions issuing verifiable claims) access to data stored in the DID hub 522. A verifiable data registry 521 may comprise a VC repository for storing and managing the VCs issued to an owner of a DID. An issuer agent 412 may comprise one or more APIs (e.g., REST API) or SDKs. The issuer agent 412 may be configured to issue one or more verifiable claims, withdraw one or more verifiable claims, check and inspect an existing verifiable claim, publish a template for verifiable claims, maintain a template for verifiable claims, perform other suitable operations, or any combination thereof. A verifier agent 413 may comprise one or more APIs (e.g., REST API) or SDKs and be configured to verify a verifiable claim or perform one or more other suitable operations. In some embodiments, the layer 520 may also comprise one or more code libraries (e.g., DID resolve library 523, DID authentication library 524) that can be adopted and used to interact with the DID resolvers 322 or directly with the blockchain 330. The code libraries may be packaged into one or more SDKs and be used to perform functionalities such as DID authentication, interactions with the blockchain 300, or interfacing with blockchain contracts 331. The issuer agent 412 and verifier agent 413 may be used by key participants in the network environment associated with DIDs and VCs such as entities able to perform know-your-customer (KYC) authentication or endorsement for users or to issue or verify verifiable claims (e.g., government institutions, banks, financial service providers). The key participants may provide third-party services that can be integrated via connections with the issuer agent 412, the verifiable agent 413, or other suitable components of the network environment.

In some embodiments, the upper or extension layer 530 may comprise one or more external services or applications related to DIDs and VCs. The services or applications may comprise one or more issuer applications 531, one or more verifier applications 532, an identity management application 533, a service application 534, one or more other suitable services or applications, or any combination thereof. An issuer application 531 may correspond to an entity (e.g., government institution, banks, credit agency) issuing verifiable claims signed or endorsed by the entity for users. The issuer application 531 may operate on a user-side system 310. The issuer application 531 may comprise an issuer verifiable claim manager service which may allow an issuer to manage issued VCs, maintain their status (e.g., validity), or perform other suitable operations. The issuer application 531 may interact with the layers 510 and 520 via a connection or interface with the issuer agent 412 or one or more code libraries 523 and 524. A verifier application 532 may correspond to an entity (e.g., service provider, credit issuer) needing to verify verifiable claims to ascertain a user's information (e.g., identity, age, credit score). The verifier application 532 may operate on a user-side system 310. The verifier application 532 may interact with layers 510 and 520 via a connection or interface with the verifier agent 413 or one or more code libraries 523 and 524. The identity management application 533 may be installed on a client device or terminal associated with a user. The user may be a DID owner, which may be an individual, a business, an organization, an application, or any other suitable entity. The identity management application 533 may allow a user to manage cryptographic key pairs associated with DIDs, original data, or VCs, to receive notifications from a user agent 411, to authenticate a DID, to grant access to data, to use a VC, to perform other suitable operations, or any combination thereof. The identity management application 533 may interact with the layers 510 and 520 via a connection or interface with the user agent 411. The service application 534 may also be coupled to the user agent 411 and be configured to manage functions related to DIDs or VCs for one or more users or accounts. The service application 534 may also be coupled to the messenger 325 and be configured to send queries for one or more DIDs and to obtain corresponding notifications.

FIGS. 6-10 illustrate example operations associated with DIDs or VCs performed by one or more user-side systems 310, one or more service-side systems 320, one or more resolvers 322, one or more clouds 324, one or more messengers 325, or one or more blockchain systems 330. In some embodiments, a user-side system 310 may manage one or more DIDs or one or more VCs by interfacing with a service-side system 320 (e.g., comprising, e.g., a DID resolver 322) and a blockchain 330 storing DIDs and DID documents. The user-side system 310 may use one or more SDKs 312 for managing DIDs that are compatible with methods associated with the DIDs. The SDKs 312 may be integrated with one or more applications used by the user-side system 310. The user-side system 310 may also interface with one or more service endpoints for storing verifiable claims, one or more service endpoints for storing status information for verifiable claims, one or more service endpoints for authentication of DIDs, other suitable systems, or any combination thereof.

Figure 6A:
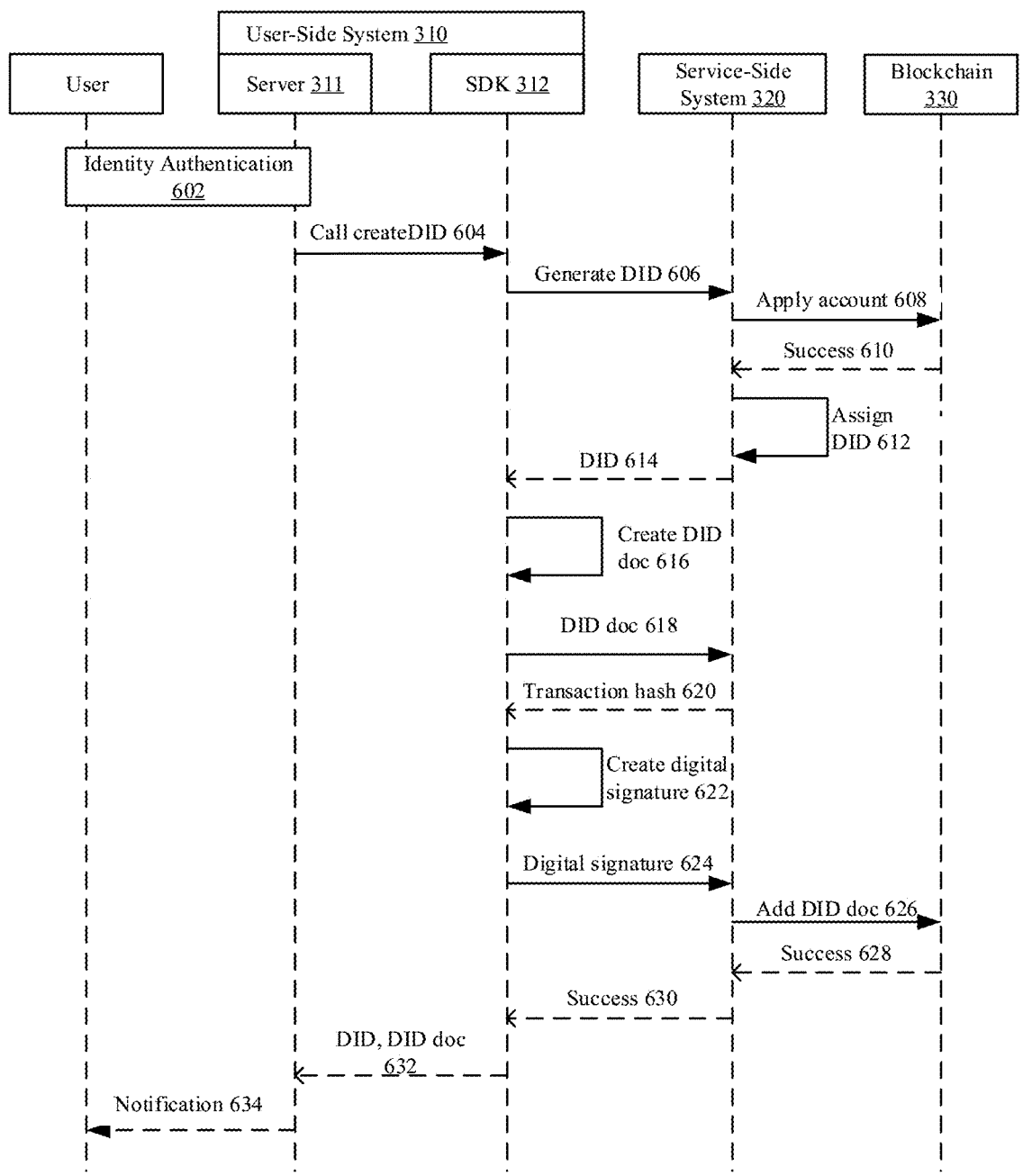
FIGS. 6A and 6B illustrate methods for creating a decentralized identifier in accordance with some embodiments.
Figure 6B:
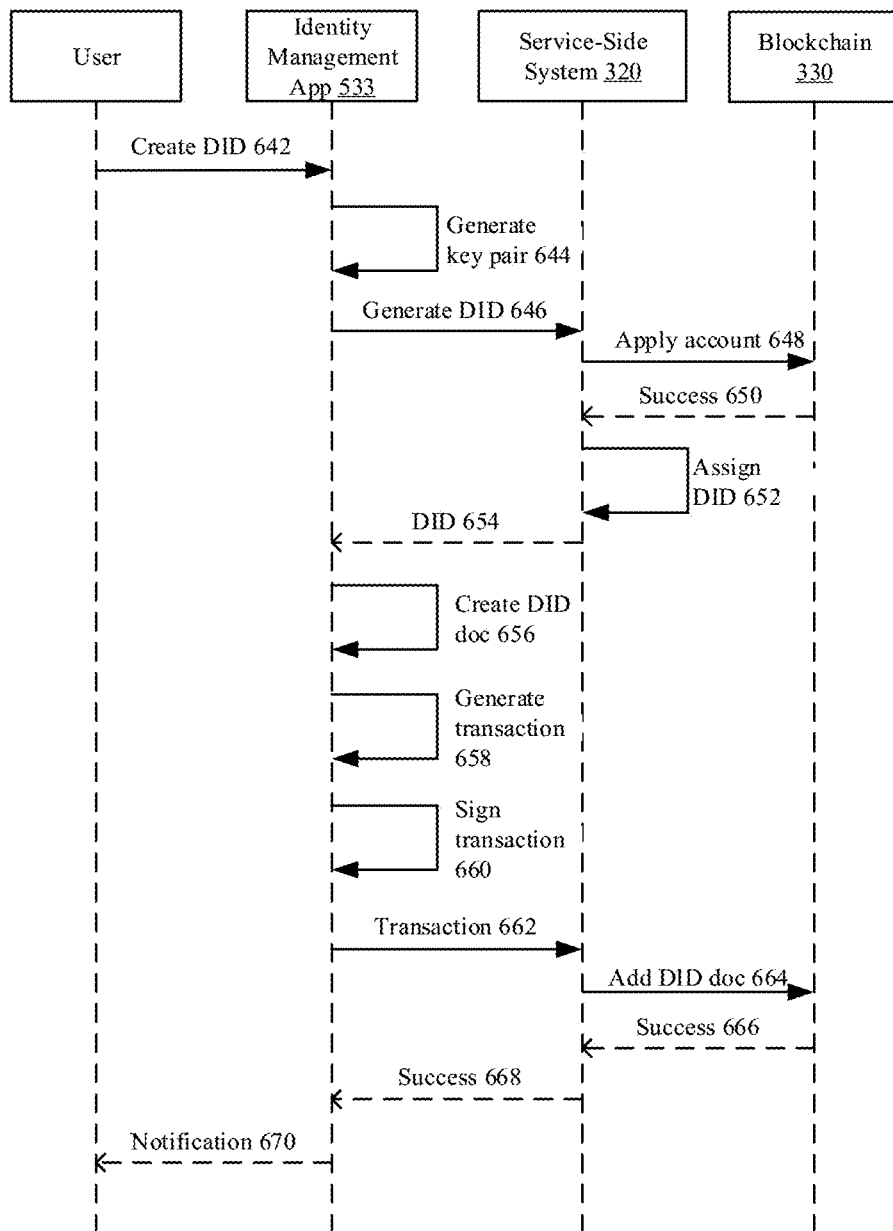

FIGS. 6A and 6B illustrate methods for creating a decentralized identifier in accordance with some embodiments. The operations of the methods presented below are intended to be illustrative. Depending on the implementation, the methods may include additional, fewer, or alternative steps performed in various orders or in parallel. Furthermore, one or more steps performed in either of methods 6A and 6B may be replaced with one or more suitable steps performed in the other method. The devices or systems performing certain steps as illustrated in FIGS. 6A and 6B may also be substituted by other suitable devices or systems to perform the same steps. The suitable devices or systems may comprise sub-systems, parent systems, or counterpart systems with similar functionalities. As an example, one or more steps performed by the user-side system 310 in FIG. 6A may be performed by the identity management application 533 in FIG. 6B and vice versa. As another example, one or more steps performed by the service-side system 320 may be performed by the resolver 322, which may be a sub-system of the service-side system 320. Although this specification describes particular devices or systems performing particular steps, this specification contemplates any suitable devices or systems performing any suitable steps for creating a decentralized identifier.

In some embodiments, as illustrated in FIG. 6A, the user-side system 310 may create a DID for each of one or more of its users. The user-side system 310 may control the cryptographic key pair associated with the DID and use the cryptographic key pair to perform various operations related to the DID including, for example, signing blockchain transactions, signing verifiable claims, or authentication of the DID. The user-side system 310 may comprise an SDK 312 for performing the various operations. The SDK 312 may also manage various interactions between the user-side system 310 and various interfaces provided by the service-side system 320. The interfaces may comprise an interface for assignment of DIDs, an interface for creation of DID documents, an interface for adding DID documents to the blockchain 330, an interface for searching DID documents, other suitable interfaces, or any combination thereof. The interfaces may be provided by way of, for example, software programs and network ports. In response to requests received at the interfaces, the service-side system 320 may perform corresponding operations and return results via the interfaces to appropriate external systems. The method illustrated in FIG. 6A may start at step 602, in which a server 311 of a user-side system 310 may obtain identity authentication of a user for whom it is going to obtain a DID. The identity authentication may have been performed by the identity authentication system 340 or another suitable system. In other embodiments, the user-side system 310 may have obtained a proof of identity authentication for the user from an identity authentication system 340. The proof of identity authentication for the user may comprise a proof of real-name authentication (e.g., based on government-issued identity documents), a proof of real-person authentication (e.g., based on a photo of the user taken based on instructions of the identity authentication system 340), a proof of other identity authentication, or any combination thereof. The user-side system 310 may also generate or retrieve a cryptographic key pair including a public key and a private key for use to create the DID.

At step 604, the server 311 may invoke a functionality of an SDK 312 for creating a new DID. The server 311 may provide various information to the SDK 312 for invoking the functionality. The information may comprise an account identifier for the user corresponding to the to-be-created DID, a public key or private key of the cryptographic key pair generated for the DID, specification of one or more services associated with the to-be-created DID, a callback network address associated with the server 311 for return of confirmations or other communications, other suitable information, or any combination thereof. The account identifier may correspond to a business or service account of the user with an entity associated with the user-side system 310. At step 606, the user-side system 310 may send a request for creating a new DID to the service-side system 320 using the SDK 312. The service-side system 320 may thereby obtain the request for creating a DID. The request may comprise a public key of a cryptographic key pair, which may have been generated by the user-side system 310. FIG. 6A illustrates a scenario where the request for creating the DID is received from a computing device associated with a first entity (e.g., user-side system 310) for creating the DID on behalf of a second entity (e.g., user). The request may further comprise, in addition to the public key, an account identifier associated with the second entity (e.g., user), profile information associated with the second entity (e.g., user), information about one or more services associated with the DID, a callback address associated with the first entity (e.g., user-side system 310) or the second entity (e.g., user), other suitable information, or any combination thereof. An alternative scenario is illustrated in FIG. 6B where the request for creating the DID is received directly from a computing device associated with an entity to own the DID. In some embodiments, the request may be in the form of an application programming interface (API) message to one or more of the interfaces provided by the service-side system.

In response to the request obtained from the user-side system 310, the service-side system 320 may create, based on the public key in the request, a blockchain account associated with a blockchain 330. At step 608, the service-side system 320 may send a request to the blockchain system 330 for creating a new blockchain account. Here, the request may be directly sent to one or more blockchain nodes of the blockchain 330 in the form of one or more blockchain transactions or be sent via a BaaS Cloud 324 or other suitable interface systems associated with the blockchain 330. After sending the request, at step 610, the service-side system 320 may obtain an indication from blockchain 330 that a new blockchain account has been created. The blockchain account may be associated with an address on the blockchain 330. The service-side system 320 may obtain information associated with the newly-created blockchain address.

Then, the service-side system 320 may create a DID based on information associated with the blockchain account. At step 612, the service-side system 320 may assign a DID to the user based on the blockchain account. The service-side system 320 may assure that the assigned DID is unique by determining that the DID is not duplicative of any existing DID associated with the blockchain 330. According to this embodiment, the DID may be assigned and determined to be unique prior to the construction or upload of a DID document corresponding to the DID. This may effectively prevent potential failed attempts to upload the DID document due to duplication of the DID, and thus save processing and computation efforts in creating and uploading the DID document. The service-side system 320 may associate the DID with the user's account with the user-side system 310 by storing a mapping relationship between the account identifier and the created DID. The service-side system 320 may further store a status of the DID. As an example and not by way of limitation, the status of the DID may indicate whether the DID has been registered to the blockchain 330 or whether a corresponding DID document has been stored in the blockchain 330. At step 614, the service-side system 320 may send a message back to the SDK 312 associated with the user-side system 310. The message may comprise information associated with the newly created DID.

At step 616, the user-side system 310 may use the SDK 312 to create a DID document associated with the DID. The DID document may comprise information associated with the DID such as the public key associated with the DID, authentication information associated with the DID (e.g., one or more authentication methods), authorization information associated with the DID (e.g., a DID associated with a controller), delegation information associated with the DID (e.g., one or more delegation methods), one or more services associated with the DID (e.g., one or more types of services such as credential repository service and agent service), one or more service endpoints associated with the DID (e.g., URI for each of one or more service endpoints), other suitable information, or any combination thereof. The SDK 312 may create the DID document based on information received from the server 311 when the server 311 invokes the SDK 312 at step 604. The user-side system 310 may further use the SDK 312 to create a blockchain transaction for adding the DID document to the blockchain 330. The blockchain transaction created at this stage may or may not be complete and valid. In some embodiments, the blockchain transaction created by the user-side system 310 may lack information associated with the blockchain 330, one or more blockchain contracts associated with the blockchain 330, a digital signature, other suitable information, or any combination thereof.

At step 618, the SDK 312 may send the DID document to service-side system 320. If the SDK 312 has created a blockchain transaction, it may send the blockchain transaction to the service-side system 320, which may comprise the DID document. At this step, the SDK 312 may request the service-side system 320 to provide a hash value associated with a completed but unsigned blockchain transaction for adding the DID document to the blockchain 330. After obtaining the DID document corresponding to the DID from the user-side system 310, the service-side system 320 may generate or complete a blockchain transaction for adding the DID document to the blockchain 330. The blockchain transaction may invoke a blockchain contract 331 previously deployed on the blockchain 330 for managing relationships between DIDs and corresponding DID documents. The blockchain contract 331 invoked may comprise one or more interfaces, such as an interface for adding one or more DID documents to the blockchain 330. The one or more interfaces of the blockchain contract 331 may comprise executable code corresponding to one or more executable functions of the blockchain contract 331. To generate the blockchain transaction, the service-side system 320 may include one or more information items in the blockchain transaction. The one or more information items may comprise an address associated with the blockchain 330, an identifier of a blockchain contract 331 associated with the blockchain transaction, version information of the blockchain contract 331 associated with the blockchain transaction, information of one or more interfaces of the blockchain contract 331 associated with the blockchain transaction, other suitable information, or any combination thereof. The information added by the service-side system 320 to the blockchain transaction may comprise public or other suitable information associated with the blockchain system 330, blockchain contracts on the blockchain 330, or other information necessary for creating a valid blockchain transaction. The service-side system 320 may automatically populate such information and relieve the user-side system 310 of the burden of keeping track of such information. This may reduce the technical capabilities required for the user-side system 310 to add a DID document to the blockchain 330.

The blockchain transaction generated by the service-side system 320 based on the DID document received from the user-side system 310 may be unsigned at this stage. The service-side system 320 may determine a hash value of the unsigned blockchain transaction according to a hash function acceptable to the blockchain system 330. At step 620, the service-side system 320 may send the hash value of the unsigned blockchain transaction to the user-side system 310. Then, at step 622, the SDK 312 associated with the user-side system 310 may create a digital signature on the hash value. As an example, the digital signature may be created by encrypting the hash value using the private key of the cryptographic key pair associated with the owner of the DID that is received from the server 311. At step 624, the SDK 312 may return the digital signature to the service-side system 320, thereby authorizing the blockchain transaction. After receiving the digital signature from the user-side system 310 at step 624, the service-side system 320 may add the digital signature to the unsigned blockchain transaction to generate or complete the blockchain transaction for adding the DID document to the blockchain. Then, at step 626, the service-side system 320 may send the blockchain transaction to one or more blockchain nodes associated with the blockchain 330 for adding to the blockchain. At step 628, the service-side system 320 may obtain information from the blockchain 330 confirming successful storage of the DID document in the blockchain 330. At step 630, the service-side system 320 may return a confirmation message to the SDK 312. The confirmation message may comprise the DID and DID document that have been created. Then, at step 632, the SDK 312 may provide the DID and DID document to the server 311. Here, the SDK 312 may send information associated with the DID and the DID document based on information associated with the callback address received from the server 311. At step 634, the server 311 may send the user a notification confirming successful creation of the DID and the corresponding DID document.

In some embodiments, as illustrated in FIG. 6B, a user may create a DID for itself using one or more interfaces provided by the service-side system 320 and without using a service provided by a user-side system 310. The user may comprise an individual, a business, an organization, another suitable entity, or any combination thereof. As an example, the user may use an identity management application 533 or another suitable software or hardware system to interact with the service-side system 320. The identity management application 533 may be developed by an entity associated with the service-side system 320 and provided for installation on a client device associated with the user. The identity management application 533 may be configured to manage interactions with various interfaces provided by the service-side system 320. The method illustrated in FIG. 6B may start at step 642, the user may provide one or more inputs to the identity management application 533 in order to request creation of a DID for the user. The identity management application 533 may request inputs from the user verifying the real-world identity of the user. Alternatively, the identity management application 533 may have obtained identity authentication information associated with the user previously and may be configured to retrieve such information, for example, when the user logs in the identity management application 533.

At step 644, the identity management application 533 may generate a cryptographic key pair for the user. The cryptographic key pair may comprise a public key and a private key to be used to create the DID associated with the user. At step 646, the identity management application 533 may send a request for creating a new DID to the service-side system 320. At step 648, the service-side system 320 may send a request to a blockchain system 330 for creating a new blockchain account. Here, the request may be directly sent to one or more blockchain nodes of the blockchain 330 in the form of one or more blockchain transactions or be sent via a BaaS Cloud 324 or other suitable interface systems associated with the blockchain 330. Then, at step 650, the service-side system 320 may obtain from the blockchain 330 information indicating that a new blockchain account has been created. The blockchain account may be associated with an address on the blockchain 330. The information obtained by the service-side system 330 may comprise information associated with the newly-created blockchain address. It may comprise information sufficient to create the DID. At step 652, the service-side system 320 may assign a unique DID to the user according to information associated with the blockchain account. At step 654, the service-side system 320 may send a message back to the identity management application 533. The message may comprise information associated with the newly created DID.

In some embodiments, a DID document may be created and stored on the blockchain 330. At step 656, the identity management application 533 may generate a DID document and add the public key associated with the newly-created DID and other suitable information (e.g., authentication information) to the DID document. The identity management application 533 may add information associated with one or more service endpoints (e.g., information associated with an authentication service endpoint, information associated with a verifiable claim repository) to the DID document. The authentication service endpoint and the verifiable claim repository may be provided as part of the service-side system 320 or be provided by third-party systems. Then, at step 658, the identity management application 533 may generate one or more blockchain transactions for adding the DID document to the blockchain 330. The identity management application 533 may generate a hash value of the blockchain transaction and generate a digital signature for the transaction using the private key associated with the DID at step 660. Alternatively, the identity management application 533 may interact with the service-side system 320 in a manner similar to the interactions between the user-side system 310 and the service-side system 320 as illustrated by steps 618, 620, and 622 of FIG. 6A in order to generate and sign the blockchain transaction. At step 662, the identity management application 533 may send the DID document as well as the blockchain transaction to the service-side system 320 for sending to the blockchain system 330. At step 664, the service-side system 320 may send the one or more transactions to the blockchain system 330. The one or more transactions may invoke a blockchain contract 331 for managing DIDs and DID documents on the blockchain 330. At step 666, the service-side system 320 may obtain information from the blockchain 330 indicating that the DID document has been successfully stored. At step 668, the service-side system 320 may forward a confirmation to the identity management application 533. At step 670, the identity management application 533 may provide a notification comprising information associated with the created DID and DID document for display to the user.

FIG. 7 illustrates a method for authenticating a decentralized identifier using DID authentication services in accordance with some embodiments. The operations of the method presented below are intended to be illustrative. Depending on the implementation, the method may include additional, fewer, or alternative steps performed in various orders or in parallel. In some embodiments, a user owning a DID may use DID authentication services provided by a business entity to achieve authentication of its ownership of the DID. The owner may trust a public-private key pair corresponding to the DID to the business entity for storage. The owner may provide a network location (e.g., identified by a URL) of the DID authentication services as a service endpoint for authentication of the DID. The location identifier of the DID authentication services may be included in a "service" field of the DID document associated with the DID.

In some embodiments, a verifier 532 (e.g., a service provider needing to verify information of a customer) may initiate a DID authentication process using an SDK 312. At step 702, the verifier 532 may obtain the DID provided by a purported owner. At step 704, the verifier 532 may call the SDK 312 to create a DID authentication challenge. The verifier 532 may input to the SDK 312 the DID to be authenticated and a network address (e.g., a URL) to which a response to the challenge is to be sent. At step 706, the SDK 312 may send a query to a resolver 322 for the DID document associated with the DID to be authenticated. At step 708, the resolver 322 may formulate a blockchain transaction invoking a blockchain contract 331 for managing DIDs and send the blockchain transaction to one or more blockchain nodes associated with the blockchain 330 for execution. As a result, the resolver 322 may obtain the DID document corresponding to the DID at step 710 and forward it to the SDK 312 at step 712. At step 714, the verifier 532 may use the SDK 312 to create a DID authentication challenge based on the obtained DID document. In some embodiments, the DID authentication challenge may comprise a ciphertext created by encrypting original text using a public key associated with the DID that is recorded in the DID document. The challenge may also comprise a network address to which a response is to be sent. At step 716, the verifier 532 may obtain information associated with the authentication service endpoint for the DID from the DID document. At step 718, the verifier 532 may use the SDK 312 to send the challenge to the DID authentication services associated with the DID.

In some embodiments, after obtaining the DID authentication challenge from the verifier 532, the DID authentication services may obtain consent from the owner for such authentication request at step 720. If the owner provides consent or permission for the identity authentication, the DID authentication services may call its version of the SDK 312 to create a response to the DID authentication challenge at step 722. In some embodiments, the response to the DID authentication challenge may comprise plaintext that is the result of decrypting the ciphertext in the challenge using the private key associated with the DID. The SDK 312 may return the response to the DID authentication services at step 724, which may then send the response to the network address provided by the verifier 432 at step 726. Upon receiving the response to the DID authentication challenge, the verifier 532 may call its SDK 312 at step 728 to check the response. At step 730, the SDK 312 may determine whether the response proves that the user providing the DID is the owner of the DID. In some embodiments, the SDK 312 may check the response by comparing decrypted text in the response with the original text that was used to create the DID authentication challenge. If the response is determined to be correct, the SDK 312 may return a message to the verifier 532 indicating the DID is a valid proof of identity of the user at step 732. At step 734, the verifier 532 may notify the user as to the validity of the DID.

Figure 8:
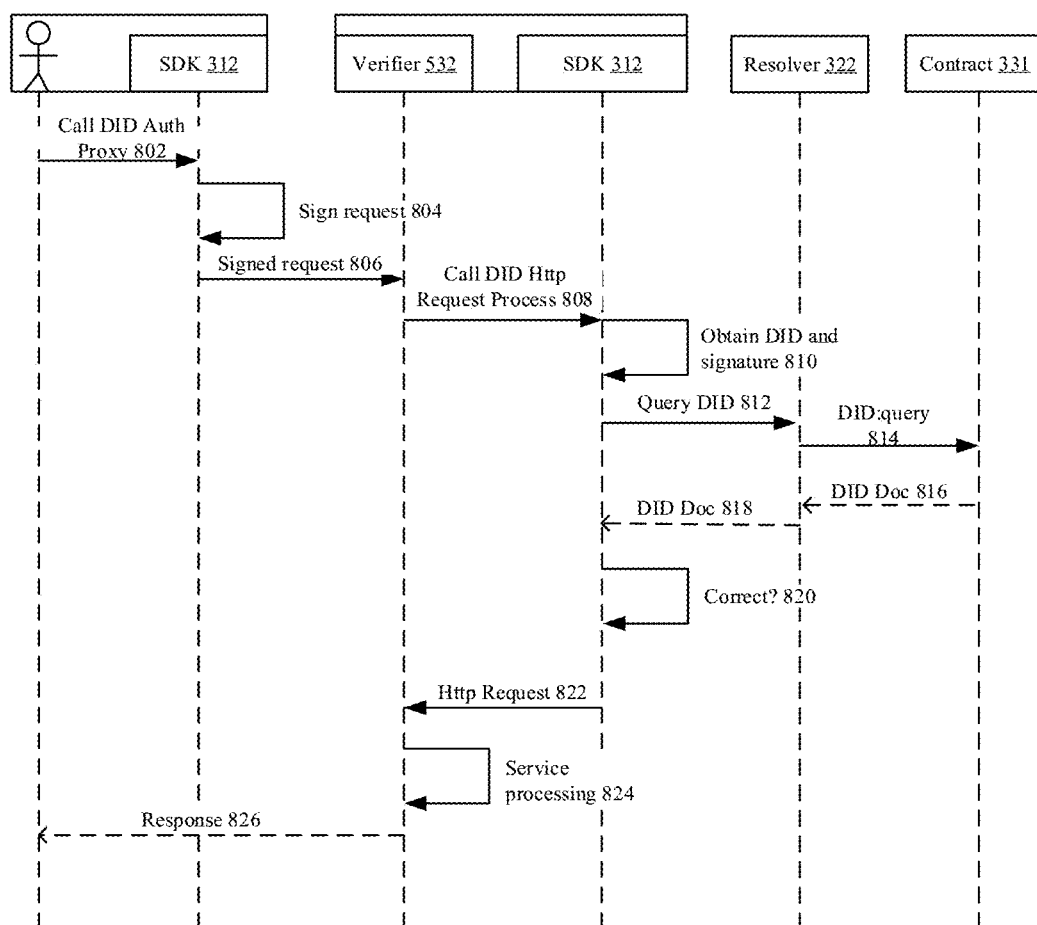
FIG. 8 illustrates a method for authenticating a decentralized identifier using an identity management application in accordance with some embodiments.

FIG. 8 illustrates a method for authenticating a decentralized identifier using an identity management application in accordance with some embodiments. The operations of the method presented below are intended to be illustrative. Depending on the implementation, the method may include additional, fewer, or alternative steps performed in various orders or in parallel. In some embodiments, a user may use a terminal for managing DIDs, which may comprise an identity management application or another suitable application. The application may comprise a version of the SDK 312. In this example, the user may need services from a service provider (i.e., verifier), which requires verification that the user owns a particular DID in order to provide its services. The user may send a service request to the verifier. The service request may be in the form of an HTTP request.

At step 802, the user may call the identity management application 533 to provide authentication information for the service request. The user may provide the original service request as an input to the SDK 312 included in the identity management application 533. At step 804, the SDK 312 may sign the content of the original service request using a private key of a cryptographic key pair associated with the DID. The SDK 312 may be used to add the DID and a digital signature for the original service request to the original service request to create a signed service request. In case the original service request is a HTTP request, the SDK 312 may add the DID and the digital signature to a header of the HTTP request. At step 806, the SDK 312 may send the signed service request to the verifier 532.

In some embodiments, the verifier 532 may call its version of an SDK 312 to authenticate the DID included in the signed service request at step 808. At step 810, the SDK 312 may obtain the DID and the digital signature included in the signed service request. In case the signed service request is an HTTP request, the DID and the digital signature may be obtained from the header of the HTTP request. At step 812, the SDK 312 may send a query to a resolver 322 for the DID document associated with the DID to be authenticated. At step 814, the resolver 322 may formulate a transaction invoking a blockchain contract 331 for managing DIDs and send the transaction to one or more blockchain nodes associated with the blockchain 330 for execution. As a result, the resolver 322 may obtain the DID document corresponding to the DID at step 816 and forward it to the SDK 312 at step 818. At step 820, the SDK 312 associated with the verifier 532 may check the signed service request to determine whether it is from the owner of the DID based on the obtained DID document. In some embodiments, the SDK 312 may decrypt the digital signature using a public key obtained from DID document, and check the decryption result against a hash value of the original service request to determine if the public key is associated with the key used to create the digital signature in the signed service request. If so, the SDK 312 may determine that the service request from the user is valid. It may then send it to the verifier 532 for processing at step 822. The verifier 532 may process the service request and provide appropriate services to the user at step 824. Then, the verifier 532 may send a response to the user at step 826 to confirm completion of the requested services.

Figure 9:
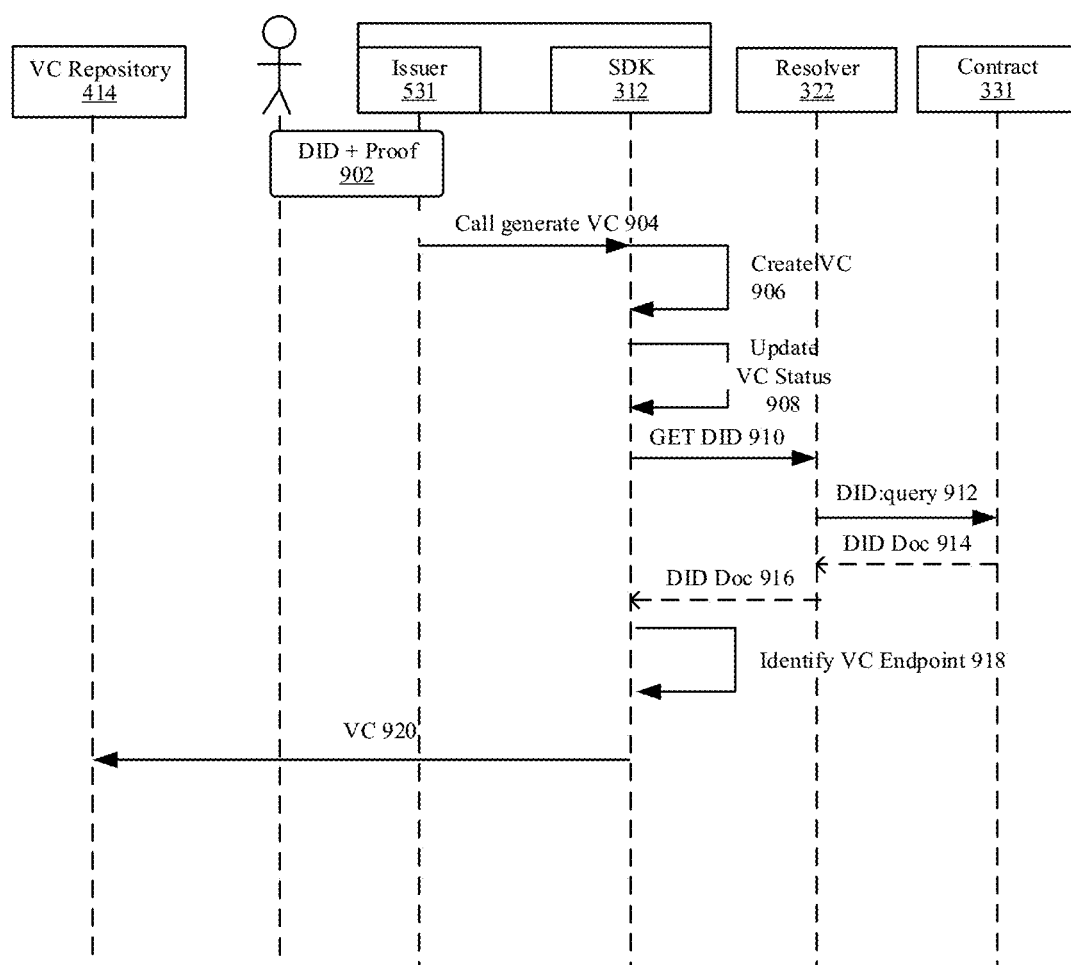
FIG. 9 illustrates a method for issuing a verifiable claim in accordance with some embodiments.

FIG. 9 illustrates a method for issuing a verifiable claim in accordance with some embodiments. The operations of the method presented below are intended to be illustrative. Depending on the implementation, the method may include additional, fewer, or alternative steps performed in various orders or in parallel. In some embodiments, an issuer 531 may issue a VC to a user. The VC may be used as a proof of certain facts or characteristics of the user as endorsed by the issuer 531.

At step 902, the issuer 531 may obtain a DID associated with the user and a proof of the fact to be included in the VC. Here, the proof of the fact to be included in the VC may be based on materials submitted by the user to the issuer 531, information or data obtained by the issuer 531 from third-party systems, in-person verification of the facts, other suitable sources of proof, or any combination thereof. After obtaining the DID and the proof, the issuer 531 may call an SDK 312 associated with creation of VCs to initiate a process for creating the VC at step 904. The message from the issuer 531 may comprise a statement of the proven fact or a claim about the user. The SDK 312 may create a VC document including the statement using a cryptographic key pair associated with the issuer 531 at step 906. In some embodiments, the VC may include a digital signature created based on a private key associated with the issuer 531. At step 908, the SDK 312 may update a locally-stored status of the VC.

At step 910, the SDK 312 may send a query to a resolver 322 for the DID document associated with the DID for which the VC is issued. At step 912, the resolver 322 may formulate a transaction invoking a blockchain contract 331 for managing DIDs and send the transaction to one or more blockchain nodes associated with the blockchain 330 for execution. As a result, the resolver 322 may obtain the DID document corresponding to the DID at step 914 and forward it to the SDK 312 at step 916. At step 918, the SDK 312 may identify a VC service endpoint associated with the DID of the user for storing VCs. The VC service endpoint may correspond to a VC repository 414 used by the user or the owner of the DID. Then at step 920, the issuer may use the SDK 312 to send the VC to the VC repository 414 for storage. The VC may also include information associated with a VC status service endpoint, which may store and provide status information for the VC. In some embodiments, the information may comprise a network address (e.g., URL) for an issue agent service used by the issuer 531 to keep status of VCs. The VC status service endpoint may or may not be associated with the VC repository 414. The SDK 312 may provide the current status of the newly generated VC to the VC status service endpoint for storing. The status of the VC may be stored on a blockchain.

Figure 10:
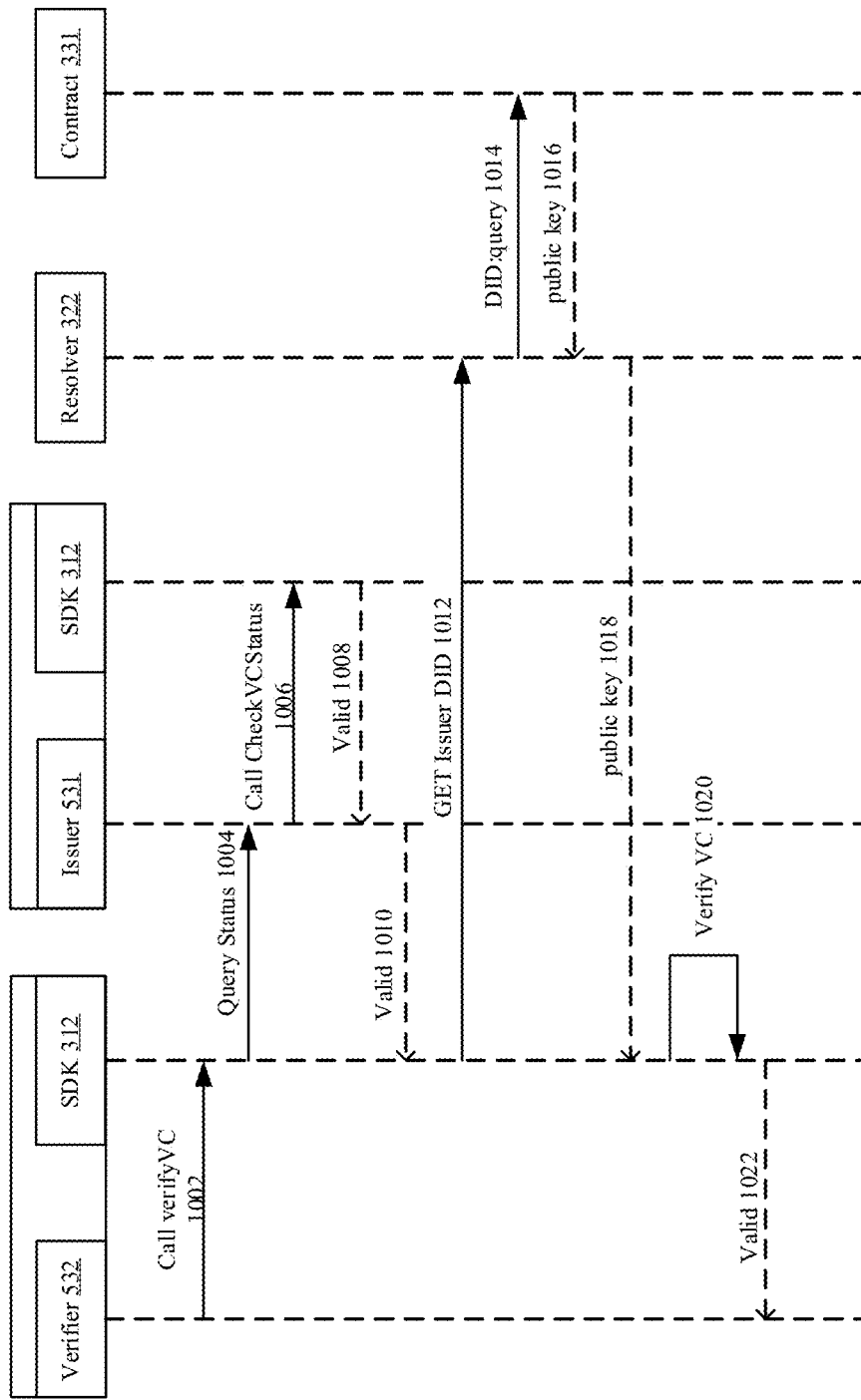
FIG. 10 illustrates a method for verifying a verifiable claim in accordance with some embodiments.

FIG. 10 illustrates a method for verifying a verifiable claim in accordance with some embodiments. The operations of the method presented below are intended to be illustrative. Depending on the implementation, the method may include additional, fewer, or alternative steps performed in various orders or in parallel. In some embodiments, a user may provide a VC to another party (e.g., a verifier 532) to prove a fact stated in the VC. The VC may be provided after the verifier 532 has verified that the user is the owner of a DID associated with the VC.

At step 1002, the verifier 532 may call an SDK 312 comprising code libraries associated with VC verification to verify the VC. The SDK 312 may identify from the VC (e.g., in a "credential status" field) information associated with a VC status service endpoint for the VC. The VC status service endpoint may be associated with an issuer 531. At step 1004, the SDK 312 may send a query to the issuer 531 for the status of the VC. In response, at step 1006, the issuer 531 may call an SDK 312 to obtain the status of the VC. The SDK 531 may obtain the status of the VC. As an example, the SDK 312 may determine that the VC has a valid status and may return the information to the issuer 531 at step 1008. Then, at step 1010, the issuer may return the valid status information to the SDK 312 associated with the verifier 532.

The verifier 532 may obtain an identifier associated with the issuer 531 of the VC. For example, the identifier may be a DID of the issuer 531. At step 1012, the SDK 312 may send a query to a resolver 322 for a public key associated with the DID of the issuer 531 of the VC. At step 1014, the resolver 322 may formulate a transaction invoking a blockchain contract 331 for managing DIDs and send the transaction to one or more blockchain nodes associated with the blockchain 330 for execution. As a result, the resolver 322 may obtain the public key corresponding to the DID at step 1016 and forward it to the SDK 312 associated with the verifier 532 at step 1018. At step 1020, the SDK 312 associated with the verifier 532 may verify the VC based on a digital signature included therein and the public key associated with the issuer 531 of the VC. If the VC is verified, the SDK 312 may send a confirmation to the verifier 532 at step 1022.

FIGS. 11-15 illustrate example operations associated with DIDs or VCs performed by one or more user-side systems 310, one or more service-side systems 320, one or more agents 321, one or more resolvers 322, one or more clouds 324, one or more blockchain systems 330, one or more KMSs, or other suitable systems, applications, services. In some embodiments, a user-side system 310 may manage one or more DIDs or VCs by interacting with an online platform integrating one or more of the aforementioned components via one or more API interfaces (e.g., REST API). The user-side system 310 may trust confidential information such as cryptographic key pairs to the online platform for secure keeping.

Figure 11:
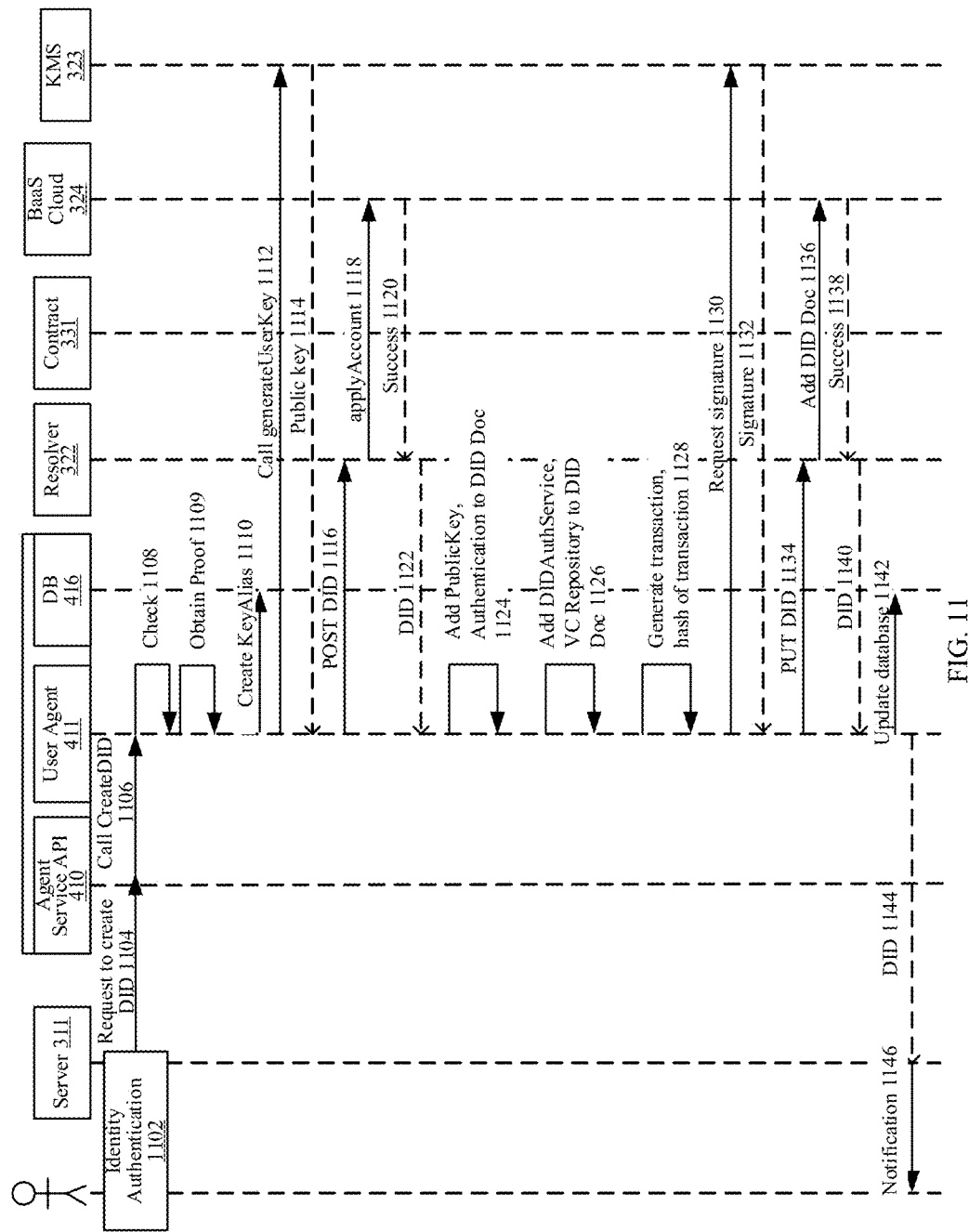
FIG. 11 illustrates a method for creating a decentralized identifier using an agent service in accordance with some embodiments.

FIG. 11 illustrates a method for creating a decentralized identifier using an agent service in accordance with some embodiments. The operations of the method presented below are intended to be illustrative. Depending on the implementation, the method may include additional, fewer, or alternative steps performed in various orders or in parallel. In some embodiments, a user-side system 310 associated with an entity may use one or more agent services 321 to create one or more DIDs for one or more users of the entity and correlate the DIDs with internal accounts or identifications (e.g., service IDs) maintained by the entity. In order to create DIDs for its users, the entity may have been authenticated by the online platform as a trusted entity and may have made a commitment to provide truthful information. In some embodiments, the entity may have been issued a VC by a bootstrap issuer DID to certify that it is authenticated by an authoritative entity. The entity may be required to authenticate the identities of its users. The user-side system 310 may use one or more KMSs 323 and the secure environment (e.g., TEE) that they provide to manage cryptographic keys associated with the created DIDs and to map the cryptographic keys to the internal accounts or identifications maintained by the entity. With the help of the agent services 321, the user-side system 310 may use services associated with DIDs without keeping a record of the DIDs. Instead, it may simply provide its internal account information or identification information for identification of the DIDs via one or more interfaces associated with the agent services 321.

In some embodiments, an online platform for managing DIDs may receive a request for creating a DID. The request may be from a first entity on behalf of a second entity for creating the DID for the second entity. In the example illustrated by FIG. 11, an entity (e.g., first entity) may create a DID for a user (e.g., second entity), who may have an account with the business entity. In some embodiments, the entity may authenticate the identity of a user before creating a DID for the user. For example, at step 1102 of FIG. 11, a server 311 of a user-side system 310 associated with the entity may perform identity authentication or otherwise obtain identity authentication information for the user. The entity may have authenticated the identity of the user earlier and may maintain such information in a database. At step 1104, the server 311 may retrieve such information. Then, the server 311 may send the request for creating the DID to an agent service API 410 associated with a user agent 411 associated with the online platform. The request may comprise an account identifier corresponding to the user. The request may take the form of an API message. At step 1006, the agent service API 410 may send a request to a user agent 411 for creating the DID.

At step 1108, the user agent 411 may check the request for required information. In some embodiments, to create a DID for a user, the entity may be required to have an existing DID for itself. The user agent 411 may check the request to determine that the sender of the request has an existing DID and to determine the DID associated with the sender. In some embodiments, the entity may be required to provide a proof of identity authentication for the user. The proof of identity authentication may comprise a proof of real-person authentication, a proof of real-name authentication, another suitable proof of authentication, or any combination thereof. For example, a proof of real-name authentication may be based on a user's office identification (e.g., government-issued ID). An example proof may, for example, be a number created by applying a hash function (e.g., SHA-256) to a combination of an ID type, ID number, and a number of the user. Such a proof may ensure unique correspondence with a particular user while maintaining sensitive information of the user confidential.

In some embodiments, the user agent 411 may determine whether the request for creating a DID comprises a proof of identity authentication. The proof of identity authentication may comprise a proof of real-name authentication, a proof of real-person authentication, proofs of other suitable methods of identity authentication, or any combination thereof. If the user agent 411 determines that the request does comprise the proof of identity authentication, the user agent 411 may accept the request based on the determination. If the user agent 411 determines that the request for creating a DID does not comprise a proof of identity authentication, the user agent 411 may reject the request. Alternatively, the user agent 411 may send to the server 311 a request for the proof of identity authentication. The user agent 411 may then receive the required proof of identity authentication from the server 311. The user agent 411 may also use other methods to obtain identity authentication of the user.

At step 1109, the user agent 411 may obtain the proof of identity authentication for the user corresponding to the DID to be created. In some embodiments, the user agent 411 may directly obtain the proof of identity authentication based on the received request or other information received from the server 311. The user-side system 310 may have obtained the proof by performing identity authentication or by using an identity service 341. The user-side system 310 may include a proof of identity authentication in the request for creating the DID or include means to obtain the proof (e.g., a link). In some embodiments, the user-side system 310 may delegate the function of sending requests for creating DIDs to an identity service 341. The server 311 may send information associated with one or more users, for whom it intends to create DIDs, to the identity service 341. The identity service 341 may perform identity authentication on the users or confirm that identity authentication on the users has been successfully completed. The identity service 341 may create one or more requests for creating DIDs based on the information received from the server 311, the requests including proofs of identity authentication for the users. In some embodiments, DID documents created in response to requests from the identity service 341 may comprise a field (e.g., a "creator" field) indicating that the DID is created based on identity authentication by the identity service 341. In some embodiments, after the DID is created based on identity authentication by identity service 341, the identity service 341 may issue a VC to the DID certifying the real-world identity of the owner of the DID. In some embodiments, before another issuer issues a VC to the owner of the DID, this other issuer may require the VC issued by the identity service 341 as a proof of identity authentication of the DID owner.

In some embodiments, the user agent 411 may obtain the proof of identity authentication independently by using an identity service 341. In some embodiments, the identity service 341 may correspond to an entity trusted by the service-side system 320. The entity may perform identity authentication on users (e.g., real-name authentication, real-person authentication). The identity authentication may comprise collecting various identity information (e.g., name, date of birth, address, appearance features, fingerprint) associated with an individual that corresponds to an identity and compare the collected information with information maintained by authoritative sources (e.g., government agencies). After successful authentication of an individual's identity, the identity service 341 may store a record of the successful authentication (e.g., a proof of identity authentication) and identity information associated with the individual in association with identifiers of the individual, such as an account or a service ID. The identity service 341 may store identity information and proofs of identity authentication in a database 343. Alternatively, the identity service 341 may store identity information and proofs of identity authentication in a blockchain 330. In some embodiments, the identity service 341 may create one or more blockchain transactions for saving the identity information in the blockchain 330 and send the one or more blockchain transactions to one or more blockchain nodes associated with the blockchain 330.

Alternatively, the identity service 341 may interact with the blockchain 330 via, for example, the BaaS cloud 324. The identity service 341 may send the BaaS cloud 324 a request to store the identity information and proof of identity authentication on the blockchain 330. The user agent 411 may send a request to the identity service 341 for a proof of identity authentication of a user. The user may correspond to a request for creating a DID. The identity service 341 may send back the requested proof of identity authentication.

In some embodiments, the user agent 411 may obtain a DID in response to a request without obtaining the proof of identity verification. The DID created in this manner may be assigned a status of "authentication pending." It may be mapped to a dummy account identifier. The status may be represented in the DID document corresponding to the DID, saved in a system storing status information for DIDs, or be saved by the user agent 411. The operations that can be performed in relation to a DID with such a status may be limited. For example, the owner of the DID may be prohibited from issuing VCs or being issued VCs. The status of "authentication pending" may be removed after a proof of identity authentication is provided to the user agent 411. The identity service 341 may send the user agent 411 the proof of identity authentication proactively, or upon request by the user-side system 310 or the user agent 411. After receiving the proof, the user agent 411 may update status information stored in association with the DID. Furthermore, the user agent 411 may store a mapping relationship between the DID and an account identifier associated with the user whose identity has been authenticated. Further details about identity authentication are described in relation to FIGS. 15-18.

After obtaining the proof of identity authentication, the user agent 411 may create a key alias corresponding to the proof of identity authentication for the user at step 1110. In some embodiments, the user agent 411 may obtain, in response to receiving the request, a public key of a cryptographic key pair. The public key may later be used as a basis for creating the DID. In some embodiments, the user agent 411 may obtain the public key from the KMS 323. At step 1112, the user agent 411 may send a request to the KMS 323 for generating and storing a cryptographic key pair. The KMS 323 may generate a cryptographic key pair. In some embodiments, the KMS 323 may cause the cryptographic key pair to be generated in a TEE associated with the KMS 323. After the key pair is generated, the KMS 323 may obtain a public key and an encrypted private key from the TEE. At step 1114, the KMS 323 may send the public key to the user agent 411.

In some embodiments, the online platform may obtain the DID based on the public key. At step 1116, the user agent 411 may send a request for creating a new DID to the resolver 322. The request may comprise the public key. In response, the resolver 322 may generate, based on the public key, one or more blockchain transactions for creating the DID and adding a DID document associated with the DID to a blockchain. Alternatively, the DID resolver may send a request to the BaaS cloud 324 for generation of such transactions. For example, at step 1118, the resolver 322 may send a request to a blockchain system 330 for creating a new blockchain account. Here, the request may be directly sent to one or more blockchain nodes of the blockchain 330 in the form of one or more blockchain transactions or be sent to a BaaS Cloud 324 or other suitable interface systems associated with a blockchain 330. The blockchain transactions may invoke one or more blockchain contracts configured for managing DIDs. In response to the request from the resolver 322, at step 1120, the DID resolver may obtain an indication from the blockchain 330 or the cloud 324 that a new blockchain account is successfully created. The blockchain account may be associated with an address on the blockchain 330. Information obtained by the resolver 322 may comprise information associated with the newly-created blockchain address. It may directly comprise a newly-created DID or at least information sufficient to construct the DID. At step 1122, the resolver 322 may send a message back to the user agent 411. The message may comprise information associated with the newly created DID.

In some embodiments, a DID document may be created and stored in the blockchain 330. At step 1124, the user agent 411 may generate a DID document and add the public key associated with the newly-created DID and authentication information to the DID document. At step 1126, the user agent 411 may add information associated with one or more service endpoints (e.g., information associated with an authentication service endpoint, information associated with a verifiable claim repository) to the DID document. The authentication service endpoint and the verifiable claim repository 414 may be provided as part of the online platform. The DID document may comprise one or more public keys associated with the obtained DID, authentication information associated with the obtained DID, authorization information associated with the obtained DID, delegation information associated with the obtained DID, one or more services associated with the obtained DID, one or more service endpoints associated with the obtained DID, a DID of a creator of the obtained DID, other suitable information, or any combination thereof. In some embodiments, the DID document may comprise a "creator" field containing identification information (e.g., DID) of the entity that sent the request for creating the DID on behalf of the user. The "creator" field may serve as a record of the entity that authenticated of the identity of or endorsed the owner of the DID. Then, at step 1128, the user agent 411 may generate one or more blockchain transactions for storing the DID document to the blockchain 330. The user agent 411 may also generate one or more hash values of the blockchain transactions.

In some embodiments, for the one or more blockchain transactions to be executed by one or more nodes of the blockchain 330, they are required to be signed using the private key associated with the DID. The user agent 411 may obtain such a digital signature from the KMS 323. At step 1130, the user agent 411 may send a request to the KMS 323 for signing a blockchain transaction using the private key of the cryptographic key pair associated with the DID. The request may comprise the hash value of the transaction and a public key associated with the DID. The KMS 323 may create a digital signature for the transaction. In some embodiments, the digital signature may be generated in a TEE associated with the KMS 323. The KMS 323 may identify an encrypted private key associated with the public key and feed the encrypted private key to the TEE. The encrypted private key may be decrypted within the TEE and used to generate the digital signature for the transaction. The digital signature may then be fed back to the KMS 323. At step 1132, the user agent 411 may receive from the KMS a signed version of the blockchain transaction.

At step 1134, the user agent 411 may send the DID document as well as the signed blockchain transaction to the resolver 322 for sending to the blockchain system. At step 1136, the resolver 322 may send one or more transactions to the blockchain system (e.g., one or more blockchain nodes, a BaaS Cloud 324). The transactions may invoke a blockchain contract 331 for managing DIDs and DID documents on the blockchain 330. At step 1138, the resolver 322 may obtain information from the blockchain 330 indicating that the DID document has been successfully stored. At step 1140, the resolver 322 may forward a confirmation to user agent 411.

At step 1142, after a DID and its corresponding DID document have been created, the user agent 411 may update the database 416 to store a mapping relationship among the DID, an account identifier of the user, a proof of identity authentication of the user, a service ID of the user, a public key associated with the DID, a key alias associated with the user or the proof of identity authentication, other suitable information, or any combination thereof. In some embodiments, the mapping relationship may be stored in an encrypted form. To store the mapping relationship, the user agent 411 may calculate a hash value for a combination the DID and one or more items of the other identification information. In some embodiments, such a hash value may be stored as part of the DID document. The stored mapping relationship may allow the user agent 441 to identify the DID based on information received from the user-side system 310. In some embodiments, the user agent 411 may receive a request associated with the obtained DID, wherein the request comprises the account identifier and then identify the obtained DID based on the mapping relationship between the account identifier and the obtained DID. In other embodiments, the user agent 441 may receive a request for a proof of identity authentication, wherein the request comprises a DID and then locate the proof of identity authentication based on the mapping relationship between the proof of identity authentication and the DID. In some embodiments, the user agent 411 may store a recovery key for recovering the private key corresponding to the DID in association with identification information of the user. In this manner, the user agent 411 may allow the user to take control over the DID using the recovery key. Then, at step 1144, the user agent 411 may send information associated with the DID to the server 311, which may send a notification to the user at step 1146 to inform the user of the successful creation of the DID.

Figure 12:
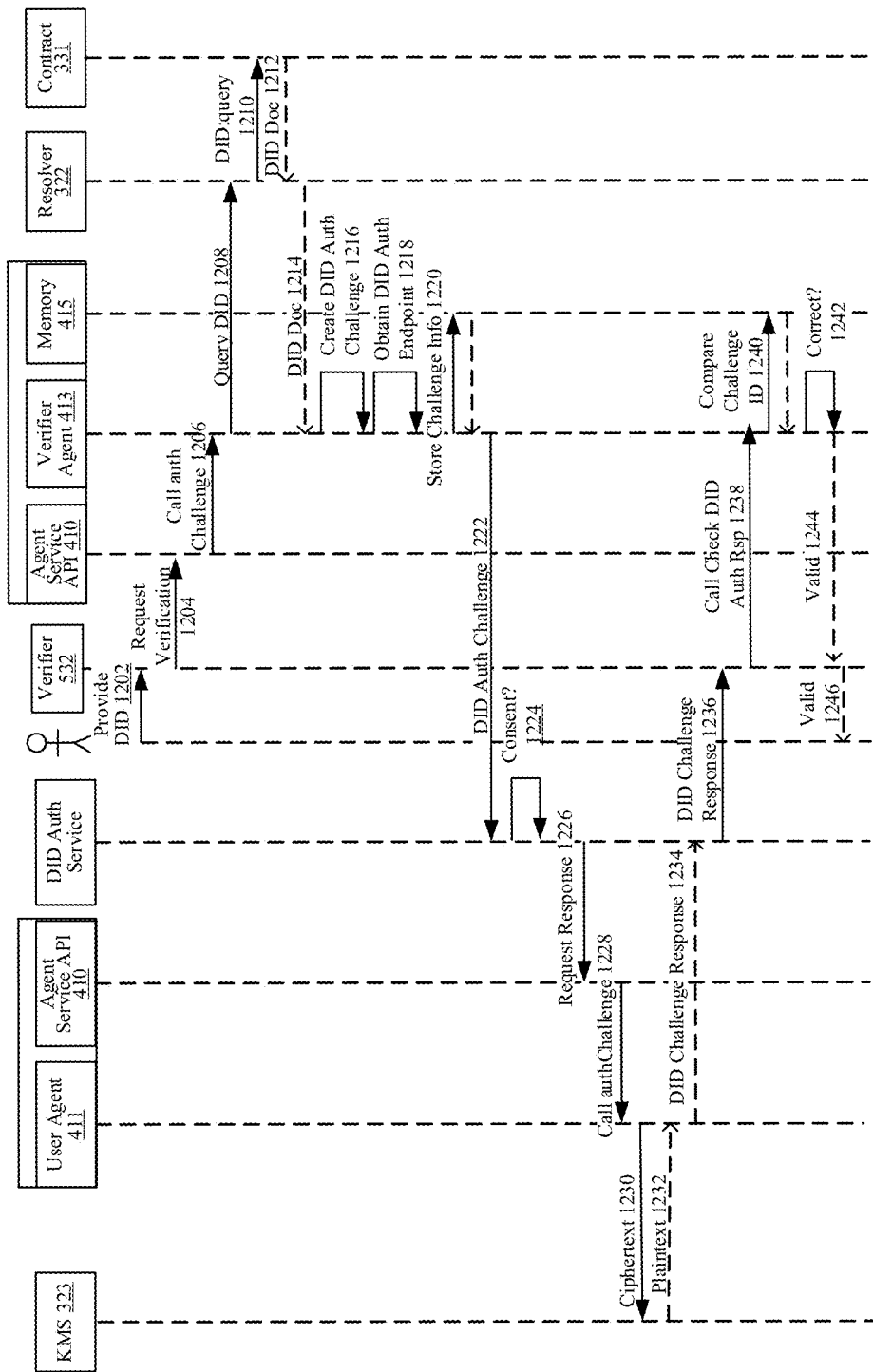
FIG. 12 illustrates a method for authenticating a decentralized identifier using an agent service in accordance with some embodiments.

FIG. 12 illustrates a method for authenticating a decentralized identifier using an agent service in accordance with some embodiments. The operations of the method presented below are intended to be illustrative. Depending on the implementation, the method may include additional, fewer, or alternative steps performed in various orders or in parallel. In some embodiments, a party (e.g., verifier) may desire to authenticate that another party (e.g., purported owner of DID) is the true owner of a DID. The authentication process may be facilitated by agent services 321 available to both parties.

In some embodiments, at step 1202, the verifier 532 may obtain a DID provided by a purported owner. At step 1204, the verifier 532 may send a request to an agent service API 410 for creating a DID authentication challenge. The request may comprise the DID to be authenticated and a network address (e.g., a URL) to which a response to the challenge is to be sent. The network address may be accessible to the verifier 532. At step 1206, the request may be forwarded from the agent service API 410 to a verifier agent 413 configured to perform operations related to authentication of DIDs. At step 1208, the verifier agent 413 may send a query to a resolver 322 for the DID document associated with the DID to be authenticated. At step 1210, the resolver 322 may formulate a transaction invoking a blockchain contract 331 for managing DIDs and send the transaction to one or more blockchain nodes associated with the blockchain 330 for execution. As a result, the resolver 322 may obtain the DID document corresponding to the DID at step 1212 and forward it to the verifier agent 413 at step 1214. At step 1216, the verifier agent 413 may create a DID authentication challenge based on the obtained DID document. In some embodiments, the DID authentication challenge may comprise a ciphertext created by encrypting original text using a public key associated with the DID that is recorded in the DID document. The challenge may also comprise the network address associated with the verifier, to which a response is to be sent. At step 1218, the verifier agent 413 may obtain information associated with the authentication service endpoint for the DID from the DID document. At step 1220, the verifier agent 413 may store an identifier of the challenge in relation to information associated with the challenge in a memory using a key-value structure. For example, the verifier agent 413 may store a challenge ID associated with the challenge in association with the DID to be authenticated, a plaintext used to create the cyphertext, and the network address for sending the response to the challenge. At step 1222, the verifier agent 413 may send the challenge to the DID authentication services associated with the DID based on information from the DID document.

In some embodiments, after obtaining the DID authentication challenge from the verifier agent 413, the DID authentication services may obtain consent from the owner of the DID for responding to such a challenge at step 1224. If the owner provides consent or permission for the identity authentication, the DID authentication services may send a request to an agent service API 410 associated with a user agent 411 for a response to the DID authentication challenge at step 1226. At step 1228, the agent service API 410 may call a corresponding functionality of the user agent 411 for creation of a response to the challenge. The response to the challenge may require restoration of the plaintext used to create the ciphertext included in the challenge using a private key associated with the DID to be authenticated. At step 1230, the user agent 411 may send the cyphertext from the challenge to the KMS 323 for decryption along with identification information associated with the DID that is recognized by the KMS 323. The KMS 323 may store a plurality of public-private key pairs in association with identification information for accounts or DIDs corresponding to the key pairs. Based on the identification information received from the user agent 411, the KMS 323 may identify the public-private key pair associated with the DID. In some embodiments, the KMS 323 may store the public key and an encrypted version of the private key. It may send the encrypted private key to a TEE associated with the KMS 323 for decryption. The private key may then be used to decrypt the ciphertext within the TEE. At step 1232, the user agent 411 may obtain the decrypted plaintext from the KMS 323.

At step 1234, the user agent 411 may generate a response to the challenge using the plaintext and send the response back to the DID authentication services. The response may comprise a challenge identifier that was contained in the original challenge. At step 1236, the DID authentication services may send the response to the network address provided by the verifier 532. Then, at step 1238, the verifier 532 may forward the response to the verifier agent 413 for checking. The verifier agent 413 may first compare the challenge identifier in the response with one or more challenge identifiers stored in the memory 415 to identify information associated with the challenge corresponding to the response at step 1240. Then at step 1242, the verifier agent 413 may determine if the purported owner of the DID is the actual owner. In some embodiments, the verifier agent may determine if the plaintext contained in the response is identical to the plaintext used to create the ciphertext in the challenge. If so, the verifier agent 413 may determine that authentication is success. The verifier agent 413 may send a confirmation message to the verifier at step 1244, which may forward the confirmation message to the owner of the DID at step 1246.

Figure 13:
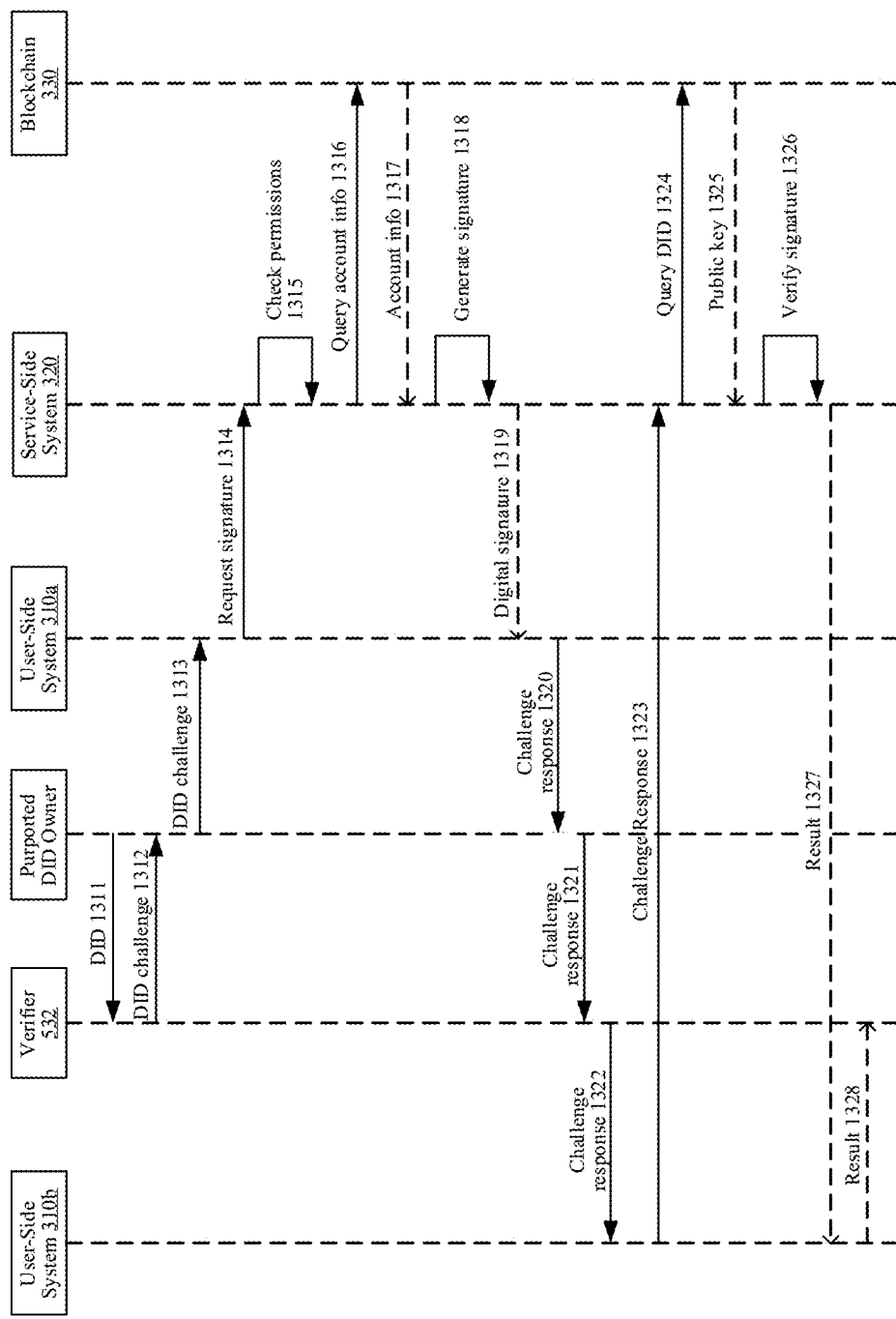
FIG. 13 illustrates a method for authenticating a decentralized identifier on behalf of a verifier or an owner in accordance with some embodiments.

FIG. 13 illustrates a method for authenticating a decentralized identifier on behalf of a verifier or an owner in accordance with some embodiments. The operations of the methods presented below are intended to be illustrative. Depending on the implementation, the methods may include additional, fewer, or alternative steps performed in various orders or in parallel. Furthermore, one or more steps performed in any of the methods illustrated in FIG. 13 may be replaced with one or more suitable steps performed in another one of the methods. The devices or systems performing certain steps as illustrated in FIG. 13 may also be substituted by other suitable devices or systems to perform the same steps. The suitable devices or systems may comprise sub-systems, parent systems, or counterpart systems with similar functionalities. As an example, one or more steps performed by the user-side system 310 may be performed by the identity management application 533 and vice versa. As another example, one or more steps performed by the service-side system 320 may be performed by the resolver 322 or agent 321, which may be a sub-system of the service-side system 320. Although this specification describes particular devices or systems performing particular steps, this specification contemplates any suitable devices or systems performing any suitable steps for authenticating decentralized identifiers.

In some embodiments, one party (e.g., verifier 532) may desire to authenticate that another party (e.g., purported owner of DID) is the true owner of a DID. The service-side system 320 may provide one or more services and interfaces to either or both of the parties to facilitate the parties in completing one or more steps of an authentication process. The methods illustrated by FIG. 13 may comprise one or more steps that are replaceable with or can be used to replace one or more steps of the method illustrated in FIG. 12.

In some embodiments, as illustrated in FIG. 13, a purported DID owner may interact with the service-side system 320 through a user-side system 310a associated with a first entity. A verifier 532 of the DID may interact with the service-side system 320 through a user-side system 310b associated with a second entity. The first entity and the second entity may or may not be the same entity. As an example and not by way of limitation, the purported DID owner may correspond to an individual user, and the verifier 532 may correspond to a service provider needing to authenticate an identity of the user before providing a service to the user. It may be the case that neither the purported DID owner nor the verifier 532 has the technical capabilities or needs to directly manage DID-related operations. They may rely on the user-side systems 310a and 310b to interface with the service-side system 320 in order to perform DID-related operations. For example, the user-side system 310a may be authorized to control one or more operations associated with the DID on behalf of the owner of the DID.

The method illustrated in FIG. 13 may start at step 1311, where the purported DID owner may provide a DID to the verifier 532. In response to obtaining the DID, the verifier 532 may begin the authentication process for the DID. At step 1312, the verifier 532 may provide to the purported DID owner a DID authentication challenge. In some embodiments, the DID authentication challenge may comprise a plaintext (e.g., a piece of text selected by the DID verifier). In order to prove its ownership of the DID, the purported DID owner may need to provide a digital signature on the plaintext using a private key of a cryptographic key pair associated with the DID. At step 1313, the purported DID owner may forward the DID authentication challenge to the user-side system 310a. In this scenario, the purported DID owner and the user-side system 310a may have entrusted the management of the cryptographic key pair associated with the DID to the service-side system 320. At step 1314, the user-side system 310a may send a request to the service-side system 320 (e.g., to the user agent 411 in the service-side system 320) for a digital signature on the plaintext included in the DID authentication challenge. The request may comprise the DID to be authenticated and the plaintext.

The service-side system 320 may obtain the request for creating the digital signature from the user-side system 310a. From the request, the service-side system 320 may obtain the plaintext and information associated with the DID. At step 1315, the service-side system 320 may obtain one or more permissions associated with a sender of the request for creating the digital signature, and may determine, based on the obtained one or more permissions and the information associated with the DID, whether the sender of the request for creating the digital signature is authorized to control one or more operations associated with the DID. The service-side system 320 may ascertain the identity of the sender of the request based on encrypted or other secure communication with the sender. For example, the service-side system 320 may check and determine whether the sender of the request is the owner of the DID, a controller or creator of the DID, or a user-side system 310 that is authorized to manage one or more operations associated with the DID. If it is determined that the sender of the request for creating the digital signature is authorized to control the one or more operations associated with the DID, the service-side system 320 may create the digital signature per the request. Otherwise the service-side system 320 may reject the request. In some embodiments, the service-side system 320 may additionally check a status of the DID. For example, the service-side system 320 may determine whether the DID has been registered on the blockchain 330 or whether a DID document associated with the DID has been stored on the blockchain 330. In some embodiments, the service-side system 320 may only proceed with providing the digital signature if the DID has been registered on the blockchain 330 and is in a fully functional status.

If the service-side system 320 accepts the request for creating the digital signature, it may proceed to step 1316. At step 1316, the service-side system 320 may identify a blockchain account associated with the DID. The service-side system 320 may query the blockchain 330 for such blockchain account information and obtain such information at step 1317. The service-side system 320 may use an identifier of the blockchain account corresponding to the DID to identify a cryptographic key pair associated with the DID. For example, the service-side system 320 may obtain a key identifier based on the identifier of the blockchain account and access the cryptographic key pair based on the key identifier. Then, at step 1318, the service-side system 320 may create the digital signature on the plaintext based on the request for creating the digital signature. The digital signature may be created by encrypting a hash value of the plaintext using a private key associated with the DID. In some embodiments, the service-side system 320 may use the KMS 323 to generate the digital signature. The service-side system 320 may send instructions to the KMS 323 for signing the plaintext using the private key associated with the DID. Then, the service-side system 320 may obtain the digital signature from the KMS 323. For example, the service-side system 320 may identify a blockchain account associated with the DID, determine an identifier for the private key associated with the DID based on the identified blockchain account associated with the DID, and include the identifier for the private key associated with the DID in the instructions. In some embodiments, the digital signature obtained from the KMS 323 may have been generated in a TEE.

At step 1319, the service-side system 320 may return the digital signature on the plaintext to the user-side system 310a. The user-side system 310a may generate a response to the DID authentication challenge based on the digital signature and send the response to the purported DID owner at step 1320. The response may comprise information associated with the DID (e.g., the DID), information associated with the DID authentication challenge (e.g., an identifier of the DID authentication challenge), the plaintext included in the DID authentication challenge, the digital signature, other suitable information, or any combination thereof. Then, at step 1321, the purported DID owner may provide the response to the verifier 532.

After receiving the response to the DID authentication challenge from the purported DID owner, the verifier 532 may initiate a process for authenticating the ownership of the DID based on the response. At step 1322, the verifier 532 may provide the response to the user-side system 310b. At step 1323, the user-side system 310b may forward the response to the service-side system 320 (e.g., to the verifier agent 413 in the service-side system 320) as part of a request for authenticating the DID. The request may comprise the DID, the plaintext associated with the DID authentication challenge, the digital signature on the plaintext, other suitable information, or any combination thereof. In some embodiments, the request may comprise the response to the DID authentication challenge, which may comprise part or the entirety of the information included in the request. The service-side system 320 may initiate a process for authenticating the DID in response to obtaining the request for authenticating the DID. In some embodiments, the service-side system 320 may check for satisfaction of one or more criteria before initiating the process. For example, the service-side system 320 may check whether a creator of the DID authentication challenge (e.g., the verifier 532) owns a DID managed by the service-side system 320, whether the DID to be authenticated has a valid status (e.g., whether the DID has been registered on the blockchain 330), whether another suitable criterion is satisfied, or any combination thereof. If all the required criteria, if any, are satisfied, the service-side system 320 may initiate the process for authenticating the DID.

In some embodiments, the service-side system 320 may obtain a public key associated with the DID. In some embodiments, the service-side system 320 may identify a blockchain 330 associated with the DID and obtain the public key from the identified blockchain. At step 1324, the service-side system 320 may query the blockchain 330 for the public key associated with the DID. Then, at step 1325, the service-side system 320 may obtain the public key from the blockchain 330. For example, the service-side system 320 may send a blockchain transaction to one or more blockchain nodes of the blockchain 330 to retrieve a DID document corresponding to the DID. The blockchain transaction may comprise information associated with the DID and may invoke a blockchain contract for managing relationships between DIDs and corresponding DID documents. For example, the blockchain transaction may call an interface of the blockchain contract that is executable to retrieve information associated with one or more DID documents corresponding to one or more DIDs. The service-side system 320 may obtain the DID document from the blockchain 330 and retrieve the public key from the DID document.

At step 1326, the service-side system 320 may verify the digital signature based on the plaintext and the public key. In one embodiment, the service-side system 320 may determine, based on the obtained public key and the plaintext, whether the digital signature on the plaintext is created based on a private key corresponding to the DID. For example, the service-side system 320 may calculate a hash value of the plaintext and decrypt the digital signature using the public key to obtain a decrypted value. The service-side system 320 may compare the calculated hash value and the decrypted value to determine whether they are the same. If so, the service-side system 320 may determine that the digital signature is created based on the private key corresponding to the public key. At step 1327, the service-side system 320 may return a result of authentication to the user-side system 310b (the sender of the request for authenticating the DID). If the service-side system 320 determines that the digital signature on the plaintext is created based on the private key corresponding to the DID, the service-side system 320 may generate and send a message confirming authentication of the DID. This confirms that the purported DID owner is the actual owner of the DID. Otherwise, the service-side system 320 may generate and send a message indicating that the authentication of the DID has failed. At step 1328, the user-side system 310b may forward the result to the verifier 532, the creator of the DID authentication challenge. Alternatively, the service-side system 320 may directly return the result to the verifier 532, the creator of the DID authentication challenge.

Figure 14:
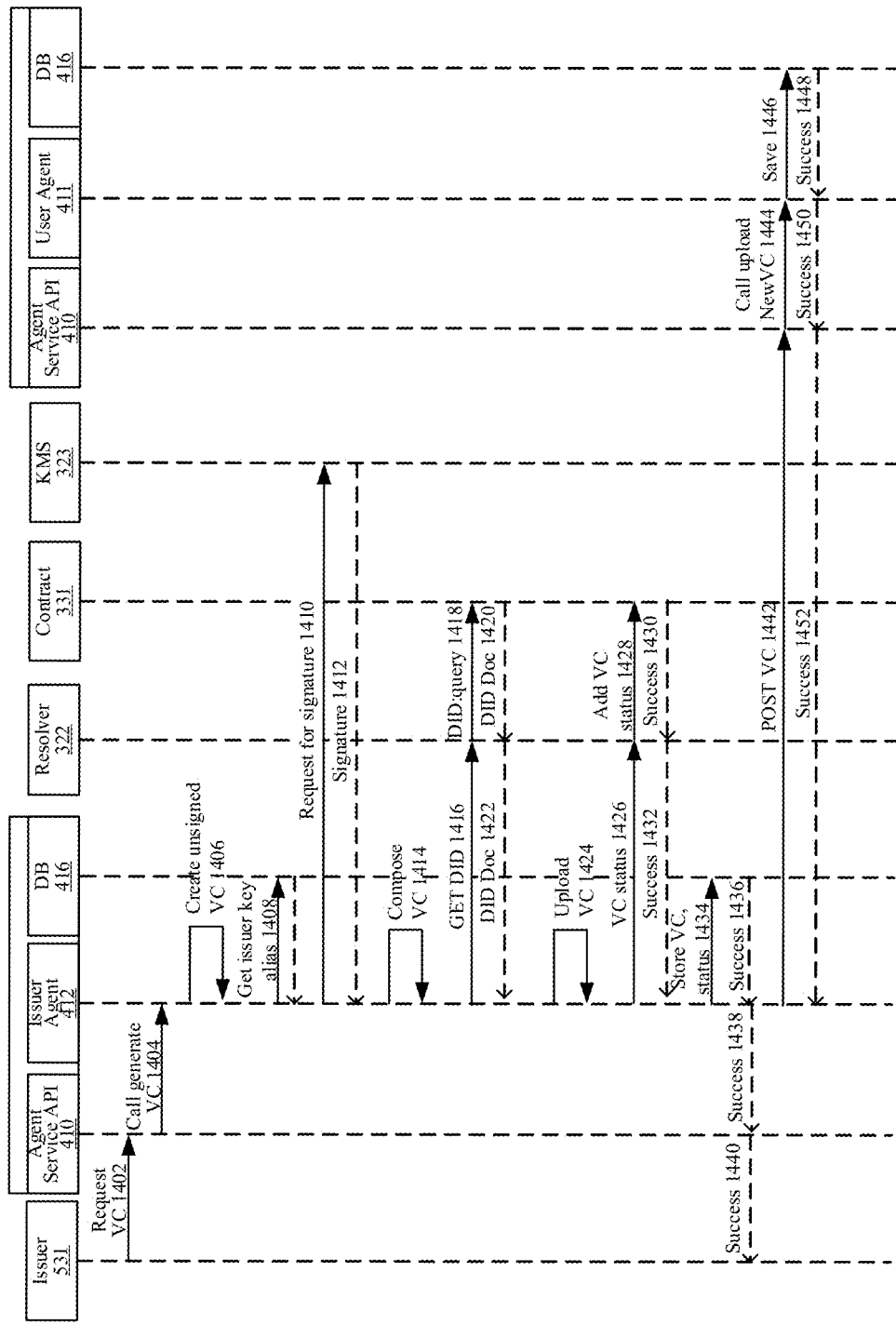
FIG. 14 illustrates a method for issuing a verifiable claim using an agent service in accordance with some embodiments.

FIG. 14 illustrates a method for issuing a verifiable claim using an agent service in accordance with some embodiments. The operations of the method presented below are intended to be illustrative. Depending on the implementation, the method may include additional, fewer, or alternative steps performed in various orders or in parallel. In some embodiments, a first entity (e.g., an issuer) may desire to issue a VC for a second entity (e.g., a user) to testify as to a fact related to the second entity. The first entity may be referred to as an issuer of the verifiable claim, and the second entity may be referred to as a subject of the verifiable claim. The process of issuing the VC may be facilitated by agent services 321 available to the entities.

In some embodiments, an agent service API 410 may receive, from the issuer 531, a request for creating an unsigned VC for a DID associated with the user at step 1402. At step 1404, the agent service API 410 may call the issuer agent 412 to execute operations to generate a new VC. At step 1406, the issuer agent 412 may create a VC based on the request received from the issuer 531. The VC may comprise a message that is included in the request. In some embodiments, the VC may comprise an encrypted version of the message for confidentiality reasons. The message may comprise a claim or statement regarding the user or other suitable information or data that may be conveyed to a party with access to the VC. In some embodiments, the VC may comprise a claim corresponding to identity authentication of the user (e.g., real-name authentication, real-person authentication). The request may comprise a DID of the user. The issuer agent 412 may directly create the VC based on the DID. Alternatively, the request may comprise an account identifier associated with the user (e.g., the user's account with the entity issuing the VC). In this case, the issuer agent 412 may obtain an account identifier associated with the user from the request and identify a DID based on a pre-stored mapping relationship between the account identifier and the DID. The issuer agent 412 may then create the unsigned VC based on the identified DID. The issuer agent 412 may also calculate a hash value of the content of the unsigned VC.

In some embodiments, the issuer agent 412 may obtain, in response to receiving the request, a digital signature associated with the issuer. In some embodiments, the digital signature may be obtained from the KMS 323. The issuer agent 412 may determine a key alias associated with the issuer 531 at step 1408. At step 1410, the issuer agent 412 may send a request to the KMS 323 for a digital signature associated with the issuer 531 on the VC. The request may comprise the key alias, which may be used for identification of the cryptographic keys associated with the issuer 531. The request may also comprise the hash value of the unsigned VC created by the issuer agent 412. The KMS 323 may store a plurality of public-private key pairs in association with key aliases for entities or users. Based on the key alias received from the issuer agent 412, the KMS 323 may identify the public-private key pair associated with the issuer 531. In some embodiments, the KMS 323 may store the public key and an encrypted version of the private key. It may send the encrypted private key to a TEE associated with the KMS 323 for decryption. The private key may then be used to create a digital signature of the issuer on the VC. The digital signature may be created by encrypting the hash value of the unsigned VC using the private key. At step 1412, the digital signature may be sent back to the issuer agent 412. Then, the issuer agent 412 may combine the unsigned VC with the digital signature to compose a signed VC at step 1414. In this manner, the signed VC is generated based on the request received from the issuer 531 and the digital signature.

In some embodiments, the issuer agent 412 may upload the VC to a service endpoint associated with the DID of the user or the holder of the VC. The issuer agent 412 may identify the service endpoint based on the DID document associated with the DID. At step 1416, the issuer agent 412 may send a query to a resolver 322 for the DID document associated with the DID for which the VC is issued. At step 1418, the resolver 322 may formulate a transaction invoking a blockchain contract 331 for managing DIDs and send the transaction to one or more blockchain nodes associated with the blockchain 330 for execution. The transaction may comprise information associated with the DID and may be for retrieving a DID document corresponding to the DID. As a result, the resolver 322 may obtain the DID document corresponding to the DID at step 1420 and forward it to the SDK 312 at step 1422. Based on the DID document, the issuer agent 412 may obtain information (e.g., a network address) associated with a service endpoint (e.g., a VC repository 414) for the DID from the DID document. At step 1424, the issuer agent 412 may upload the VC to the service endpoint.

In some embodiments, the issuer agent 412 may store a status of the VC. The status of the VC may be stored in a blockchain 330. In some embodiments, the blockchain 330 may be used by a service endpoint associated with the issuer 531 of the VC. At step 1426, the issuer agent 412 may send a status (e.g., valid, invalid) of the VC and a hash value of the VC to the resolver 322 for storing in the blockchain 330. At step 1428, the resolver 322 may generate and send to a blockchain node of the blockchain 330 associated with the service endpoint, a blockchain transaction for adding information associated with the VC to the blockchain. The information may comprise the status and the hash value of the VC. In some embodiments, the blockchain transaction may invoke a blockchain contract 331 for managing VCs. After sending the transaction to the blockchain node, the resolver 322 may determine that the hash value and status of the VC have been successfully stored at step 1430 and may send a confirmation to the issuer agent 412 at step 1432. In some embodiments, the status of the VC may also be stored locally. At step 1434, the issuer agent 412 may store the VC and its status at a database 416. The issuer agent 412 may receive a confirmation of successful storage at step 1436, send a confirmation to the agent service API 410 at step 1438, which may then send a confirmation to the issuer 531 indicating that the VC has been successfully created at step 1440. The confirmation to the issue may comprise the VC that has been created.

In some embodiments, the VC may be provided to the user or the holder of the VC. At step 1442, the issuer agent 412 may send the VC and/or a status of the VC to an agent service API 410 associated with a user agent 411 for the holder of the VC. The agent service API 410 may call the user agent 411 to upload the VC at step 1444. Here, the user agent 411 may serve as a service endpoint for the DID of the holder of the VC. The user agent 411 may be implemented on the same physical system as the issuer agent 412. The user agent 411 may save the VC to a database 416 at step 1446. After successful saving of the VC, the database 416 may return a success confirmation to the user agent 411 at step 1448. The user agent 411 may send a confirmation to the agent service API 410 at step 1450, which may forward a confirmation to the issuer agent 412 at step 1452.

Figure 15:
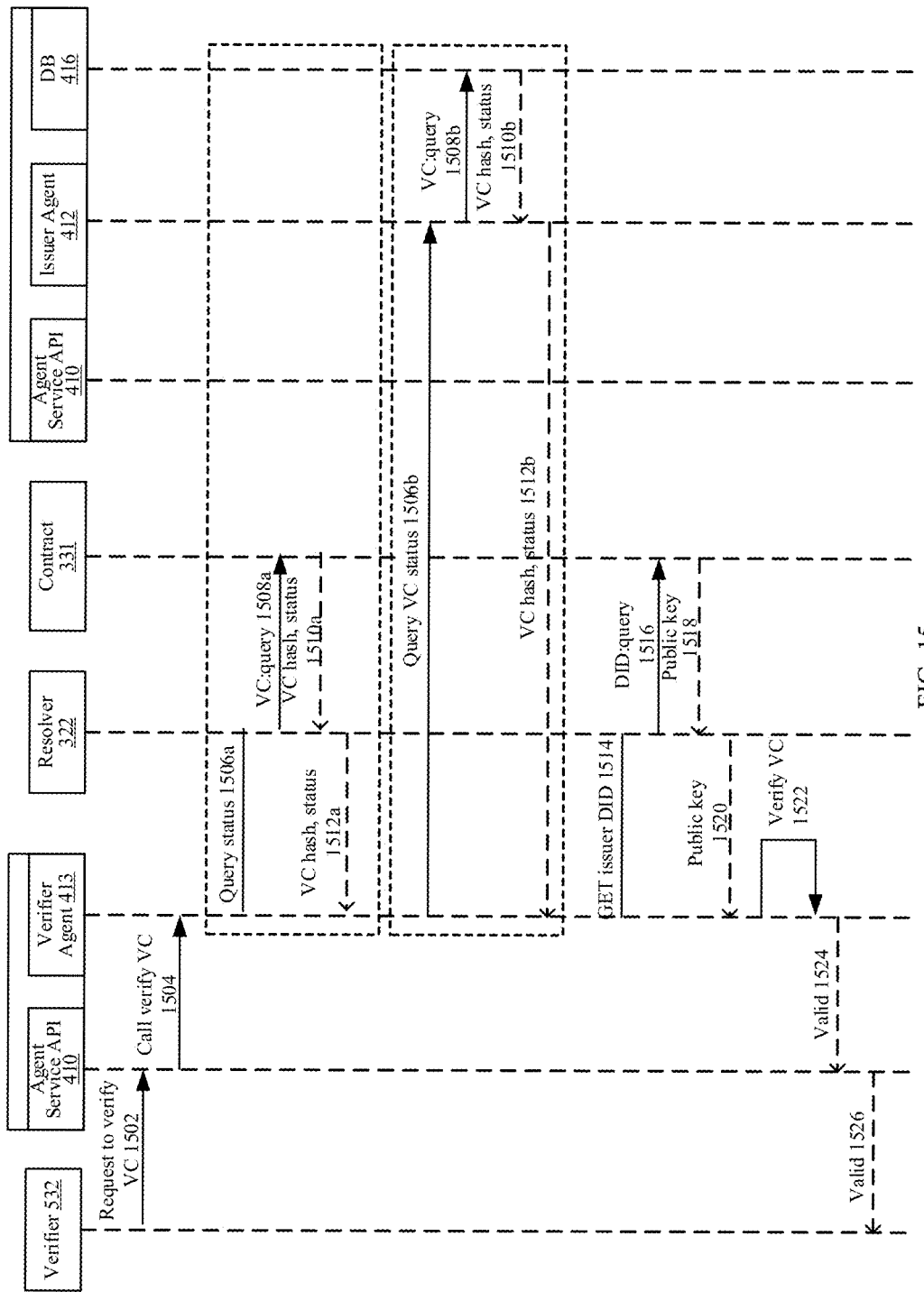
FIG. 15 illustrates a method for verifying a verifiable claim using an agent service in accordance with some embodiments.

FIG. 15 illustrates a method for verifying a verifiable claim using an agent service in accordance with some embodiments. The operations of the method presented below are intended to be illustrative. Depending on the implementation, the method may include additional, fewer, or alternative steps performed in various orders or in parallel. In some embodiments, a holder of a VC (or a subject of the VC) may present to a first entity (e.g., verifier) a VC issued by a second entity (e.g., issuer of the VC). The verifier may verify the VC with the aid of agent services 321.

In some embodiments, an agent service API 410 may receive from a verifier 532 a request to verify a VC at step 1502. The VC may comprise a digital signature associated with an issuer of the VC. At step 1504, the agent service API 410 may call a function of the verifier agent 413 for verifying the VC. In some embodiments, the verifier 532 may have directly obtained the VC from the holder of the VC. Alternatively, the verifier 532 may only have received an account identifier associated with a subject of the VC. The verifier 532 may obtain the VC by obtaining a DID associated with the subject of the VC based on a pre-stored mapping relationship between the account identifier and the DID, obtaining a DID document associated with the DID, obtaining information associated with a service endpoint for managing VCs from the DID document, and obtaining the VC from the service endpoint.

In some embodiments, the verifier agent 413 may verify a status of the VC. The verifier agent 413 may obtain and verify the status using either steps 1506a, 1508a, 1510a, and 1512a or steps 1506b, 1508b, 1510b, and 1512b. In some embodiments, the verifier agent 413 may obtain the status of the VC from a blockchain storing information associated with a plurality of VCs. At step 1506a, the verifier agent 413 may send to a resolver 322 a query for a status of the VC. The query may comprise an identifier of the VC. At step 1508a, the resolver 322 may create a blockchain transaction for retrieving a hash value and a status of the VC and send it to one or more blockchain nodes associated with a blockchain 300. The blockchain transaction may comprise a DID of the subject of the VC and may invoke a blockchain contract 331 for managing VCs. At step 1510a, the resolver 322 may obtain a status of the VC as well as a hash value associated with the VC from the blockchain 330. The resolver 322 may then send the hash value and status to the verifier agent 413 at step 1512a for verification. The verifier agent 413 may calculate a hash value by applying a hash function on the VC that was provided by the holder. The verifier agent 413 may authenticate the received status of the VC by comparing the hash value received from the blockchain 330 with the calculated hash value. If they are identical, the verifier agent 413 may determine that the received status does correspond to the VC. If the status indicates that the VC is valid, the verifier agent 413 may complete this step of the verification.

In some embodiments, the verifier agent 413 may obtain the status of the VC from a service endpoint associated with the VC. In some embodiments, the service endpoint may correspond to an issuer agent 412 associated with the issuer. At step 1506b, the verifier agent 413 may send a query to the issuer agent 412 for status of the VC. The issuer agent 412 may query the database 416 for the status of the VC at step 1508b and obtain a status and a corresponding hash value of the VC at step 1510b. The issuer agent 412 may send the hash value and the status to the verifier agent 413 at step 1512b. The verifier agent 413 may authenticate the status and verify that the VC is valid in the manner discussed above.

In some embodiments, the verifier agent 413 may determine that the VC is issued by the issuer identified on the VC. The verifier agent 413 may obtain, based on the VC, a public key associated with the issuer. The verifier agent 413 may identify the issuer based on an identifier in the VC. In some embodiments, the identifier may comprise a DID of the issuer. The public key may be obtained from the blockchain 330 based on the DID of the issuer. At step 1514, the verifier agent 413 may send a request to the resolver 322 for the public key associated with the issuer. The request may comprise the DID of the issuer. At step 1516, the resolver 322 may create a blockchain transaction invoking a blockchain contract 331 for retrieving a public key or a DID document based on a DID and send the blockchain transaction to a blockchain node of the blockchain 330. The resolver 322 may obtain the public key (e.g., by retrieving from the DID document) at step 1518 and forward the public key to the verifier agent 413 at step 1520. Then, at step 1522, the verifier agent 413 may verify the VC using the public key by determining that the digital signature is created based on a private key associated with the public key. In some embodiments, the verifier agent 413 may verify one or more other facts about the VC. For example, the verifier agent 413 may obtain, from the VC, an issuance date of the VC and validate the obtained issuance date based on a comparison between the obtained issuance date and a current date. As another example, the verifier agent 413 may obtain, from the VC, an expiration date of the VC and validate that the VC has not expired based on the expiration date and a current date. If verification of the VC is successful, the verifier agent may send a confirmation to the agent service API 410 at step 1524. The agent service API 410 may send a message to the verifier 532 confirming that the VC is verified at step 1526.

Figure 16:
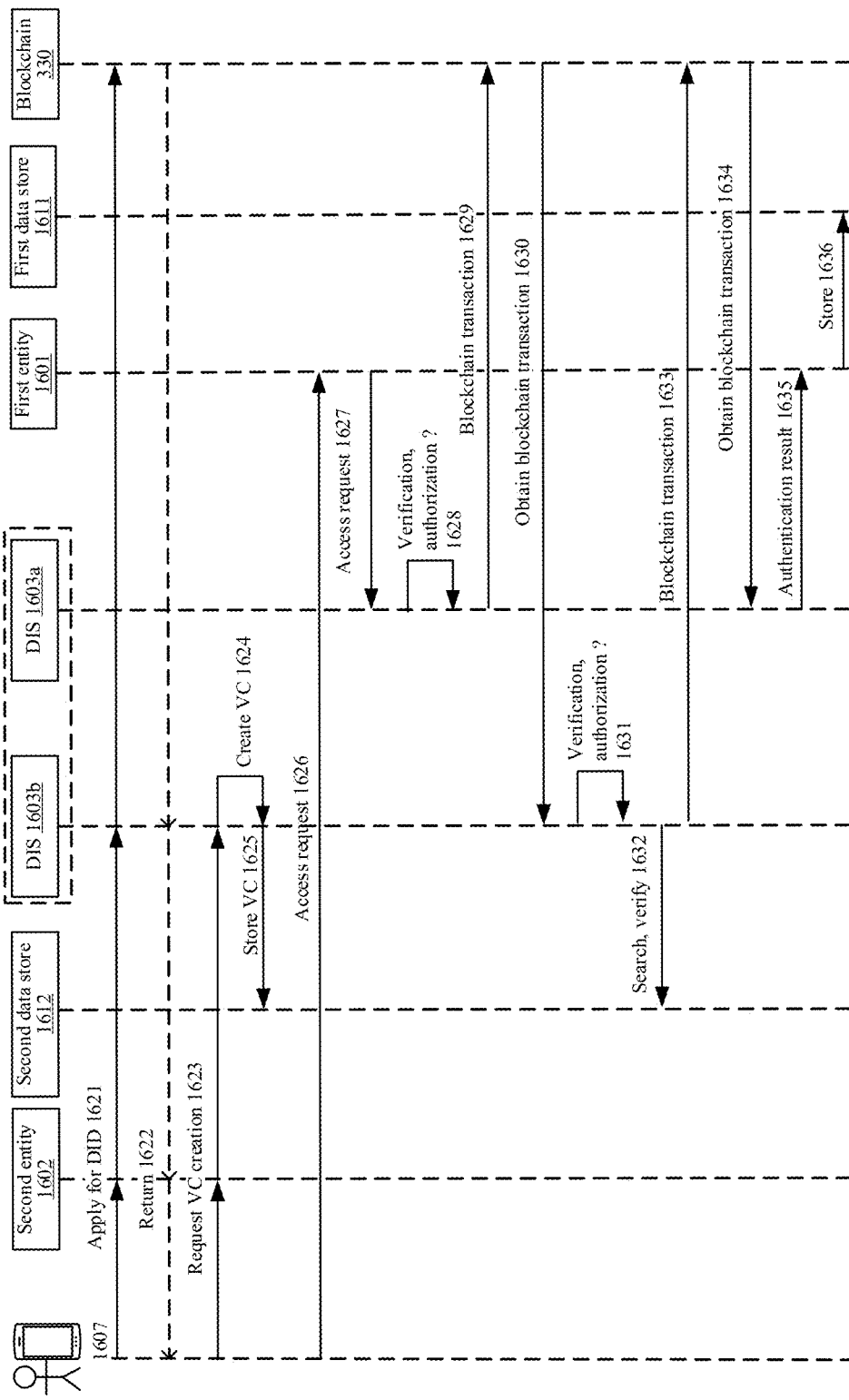
FIG. 16 illustrates a method for blockchain-based cross-entity authentication in accordance with some embodiments.

FIG. 16 illustrates a method for blockchain-based cross-entity authentication in accordance with some embodiments. The operations of the method presented below are intended to be illustrative. Depending on the implementation, the method may include additional, fewer, or alternative steps performed in various orders or in parallel.

In some embodiments, from a simplified overview, the steps described with reference to FIG. 16 may allow a user with a computing device 1607 (e.g., computer, mobile phone, pad, wearable computing device, etc.) to access a first entity 1601 based on the user's authentication information registered with a second entity 1602. Various steps below may be performed with reference to the computing device 1607, the first entity 1601, the second entity 1602, a first data store 1611, a second data store 1612, a DIS (decentralized identity service) 1603a, a DIS 1603b, a blockchain 330, or their equivalents. In some embodiments, the first entity 1601, the second entity 1602, and their users may be each associated a DID. The first entity 1601 and the second entity 1602 may each provide access to users based on their authentications. For example, the first entity 1601 and the second entity 1602 may host websites, provide mobile phone applications, maintain organizations (e.g., company, union, etc.), and the like. When referred below, the first entity 1601 and the second entity 1602 may represent the associated computing systems or devices (e.g., server or computer clusters providing online services) or the provided services (e.g., websites, applications). The first entity 1601 and the second entity 1602 may respectively correspond to the user-side systems 310, and the first data store 1611 and the second data store 1612 may respectively correspond to the databases 313. The first entity 1601 and the second entity 1602 may collect user authentication. For example, as an employer company, the entity may collect user authentication for its employees. A user may request to access a subsidiary company's platform based on the user's authentication information registered with a parent company. The first entity 1601 and the second entity 1602 may require user authentication to grant access one or more accounts or functions such as database access, building access, payroll search, ticket ordering, messaging, on-line banking, etc. For example, a user may request to access a meal-ordering website based on the user's authentication registered with a bank's software application or with the user's employer.

In some embodiments, the first entity 1601 may be associated with the first data store 1611, and the second entity 1602 may be associated with the second data store 1612 for information storage. The first data store 1611 and the second data store 1612 may each comprise a local data store maintained by the corresponding entity (e.g., a local data store for use by the corresponding entity), a public data store accessible to the corresponding entity (e.g., a public data store shared by various entities for storing information respectively encrypted by the entities), a data store maintained by a platform for the corresponding entity (e.g., a persistent storage maintained by the DIS 1603*a* or 1603*b*), etc. Each data store may provide secure storage and security features for privacy protection.

In some embodiments, the DIS 1603*a* and the DIS 1603*b* may correspond to the service-side system 320. The DIS 1603*a* and the DIS 1603*b* may, collectively or individually, include the various structures, components, and functions and perform corresponding methods described herein with respect to the service-side system 320. The DIS 1603*a* and the DIS 1603*b* may be implemented as an integrated service or as distributed decentralized services. Although the DIS 1603*a* and the DIS 1603*b* are shown in separate blocks in FIG. 16, they may be implemented in a single physical system or in separate physical systems. The first entity 1601 and the second entity 1602 may comprise one or more SDKs for providing such online services accessible to users via API interfaces. For example, as an integrated service, the DIS 1603*a* and the DIS 1603*b* may correspond to an online platform providing services to various users. For another example, as distributed decentralized services, the DIS 1603*a* and the DIS 1603*b* may respectively correspond to blockchain nodes of the blockchain 330, and may be respectively associated with the first entity 1601 and the second entity 1602. As a part of or a component associated with a blockchain node, the DIS may contribute to consensus verification, perform storage related to blockchain data, or perform other actions related to the blockchain 330. In one embodiment, the first entity 1601, the DIS 1603*a*, and/or the first data store 1611 may be integrated together; and the second entity 1602, the DIS 1803*b*, and/or the second data store 1612 may be integrated together. In one embodiment, the DIS 1603*a* may manage credential information (e.g., private keys, DIDs, VCs) for the first entity 1601 and/or its registered users, and the DIS 1603*b* may manage credential information (e.g., private keys, DIDs, VCs) for the second entity 1602 and/or its registered users.

In some embodiments, at step 1621, a user may send a DID creation request to the second entity 1602, for example, through the computing device 1607. The second entity 1602 may forward the request to the DIS 1603*b*. The DIS 1603*b* may obtain, from the second entity 1602, the DID creation request for creating a DID associated with an account identifier of the user. The DIS 1603*b* may perform DID creation for the user, for example, according to the methods described with reference to FIG. 6A, 6B, or 11. For example, the DIS 1603*b* may obtain a public key of a cryptographic key pair, obtain the DID based on the public key, and store a mapping relationship between the account identifier and the obtained DID. Further details for DID creation can be referred to the descriptions above. The created DID may be stored in the blockchain 330.

In some embodiments, a DID for the user may be designed as a primary DID. The DIS 1603*b* may create one or more secondary DIDs associated with the primary DID for the user. The secondary DID may be more limited in associated user information and its function than the primary DID. The secondary DID may be used for accessing the first entity 1601 (e.g., for a one-time access, for limited-time access, for entity-specific access), while the primary DID may be used for long-term identification of the user. To this end, the secondary DID may be associated with a corresponding status (e.g., expiring time, expiring number of use) limiting the validity of the secondary DID, and the status may be stored in a DID document associated with the secondary DID. In one embodiment, the secondary DID is a temporary DID for the user to access the first entity 1601. Thus, the use of secondary DID minimizes the risk of identity theft, because even if the secondary DID is exposed in the blockchain or otherwise made available to third-parties, the secondary DID cannot be used for purposes beyond its limited validity. Further, the primary DID may be associated with privacy information of the user, which is not associated with the secondary DID, and the privacy information is untraceable based on the secondary DID. Thus, user privacy is protected, because non-essential private information is not used and not exposed in the cross-entity authentication process.

In some embodiments, at step 1622, a result of the created DID may be returned by the DIS 1603*b* to the second entity 1602, which may then notify the computing device 1607 accordingly. By creating the DID, the user may use the DID as authentication information to access services provided by the second entity 1602. Alternatively, other types of registration with the second entity 1602 may be requested and performed for the user to obtain authentication information for the user.

In some embodiments, at step 1623, the user or the second entity 1602 may request creation of a VC certifying that the user is a registered user of the second entity 1602. For example, the DIS 1603*b* may obtain, from a computing device associated with the second entity 1602, a VC creation request for creating the VC indicating that the user is a registered user of the second entity 1602. Thus, authentication information of the user endorsed by the second entity may include information associated with the VC indicating that the user is a registered user of the second entity. At step 1624, the DIS 1603*b* may obtain a digital signature associated with the second entity 1602 and create the VC based on the obtained VC creation request and the obtained digital signature. The DIS 1603*b* may perform the VC creation, for example, according to the methods described with reference to FIG. 9 or 14. Details can be referred to corresponding descriptions. At step 1625, the DIS 1603*b* may store the created VC in the second data store 1612.

In some embodiments, at step 1626, the user may send an access request to the first entity 1601, for example, by attempting to log onto the first entity 1601 through the computing device 1607. In some embodiments, the user is registered with the second entity 1602 and not registered with the first entity 1601. At step 1627, in response to the access request, the first entity 1601 may forward an authentication request to the DIS 1603*a* to request the second entity 1602 to authenticate the user for the first entity 1601, thus achieving cross-entity authentication. The DIS 1603*a* may obtain the authentication request by the first entity 1601 for authenticating the user, and the authentication request may comprise a DID (e.g., the primary DID, the secondary DID) of the user.

In some embodiments, at step 1628, the DIS 1603*a* may obtain a public key of the user from the blockchain 303 based on the DID, and verify that the user owns the DID based at least on the obtained public key of the user. The DIS 1603*a* may perform the DID authentication, for example, according to the methods described with reference to FIG. 7, 8, 12, or 13. Details can be referred to corresponding descriptions.

In some embodiments, at step 1628, the DIS 1603*a* may determine if the first entity 1601 is authorized to access authentication information (e.g., VC) stored with the second entity 1602 to authenticate the user or otherwise authenticate the user through the second entity 1602. For example, the user may include the authorization in the access request 1626 to grant the authorization before sending the access request 1626, or grant the authorization after sending the access request 1626 and before the step 1628. By this authorization, the first entity 1601 may be permitted to access authentication information of the user endorsed by a second entity (e.g., the VC), and the user is registered with the second entity 1602 and not with the first entity 1601. In one embodiment, the authorization may be associated with a digital signature of the user or be encrypted by the user's private key to prove endorsement by the user.

In some embodiments, at step 1629, the DIS 1603a may generate a digital signature on the obtained authentication request with a private key of the first entity 1601, and obtain an authorization encrypted with a private key of the user for permitting the first entity 1601 to access the authentication information of the user endorsed by the second entity 1602. For example, the DIS 1803a may obtain a digital signature signing the authentication request with the private key of the first entity 1601, and then the user may encrypt the authentication request in plaintext and the digital signature with a private key of the user through the computing device 1607. The authentication request may include the user's DID and request the second entity 1602 to authenticate the user for the first entity 1601. Thus, the encrypted authorization comprises the DID of the user and the authentication request. Further, the encrypted authorization manifests two layers of endorsement: a digital signature by the first entity 1601 showing that the authentication request is for granting access to the first entity 1601 and an authentication result should be addressed to the first entity 1601, and an encryption by the user's private key showing that the authentication request is confirmed by the user and the first entity 1601 did not tamper with the authentication request.

In some embodiments, at step 1629, the DIS 1603a may, in response to determining that the first entity 1601 is permitted to access authentication information of the user endorsed by the second entity 1602, generate a blockchain transaction for obtaining an authentication result of the user by the second entity 1602. The generated blockchain transaction comprises the encrypted authorization. The authentication result is associated with the DID. Further, the DIS 1603a may transmit the blockchain transaction to a blockchain node for adding to the blockchain 330.

In some embodiments, at step 1630, the DIS 1603b may obtain, from the blockchain 330, the blockchain transaction comprising the authentication request by the first entity 1601 for authenticating the user. The authentication request comprises the DID of the user. For example, the DIS 1603b may monitor the blockchain 330 for events of various DIDs such as the second entity's DID, the second entity's users' DIDs, etc. Since the blockchain transaction added to the blockchain 330 comprises the user's DID, the DIS 1603b may receive notification (e.g., through a message queue) and thus obtain the blockchain transaction.

In some embodiments, the obtained blockchain transaction comprises an authorization encrypted with a private key of the user for permitting the second entity 1602 to share the authentication information of the user with the first entity 1601 (e.g., allowing the first entity 1601 to access VC showing that the user is a registered with the second entity 1602 and thus to grant the user access to the first entity 1601 through sharing of user authentication across the entities). The encrypted authorization comprises the DID of the user. The encrypted authorization comprises a digital signature on the authentication request based on a private key of the first entity 1601.

In some embodiments, at step 1631, the DIS 1603b may obtain a public key of the user (e.g., from the blockchain 330) and decrypt the encrypted authorization with the public key of the user to verify that the authorization is endorsed by the user and to obtain the digital signature. The DIS 1603b may further obtain a public key of the first entity 1601 from the blockchain, decrypt the digital signature with the obtained public key of the first entity 1601, and compare the decrypted digital signature with a hash value of the authentication request (in plaintext) to verify that the authentication request is signed by the first entity 1601. If all verifications succeed, it shows that the user authorizes the second entity 1602 to share the authentication information of the user with the first entity 1601.

In some embodiments, at step 1632, the DIS 1603b may, in response to determining that the first entity 1601 is permitted to access authentication information of the user endorsed by the second entity 1602, obtain an authentication result of the user by the second entity 1602 in response to the obtained blockchain transaction. To this end, the DIS 1603b may search the second data store 1612 for any VC that certifies that the user (as represented by the DID) is a registered user of the second entity or otherwise obtain a corresponding search result. If the search returns a positive result, the authentication result is obtained as associated with the DID. The authentication result comprises information associated with the VC indicating that the user is a registered user of the second entity 1602, and the VC is associated with the DID.

In some embodiments, a hash value of the VC is stored in the blockchain, and the VC is stored in a data store (e.g., the second data store 1612). As described earlier, the data store may comprise one or more of the following: a local data store maintained by the second entity, a public data store accessible to the second entity, and a data store maintained by a platform for the second entity. The VC comprises a permission configured by the second entity 1602 or the user for permitting the first entity 1601 to access the VC. For example, as described above, the successful verifications at step 1631 may indicate that the user authorizes the second entity 1602 to share the authentication information of the user with the first entity 1601, thus permitting the first entity 1601 to access the VC. Alternatively, the second entity 1602 may grant such permission and share the VC with the first entity 1601. Thus, step 1631 may include verifying based on the permission that the first entity is permitted to access the VC.

In some embodiments, at step 1632, to obtain the authentication result in response to the obtained blockchain transaction, the DIS 1603b may query the data store to obtain the VC associated with the DID, verify whether the user is the registered user of the second entity 1602 based on the obtained VC to generate an unencrypted authentication result (e.g., the user is or is not registered with the second entity 1602), and encrypt the unencrypted authentication result with a private key of the second entity 1602 to generate the authentication result.

In some embodiments, at step 1633, the DIS 1603b may generate a different blockchain transaction comprising the authentication result. In some embodiments, at step 1634, the DIS 1603b may transmit the different blockchain transaction to a blockchain node for adding to the blockchain 330.

In some embodiments, at step 1634, the DIS 1603a may obtain the different blockchain transaction from the blockchain 330. The blockchain transaction obtaining process may be similar to the step 1630. The different blockchain transaction comprises the authentication result of the user by the second entity. In one embodiment, the authentication result indicates that the authentication succeeded (e.g., the second entity 1602 has issued a VC certifying that the user is registered with the second entity 1602), and at step 1635 the DIS 1603*a* may transmit the authentication result to the first entity 1601 for granting the user access to the first entity 1601. Thus, for users that have registered with the second entity 1602, they do not have to register with the first entity 1601 and can access the first entity 1601 based on their authentication information (e.g., DID) registered with the second entity 1602. In one embodiment, the authentication result indicates that the authentication failed (e.g., the second entity 1602 has not issued a VC certifying that the user is registered with the second entity 1602), and at step 1635 the DIS 1603*a* may transmit the authentication result to the first entity 1601 for denying the user access to the first entity 1601. Thus, for users that never registered with the second entity 1602 or did not register in a way that led to the VC for cross-authentication, they will still be denied access to the first entity 1601.

In some embodiments, at step 1636, the first entity 1601 may carry out further actions based on the authentication result. The first entity 1601 may cache the authentication result to facilitate access by the user for a limited future time period (if the temporary DID was used), or store for long-term future access (if the primary DID was used).

FIG. 17A illustrates a flowchart of a method 1700 for blockchain-based cross-entity authentication in accordance with some embodiments. The method 1700 may be performed by a device, apparatus, or system for blockchain-based cross-entity authentication. The method 1700 may be performed by one or more components of the environment or system illustrated by FIGS. 1-5, such as one or more components of the service-side system 320 (e.g., the DIS 1603*a*, the DIS 1603*a* and 1603*b*). Depending on the implementation, the method 1700 may include additional, fewer, or alternative steps performed in various orders or in parallel.

Block 1710 includes obtaining an authentication request by a first entity for authenticating a user, wherein the authentication request comprises a decentralized identifier (DID) of the user. In some embodiments, the DID is a secondary DID associated with a primary DID of the user; the primary DID is associated with privacy information of the user; and the privacy information is untraceable based on the secondary DID. In some embodiments, the secondary DID is a temporary DID for the user to access the first entity.

In some embodiments, before generating the blockchain transaction for obtaining the authentication result of the user by the second entity at block 1720, the method further comprises: obtaining a public key of the user from the blockchain based on the DID; and verifying that the user owns the DID based at least on the obtained public key of the user.

In some embodiments, before generating the blockchain transaction for obtaining the authentication result of the user by the second entity, the method further comprises: generating a digital signature on the obtained authentication request with a private key of the first entity, and obtaining an authorization encrypted with a private key of the user for permitting the first entity to access the authentication information of the user endorsed by the second entity. The encrypted authorization comprises the digital signature; the encrypted authorization comprises the DID of the user; and the generated blockchain transaction comprises the encrypted authorization.

Block 1720 includes, in response to determining that the first entity is permitted to access authentication information of the user endorsed by a second entity, generating a blockchain transaction for obtaining an authentication result of the user by the second entity, wherein the authentication result is associated with the DID. In some embodiments, the user is registered with the second entity; and the user is not registered with the first entity.

Block 1730 includes transmitting the blockchain transaction to a blockchain node for adding to a blockchain. In some embodiments, the authentication information of the user endorsed by the second entity comprises information associated with a verifiable claim (VC) indicating that the user is a registered user of the second entity; and the VC is associated with the DID. In some embodiments, a hash value of the VC is stored in the blockchain; the VC is stored in a data store; and the data store comprises one or more of the following: a local data store maintained by the second entity, a public data store accessible to the second entity, and a data store maintained by a platform for the second entity. In some embodiments, the VC comprises a permission configured by the second entity or the user for permitting the first entity to access the VC.

In some embodiments, the method further comprises: obtaining, from the blockchain, the blockchain transaction for obtaining the authentication result of the user; obtaining an authentication result associated with the DID in response to the obtained blockchain transaction; generating a different blockchain transaction comprising the authentication result; and transmitting the different blockchain transaction to a blockchain node for adding to the blockchain.

In some embodiments, the method further comprises: obtaining a different blockchain transaction from the blockchain, the different blockchain transaction comprising the authentication result of the user by the second entity, wherein the authentication result indicates that the authentication succeeded; and transmitting the authentication result to the first entity for granting the user access to the first entity.

In some embodiments, the method further comprises: obtaining a different blockchain transaction from the blockchain, the different blockchain transaction comprising the authentication result of the user by the second entity, wherein the authentication result indicates that the authentication failed; and transmitting the authentication result to the first entity for denying the user access to the first entity.

FIG. 17B illustrates a flowchart of a method 1701 for blockchain-based cross-entity authentication in accordance with some embodiments. The method 1701 may be performed by a device, apparatus, or system for blockchain-based cross-entity authentication. The method 1701 may be performed by one or more components of the environment or system illustrated by FIGS. 1-5, such as one or more components of the service-side system 320 (e.g., the DIS 1603*b*, the DIS 1603*a* and 1603*b*). Depending on the implementation, the method 1701 may include additional, fewer, or alternative steps performed in various orders or in parallel.

Block 1711 includes obtaining, from a blockchain, a blockchain transaction comprising an authentication request by a first entity for authenticating a user, wherein the authentication request comprises a decentralized identifier (DID) of the user. In some embodiments, the user is registered with the second entity; and the user is not registered with the first entity. In some embodiments, the DID is a secondary DID associated with a primary DID of the user; the primary DID is associated with privacy information of the user; and the privacy information is untraceable based on the secondary DID. In some embodiments, the secondary DID is a temporary DID for the user to access the first entity.

In some embodiments, before obtaining the blockchain transaction at block 1711, the method further comprises: obtaining, from a computing device associated with the second entity, a VC creation request for creating the VC indicating that the user is a registered user of the second entity; obtaining a digital signature associated with the second entity; and creating the VC based on the obtained VC creation request and the obtained digital signature. In some embodiments, before obtaining the VC creation request, the method further comprises: obtaining, from the second entity, a DID creation request for creating the DID associated with an account identifier of the user; obtaining a public key of a cryptographic key pair; obtaining the DID based on the public key; and storing a mapping relationship between the account identifier and the obtained DID.

In some embodiments, the obtained blockchain transaction comprises an authorization encrypted with a private key of the user for permitting the first entity to access the authentication information of the user endorsed by the second entity; the encrypted authorization comprises the DID of the user; the encrypted authorization comprises a digital signature on the authentication request based on a private key of the first entity. After obtaining the blockchain transaction at block 1711 and before obtaining the authentication result at block 1721, the method further comprises: obtaining a public key of the user; decrypting the encrypted authorization with the public key of the user to verify that the authorization is signed by the user and to obtain the digital signature; obtaining a public key of the first entity from the blockchain; decrypting the digital signature with the obtained public key of the first entity; and comparing the decrypted digital signature with a hash value of the authentication request to verify that the authentication request is signed by the first entity.

In some embodiments, the authentication information of the user endorsed by the second entity comprises information associated with a verifiable claim (VC) indicating that the user is a registered user of the second entity; and the VC is associated with the DID. In some embodiments, the VC comprises a permission configured by the second entity or the user for permitting the first entity to access the VC; and after obtaining the blockchain transaction at block 1711 and before obtaining the authentication result at block 1721, the method further comprises: verifying based on the permission that the first entity is permitted to access the VC.

Block 1721 includes, in response to determining that the first entity is permitted to access authentication information of the user endorsed by a second entity, obtaining an authentication result of the user by the second entity in response to the obtained blockchain transaction, wherein the authentication result is associated with the DID.

In some embodiments, a hash value of the VC is stored in the blockchain; the VC is stored in a data store; and the data store comprises one or more of the following: a local data store maintained by the second entity, a public data store accessible to the second entity, and a data store maintained by a platform for the second entity. In some embodiments, obtaining the authentication result in response to the obtained blockchain transaction comprises: querying the data store to obtain the VC associated with the DID; verifying whether the user is the registered user of the second entity based on the obtained VC to generate an unencrypted authentication result; and encrypting the unencrypted authentication result with a private key of the second entity to generate the authentication result.

Block 1731 includes generating a different blockchain transaction comprising the authentication result.

Block 1741 includes transmitting the different blockchain transaction to a blockchain node for adding to the blockchain.

In some embodiments, before obtaining the blockchain transaction, the method further comprises: obtaining the authentication request by the first entity for authenticating a user; generating the blockchain transaction for obtaining the authentication result of the user by the second entity; and transmitting the blockchain transaction to a blockchain node for adding to the blockchain.

In some embodiments, the method further comprises: obtaining the different blockchain transaction from the blockchain, the different blockchain transaction comprising the authentication result of the user by the second entity, wherein the authentication result indicates that the authentication succeeded; and transmitting the authentication result to the first entity for granting the user access to the first entity.

In some embodiments, the method further comprises: obtaining the different blockchain transaction from the blockchain, the different blockchain transaction comprising the authentication result of the user by the second entity, wherein the authentication result indicates that the authentication failed; and transmitting the authentication result to the first entity for denying the user access to the first entity.

Figure 18A:
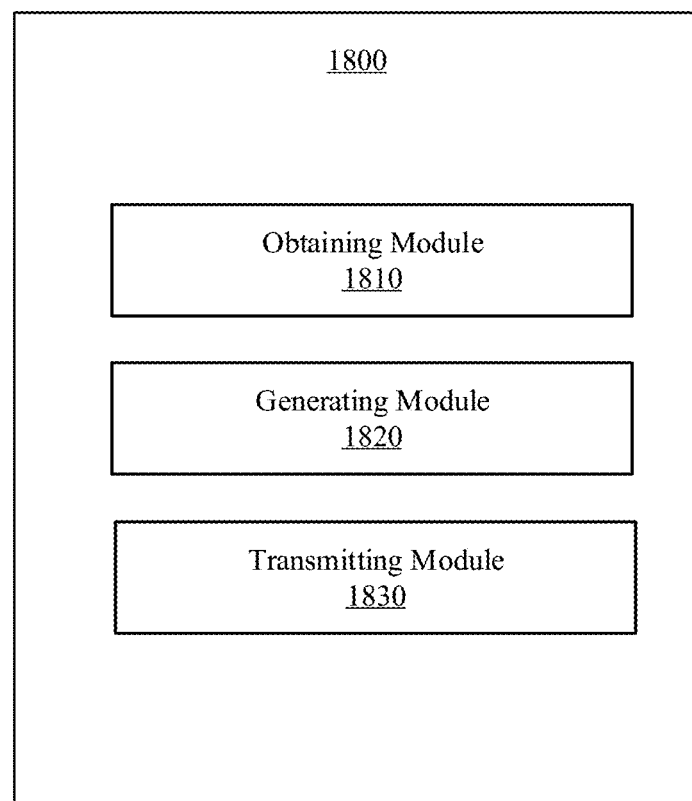
FIG. 18A illustrates a block diagram of a computer system for blockchain-based cross-entity authentication in accordance with some embodiments.

FIG. 18A illustrates a block diagram of a computer system 1800 for blockchain-based cross-entity authentication in accordance with some embodiments. The system 1800 may be an example of an implementation of one or more components of the service-side system 320 of FIG. 3 or one or more other components illustrated in FIGS. 1-5 and 16 (e.g., the DIS 1603a). The method 1900 may be implemented by the computer system 1800. The computer system 1800 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 1900. The computer system 1800 may comprise various units/modules corresponding to the instructions (e.g., software instructions). In some embodiments, the computer system 1800 may be referred to as an apparatus for blockchain-based cross-entity authentication. The apparatus may comprise an obtaining module 1810 for obtaining an authentication request by a first entity for authenticating a user, wherein the authentication request comprises a decentralized identifier (DID) of the user; a generating module 1820 for, in response to determining that the first entity is permitted to access authentication information of the user endorsed by a second entity, generating a blockchain transaction for obtaining an authentication result of the user by the second entity, wherein the authentication result is associated with the DID; and a transmitting module 1830 for transmitting the blockchain transaction to a blockchain node for adding to a blockchain.

Figure 18B:
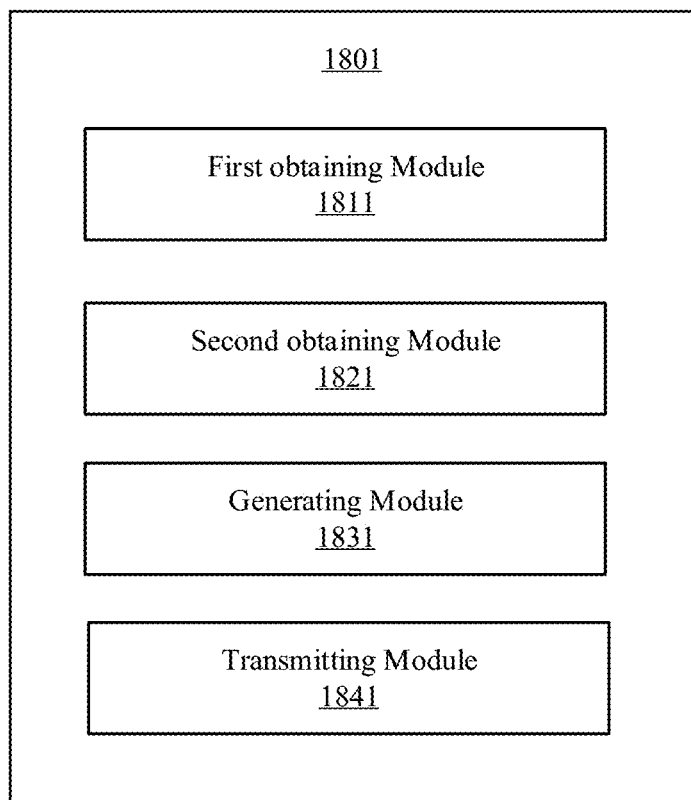
FIG. 18B illustrates a block diagram of a computer system for blockchain-based cross-entity authentication in accordance with some embodiments.

FIG. 18B illustrates a block diagram of a computer system 1801 for blockchain-based cross-entity authentication in accordance with some embodiments. The system 1801 may be an example of an implementation of one or more components of the service-side system 320 of FIG. 3 or one or more other components illustrated in FIGS. 1-5 and 16 (e.g., the DIS 1603b). The method 1901 may be implemented by the computer system 1801. The computer system 1801 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 1901. The computer system 1801 may comprise various units/modules corresponding to the instructions (e.g., software instructions). In some embodiments, the computer system 1801 may be referred to as an apparatus for blockchain-based cross-entity authentication. The apparatus may comprise a first obtaining module 1811 for obtaining, from a blockchain, a blockchain transaction comprising an authentication request by a first entity for authenticating a user, wherein the authentication request comprises a decentralized identifier (DID) of the user; a second obtaining module 1821 for, in response to determining that the first entity is permitted to access authentication information of the user endorsed by a second entity, obtaining an authentication result of the user by the second entity in response to the obtained blockchain transaction, wherein the authentication result is associated with the DID; a generating module 1831 for generating a different blockchain transaction comprising the authentication result; and a transmitting module 1841 for transmitting the different blockchain transaction to a blockchain node for adding to the blockchain.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 19:
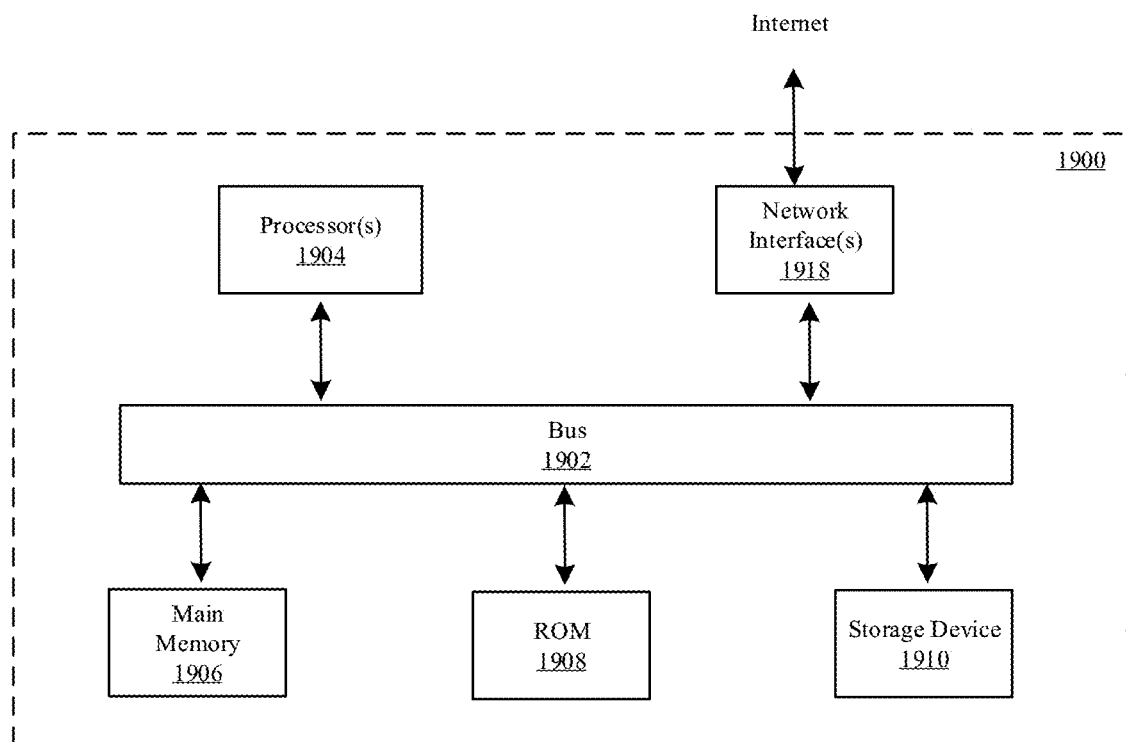
FIG. 19 illustrates a block diagram of a computer system in which any of the embodiments described herein may be implemented.

FIG. 19 illustrates a block diagram of a computer system in which any of the embodiments described herein may be implemented. The system 1900 may be implemented in any of the components of the environments or systems illustrated in FIGS. 1-5. The software applications or services illustrated in FIGS. 1-5 may be implemented and operated on the system 1900. One or more of the example methods illustrated by FIGS. 6-16 may be performed by one or more implementations of the computer system 1900.

The computer system 1900 may include a bus 1902 or other communication mechanism for communicating information, one or more hardware processor(s) 1904 coupled with bus 1902 for processing information. Hardware processor(s) 1904 may be, for example, one or more general purpose microprocessors.

The computer system 1900 may also include a main memory 1906, such as a random access memory (RAM), cache and/or other dynamic storage devices, coupled to bus 1902 for storing information and instructions executable by processor(s) 1904. Main memory 1906 also may be used for storing temporary variables or other intermediate information during execution of instructions executable by processor(s) 1904. Such instructions, when stored in storage media accessible to processor(s) 1904, render computer system 1900 into a special-purpose machine that is customized to perform the operations specified in the instructions. The computer system 1900 may further include a read only memory (ROM) 1908 or other static storage device coupled to bus 1902 for storing static information and instructions for processor(s) 1904. A storage device 1910, such as a magnetic disk, optical disk, or USB thumb drive (Flash drive), etc., may be provided and coupled to bus 1902 for storing information and instructions.

The computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the operations, methods, and processes described herein are performed by computer system 1900 in response to processor(s) 1904 executing one or more sequences of one or more instructions contained in main memory 1906. Such instructions may be read into main memory 1906 from another storage medium, such as storage device 1910. Execution of the sequences of instructions contained in main memory 1906 may cause processor(s) 1904 to perform the process steps described herein. In alternative embodiments, hard-wired circuitry may be used in place of or in combination with software instructions.

The main memory 1906, the ROM 1908, and/or the storage device 1910 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 1910. Volatile media includes dynamic memory, such as main memory 1906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 1900 may include a network interface 1918 coupled to bus 1902. Network interface 1918 may provide a two-way data communication coupling to one or more network links that are connected to one or more local networks. For example, network interface 1918 may be an integrated services digital network (ISDN) card, cable modem, satellite modem, or a modem to provide a data communication connection to a corresponding type of telephone line. As another example, network interface 1918 may be a local area network (LAN) card to provide a data communication connection to a compatible LAN (or WAN component to communicate with a WAN). Wireless links may also be implemented. In any such implementation, network interface 1918 may send and receive electrical, electromagnetic or optical signals that carry digital data streams representing various types of information.

The computer system 1900 can send messages and receive data, including program code, through the network(s), network link and network interface 1918. In the Internet example, a server might transmit a requested code for an application program through the Internet, the ISP, the local network and the network interface 1918.

The received code may be executed by processor(s) 1904 as it is received, and/or stored in storage device 1910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned. In addition, herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:

1. A computer-implemented method, comprising:
obtaining, at a first computing system from a first entity, an authentication request for authenticating a user, wherein the authentication request comprises a decentralized identifier (DID) of the user;
generating, at the first computing system, a digital signature on the obtained authentication request based on a private key of the first entity;
generating, at the first computing system, an authorization encrypted with a private key of the user indicating a permission for the first entity to access an authentication result of the user endorsed by a second entity, wherein the encrypted authorization comprises the digital signature and the DID of the user;
adding, to a blockchain, a blockchain transaction for obtaining the authentication result endorsed by the second entity, wherein the authentication result indicates whether the DID in the authentication request is registered with the second entity, and the blockchain transaction comprises the encrypted authorization;
obtaining, at the first computing system from the blockchain, the authentication result endorsed by the second entity; and
transmitting the obtained authentication result to the first entity for the first entity to authenticate the user based on the obtained authentication result.

2. The method of claim 1, after adding, to the blockchain, the blockchain transaction and before obtaining, at the first computing system from the blockchain, the authentication result, further comprising:
- obtaining, at a second computing system from the blockchain, the blockchain transaction for obtaining the authentication result;
- obtaining, at the second computing system, the authentication result by searching in a data store for a certification endorsed by the second entity that the DID is registered with the second entity;
- generating, at the second computing system, a different blockchain transaction comprising the authentication result; and
- adding the different blockchain transaction to the blockchain.

3. The method of claim 1, wherein the authentication result comprises a verifiable claim (VC) indicating that the DID in the authentication request is registered with the second entity.

4. The method of claim 3, wherein the VC comprises a permission for the first entity to authenticate users based on the VC.

5. The method of claim 3, wherein:
- the VC is stored in a data store in association with the DID; and
- the data store is accessible by the second entity.

6. The method of claim 3, wherein a hash value of the VC is stored in the blockchain in association with the DID.

7. The method of claim 1, wherein:
- the authentication result indicates that the DID is registered with the second entity; and
- transmitting the obtained authentication result to the first entity for the first entity to authenticate the user based on the obtained authentication result comprises transmitting the obtained authentication result to the first entity for granting the user access to the first entity.

8. The method of claim 1, wherein:
- the authentication result indicates that the DID is not registered with the second entity; and
- transmitting the obtained authentication result to the first entity for the first entity to authenticate the user based on the obtained authentication result comprises transmitting the obtained authentication result to the first entity for denying the user access to the first entity.

9. The method of claim 1, before adding, to the blockchain, the blockchain transaction, further comprising:
- obtaining, at the first computing system, a public key of the user from the blockchain based on the DID; and
- verifying, at the first computing system, that the user owns the DID based at least on the obtained public key of the user.

10. The method of claim 1, wherein:
- the DID comprises a secondary DID that is limited by an expiring time, limited by an expiring number of use, or limited for accessing only the first entity.

11. The method of claim 10, wherein:
- the user corresponds to a primary DID and the secondary DID both known by the second entity; and
- the primary DID corresponds to privacy information of the user that is untraceable based on the secondary DID.

12. A non-transitory computer-readable storage medium storing instructions executable by one or more processors, wherein execution of the instructions causes the one or more processors to perform operations comprising:
- obtaining, at a first computing system from a first entity, an authentication request for authenticating a user, wherein the authentication request comprises a decentralized identifier (DID) of the user;
- generating, at the first computing system, a digital signature on the obtained authentication request based on a private key of the first entity;
- generating, at the first computing system, an authorization encrypted with a private key of the user indicating a permission for the first entity to access an authentication result of the user endorsed by a second entity, wherein the encrypted authorization comprises the digital signature and the DID of the user;
- adding, to a blockchain, a blockchain transaction for obtaining the authentication result endorsed by the second entity, wherein the authentication result indicates whether the DID in the authentication request is registered with the second entity, and the blockchain transaction comprises the encrypted authorization;
- obtaining, at the first computing system from the blockchain, the authentication result endorsed by the second entity; and
- transmitting the obtained authentication result to the first entity for the first entity to authenticate the user based on the obtained authentication result.

13. The non-transitory computer-readable storage medium of claim 12, wherein after adding, to the blockchain, the blockchain transaction and before obtaining, at the first computing system from the blockchain, the authentication result, the operations further comprise:
- obtaining, at a second computing system from the blockchain, the blockchain transaction for obtaining the authentication result;
- obtaining, at the second computing system, the authentication result by searching in a data store for a certification endorsed by the second entity that the DID is registered with the second entity;
- generating, at the second computing system, a different blockchain transaction comprising the authentication result; and
- adding the different blockchain transaction to the blockchain.

14. The non-transitory computer-readable storage medium of claim 12, wherein the authentication result comprises a verifiable claim (VC) indicating that the DID in the authentication request is registered with the second entity.

15. The non-transitory computer-readable storage medium of claim 14, wherein the VC comprises a permission for the first entity to authenticate users based on the VC.

16. The non-transitory computer-readable storage medium of claim 14, wherein:
- the VC is stored in a data store in association with the DID; and
- the data store is accessible by the second entity.

17. The non-transitory computer-readable storage medium of claim 14, wherein a hash value of the VC is stored in the blockchain in association with the DID.

18. The non-transitory computer-readable storage medium of claim 12, wherein before adding, to the blockchain, the blockchain transaction, the operations further comprise:
- obtaining, at the first computing system, a public key of the user from the blockchain based on the DID; and
- verifying, at the first computing system, that the user owns the DID based at least on the obtained public key of the user.

19. A system comprising one or more processors and one or more non-transitory computer-readable memories coupled to the one or more processors and configured with instructions executable by the one or more processors to cause the system to perform operations comprising:
- obtaining, from a first entity, an authentication request for authenticating a user, wherein the authentication request comprises a decentralized identifier (DID) of the user;
- generating, at the first computing system, a digital signature on the obtained authentication request based on a private key of the first entity;
- generating, at the first computing system, an authorization encrypted with a private key of the user indicating a permission for the first entity to access an authentication result of the user endorsed by a second entity, wherein the encrypted authorization comprises the digital signature and the DID of the user;
- adding, to a blockchain, a blockchain transaction for obtaining the authentication result endorsed by the second entity, wherein the authentication result indicates whether the DID in the authentication request is registered with the second entity, and the blockchain transaction comprises the encrypted authorization;
- obtaining, from the blockchain, the authentication result endorsed by the second entity; and
- transmitting the obtained authentication result to the first entity for the first entity to authenticate the user based on the obtained authentication result.

* * * * *